US012551395B2

(12) United States Patent
Boucher et al.

(10) Patent No.: US 12,551,395 B2

(45) Date of Patent: Feb. 17, 2026

(54) PERSON SUPPORT APPARATUSES INCLUDING HIP AND THIGH SUPPORT ASSEMBLIES

(71) Applicant: Allen Medical Systems, Inc., Batesville, IN (US)

(72) Inventors: Michael Boucher, Batesville, IN (US); Hung D. Nguyen, Batesville, IN (US); Christopher B. Dubois, Batesville, IN (US); Andrew R. Marchand, Batesville, IN (US); Mary Kelly Chance, Batesville, IN (US)

(73) Assignee: Allen Medical Systems, Inc., Batesville, IN (US)

( * ) Notice: Subject to any disclaimer, the term of this patent is extended or adjusted under 35 U.S.C. 154(b) by 288 days.

(21) Appl. No.: 18/325,587

(22) Filed: May 30, 2023

(65) Prior Publication Data

US 2024/0398648 A1 Dec. 5, 2024

(51) Int. Cl.
*A61G 13/12* (2006.01)

(52) U.S. Cl.
CPC .................................. *A61G 13/123* (2013.01)

(58) Field of Classification Search
CPC .............................. A61G 13/123; A61G 13/12
USPC .............................................................. 5/624
See application file for complete search history.

(56) References Cited

U.S. PATENT DOCUMENTS

| | | | | |
|---|---|---|---|---|
| 3,817,512 A * | 6/1974 | Torrey | A61G 13/12 5/632 |
| 4,367,869 A * | 1/1983 | Dailey | A61G 13/12 5/624 |
| 6,941,951 B2 | 9/2005 | Hubert et al. | |
| 7,216,388 B2 | 5/2007 | Bieganek et al. | |
| 8,286,283 B2 | 10/2012 | Copeland et al. | |
| 8,806,680 B2 | 8/2014 | Ishida | |
| 9,125,493 B2 | 9/2015 | Siekman et al. | |
| 9,161,642 B2 | 10/2015 | Thompson et al. | |

(Continued)

FOREIGN PATENT DOCUMENTS

| | | |
|---|---|---|
| EP | 1951547 B1 | 7/2015 |
| EP | 2582345 B1 | 5/2017 |

(Continued)

OTHER PUBLICATIONS

Mizuho Osi, "Axis Jackson System Owner's Manual—Model 6977," 2009, 86 pages.

*Primary Examiner* — Myles A Throop

(74) *Attorney, Agent, or Firm* — Dinsmore & Shohl LLP

(57) ABSTRACT

A person support apparatus includes a base frame, a longitudinal frame coupled to the base frame and extending in a longitudinal direction, and a hip/thigh support assembly. The hip/thigh support assembly is slidably positioned along the longitudinal frame. The hip/thigh support assembly includes a hip support base, a thigh support base, a hip/thigh support exterior plate including a hip support exterior plate portion oriented at an acute angle relative to a lateral axis of the longitudinal frame, and a thigh support exterior plate portion extending from the hip support exterior plate portion at an obtuse angle and oriented at an acute angle relative to the lateral axis of the longitudinal frame and a longitudinal axis of the longitudinal frame, and a hip/thigh support pad removably attached to the hip/thigh support exterior plate.

20 Claims, 26 Drawing Sheets

(56) References Cited

U.S. PATENT DOCUMENTS

| | | | | |
|---|---|---|---|---|
| 9,168,009 | B2 * | 10/2015 | Lee | A61B 6/0442 |
| 9,351,895 | B2 | 5/2016 | Ciblak et al. | |
| 9,474,672 | B2 | 10/2016 | Robran et al. | |
| 9,642,760 | B2 | 5/2017 | Jackson et al. | |
| 9,763,522 | B2 | 9/2017 | Siekman et al. | |
| 10,098,590 | B2 | 10/2018 | DeFreitas et al. | |
| 10,335,097 | B2 * | 7/2019 | Kaiser | A61G 13/123 |
| 10,342,722 | B2 | 7/2019 | Garrido | |
| 10,548,796 | B2 | 2/2020 | Lim et al. | |
| 10,751,240 | B2 | 8/2020 | Lim et al. | |
| 10,799,412 | B1 | 10/2020 | Termanini | |
| 10,820,866 | B2 | 11/2020 | Campagna | |
| 10,881,566 | B2 | 1/2021 | Jackson | |
| 10,940,072 | B2 | 3/2021 | Beale et al. | |
| 10,966,892 | B2 | 4/2021 | Lim et al. | |
| 11,020,304 | B2 | 6/2021 | Lim et al. | |
| 11,147,729 | B2 | 10/2021 | Garrido | |
| 11,197,795 | B2 | 12/2021 | Shekhman | |
| 11,234,886 | B2 | 2/2022 | Lim et al. | |
| 11,389,363 | B2 | 7/2022 | Bouchet | |
| 11,464,698 | B2 | 10/2022 | Jackson et al. | |
| D1,071,190 | S * | 4/2025 | Boucher | D24/128 |
| 2006/0123546 | A1 * | 6/2006 | Horton | A61G 13/0054 5/624 |
| 2006/0255220 | A1 * | 11/2006 | Skripps | A61G 13/04 248/228.4 |
| 2020/0375552 | A1 | 12/2020 | Campagna | |
| 2021/0069047 | A1 * | 3/2021 | Lim | A61G 13/129 |
| 2021/0077855 | A1 | 3/2021 | Walko | |
| 2021/0128997 | A1 | 5/2021 | Kubas et al. | |
| 2021/0236369 | A1 * | 8/2021 | Lee | A61G 13/123 |
| 2021/0259900 | A1 | 8/2021 | Schopler et al. | |
| 2021/0267831 | A1 | 9/2021 | Jackson et al. | |
| 2022/0079825 | A1 | 3/2022 | Shekhman | |
| 2022/0183918 | A1 | 6/2022 | Behrendt | |
| 2022/0280367 | A1 * | 9/2022 | Diodato | A61G 13/1265 |
| 2022/0387238 | A1 | 12/2022 | Jackson et al. | |
| 2022/0395415 | A1 | 12/2022 | Cooke | |

FOREIGN PATENT DOCUMENTS

| | | | |
|---|---|---|---|
| EP | 2922507 | B1 | 9/2017 |
| EP | 2640336 | B1 | 2/2018 |
| EP | 2890351 | B1 | 1/2019 |
| EP | 3337439 | B1 | 5/2021 |
| EP | 3858319 | A1 | 8/2021 |
| EP | 3846762 | B1 | 7/2022 |
| WO | 2020232097 | A1 | 11/2020 |

* cited by examiner

PERSON SUPPORT APPARATUSES INCLUDING HIP AND THIGH SUPPORT ASSEMBLIES

TECHNICAL FIELD

The present specification generally relates to person support apparatuses and, more specifically, to person support apparatuses including assemblies for supporting a subject below the torso.

BACKGROUND

In some medical situations it may be necessary to position a subject below the torso during a surgical procedure. For example, a surgical procedure may require that a subject is oriented in a prone position on his or her stomach to expose the back of the subject. Accordingly, a surgical procedure may be performed while accessing the subject's back. However, the subject may need to be specifically positioned to correctly perform the surgical procedure and access the appropriate location on the subject.

Accordingly, a need exists for alternative person support apparatuses including various support assemblies that can accommodate subjects of different sizes.

SUMMARY

In one embodiment, a person support apparatus include a base frame, a longitudinal frame coupled to the base frame and extending in a longitudinal direction, and a hip/thigh support assembly for supporting a hip and a thigh of a subject positioned on the longitudinal frame, the hip/thigh support assembly slidably positioned along the longitudinal frame. The hip/thigh support assembly including a hip support base, a thigh support base, a hip/thigh support exterior plate removably attached to an upper wall of the hip support base and an upper wall of the thigh support base, the hip/thigh support exterior plate comprising a hip support exterior plate portion oriented at an acute angle relative to a lateral axis of the longitudinal frame, and a thigh support exterior plate portion extending from the hip support exterior plate portion at an obtuse angle and oriented at an acute angle relative to the lateral axis of the longitudinal frame and a longitudinal axis of the longitudinal frame, and a hip/thigh support pad removably attached to the hip/thigh support exterior plate.

In another embodiment, a hip/thigh support assembly including a hip support base, a thigh support base, a hip/thigh support exterior plate removably attached to an upper wall of the hip support base and an upper wall of the thigh support base, the hip/thigh support exterior plate comprising a hip support exterior plate portion, and a thigh support exterior plate portion extending from the hip support exterior plate portion at an obtuse angle, and a hip/thigh support pad removably attached to the hip/thigh support exterior plate.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
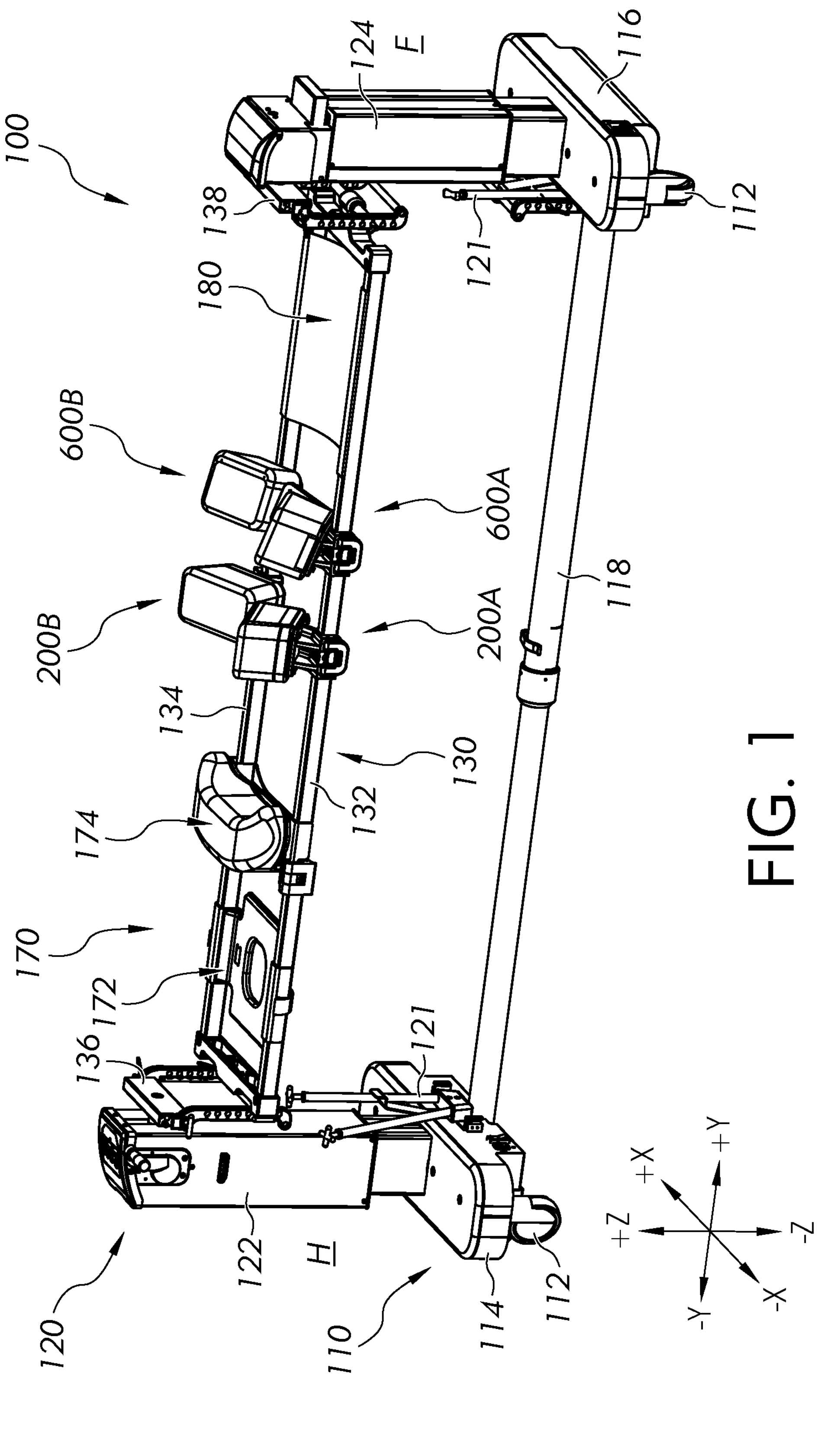
FIG. 1 schematically depicts a person support apparatus including a pair of hip support assemblies and a pair of thigh support assemblies, according to one or more embodiments shown or described herein.
Figure 29:
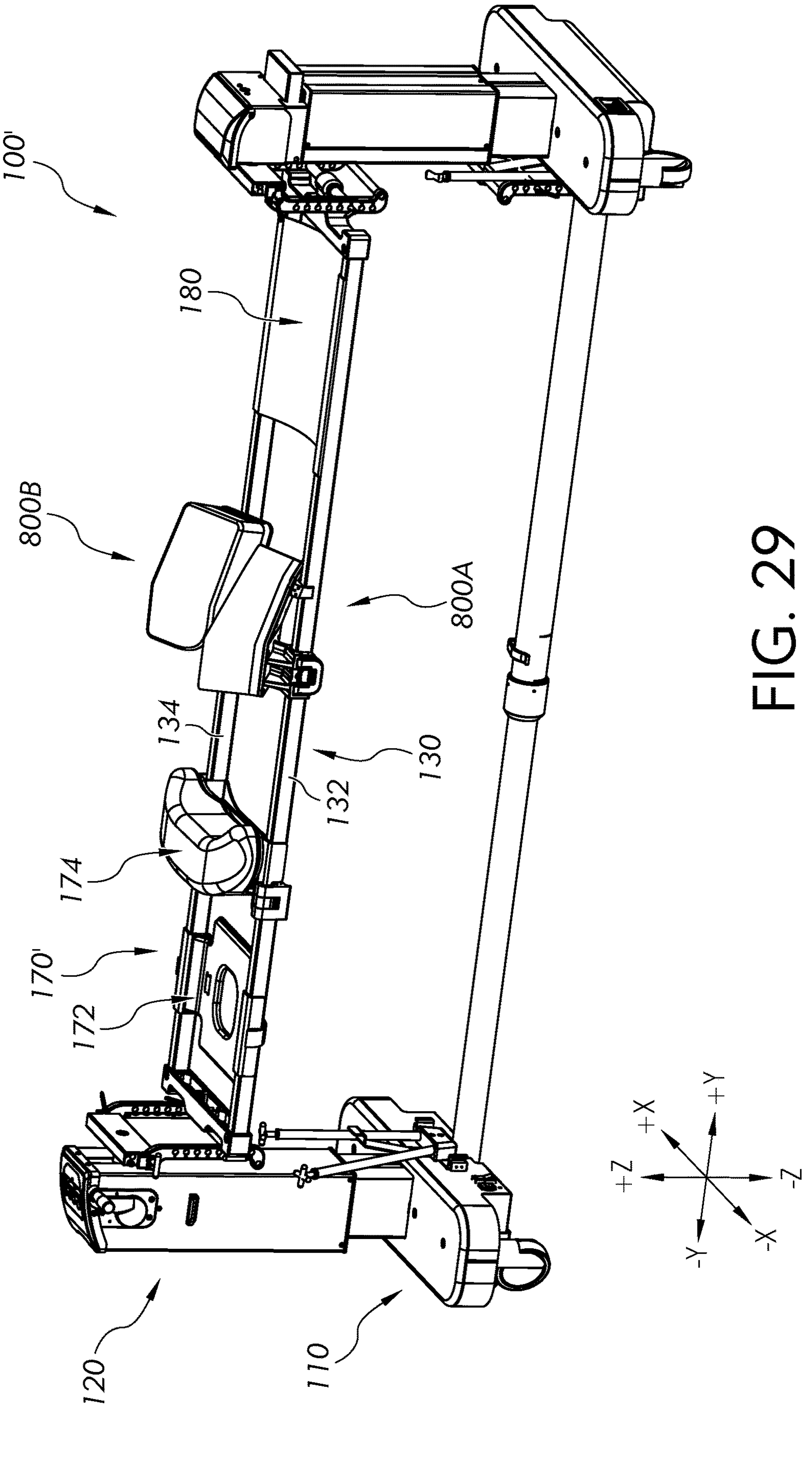
FIG. 29 schematically depicts another person support apparatus including a pair of hip/thigh support assemblies, according to one or more embodiments shown or described herein.

Reference will now be made in detail to embodiments of person support apparatuses that include hip support assemblies and thigh support assemblies, examples of which are illustrated in the accompanying drawings. Whenever possible, the same reference numerals will be used throughout the drawings to refer to the same or like parts. Embodiments of a person support apparatus are depicted in FIGS. 1 and 29. The person support apparatus depicted in FIG. 1 generally includes a base frame and a primary support frame supported on the base frame, where the primary support frame extends in a longitudinal direction. The person support apparatus further includes a support deck coupled to the primary support frame. The support deck includes a first hip support assembly, a second hip support assembly, a first thigh support assembly, and a second thigh support assembly. The hip support assemblies each include a hip support pad independently movable relative to the pair of thigh support assemblies including a thigh support pad. Alternatively, as depicted in FIG. 29, the support frame includes a pair of hip/thigh support assemblies. The hip/thigh support assemblies are fixed to one another such that they move simultaneously along the longitudinal frame.

Various embodiments of person support apparatuses will be described herein with specific reference to the appended drawings.

As used herein, the term "longitudinal direction" refers to the forward-rearward direction of the person support apparatus (e.g., in the +/−X-directions of the coordinate axes depicted). The term "lateral direction" refers to the cross-direction of the person support apparatus (e.g., in the +/−Y-directions of the coordinate axes depicted), and is transverse to the longitudinal direction. The term "vertical direction" refers to the upward-downward direction of the person support apparatus (e.g., in the +/−Z-directions of the coordinate axes depicted), and is transverse to the lateral and the longitudinal directions. The terms "head end" and "foot end" refer to the relative location of components of the person support apparatus in the longitudinal direction.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring to FIG. 1, a person support apparatus 100 is depicted. The person support apparatus 100 may be, for example, a two-column operating table. The person support apparatus 100 generally includes a base frame 110, a longitudinal frame 130 supported on the base frame 110, and a primary support frame 120 coupled to the longitudinal frame 130.

The base frame 110 of the person support apparatus 100 includes a head portion 114 positioned at a head end H of the person support apparatus 100 and a foot portion 116 positioned at a foot end F of the person support apparatus 100. The head portion 114 and the foot portion 116 are spaced apart from one another in the longitudinal direction and may be coupled to one another by a central portion 118 that extends between the head portion 114 and the foot portion 116 in the longitudinal direction. The central portion 118 may be extendable and retractable in the longitudinal direction, thereby increasing or decreasing the distance between the head portion 114 and the foot portion 116 in the longitudinal direction. In some embodiments, the head portion 114 and the foot portion 116 each have a plurality of casters 112 coupled thereto, such that the person support apparatus 100 may be moved along a surface, such as a floor.

The primary support frame 120 extends upward in a vertical direction (e.g., generally along the Z-axis) from the base frame 110 of the person support apparatus 100. In the embodiment depicted in FIG. 1, the primary support frame 120 includes a head column 122 that extends upward from the head portion 114 of the base frame 110 in the vertical direction. The primary support frame 120 further includes a foot column 124 that extends upward from the foot portion 116 of the base frame 110 in the vertical direction. Accordingly, it should be understood that the head column 122 is generally positioned proximate the head end H of the person support apparatus 100 and the foot column 124 is generally positioned proximate the foot end F of the person support apparatus 100. The head column 122 is spaced apart from the foot column 124 in the longitudinal direction by the central portion 118. In some embodiments, the head column 122 and the foot column 124 are coupled to the head portion 114 and the foot portion 116 of the base frame 110, respectively. Alternatively, the head column 122 and the foot column 124 may be integrated with the head portion 114 and the foot portion 116 of the base frame 110, respectively. The head column 122 and the foot column 124 may be actuated to raise and lower the head column 122 and the foot column 124 in the +/−Z-direction of the coordinate axes depicted in FIG. 1, as will be described in further detail herein.

The primary support frame 120 includes the longitudinal frame 130 that is positioned above the base frame 110 in the vertical direction and that extends between the head column 122 and the foot column 124 in the longitudinal direction. The longitudinal frame 130 is coupled to the head column 122 and the foot column 124 such that the longitudinal frame 130 may be raised, lowered, and/or tilted with respect to the base frame 110 upon actuation of the head column 122 and the foot column 124. In the embodiment depicted in FIG. 1, the longitudinal frame 130 generally extends in the horizontal plane (e.g., the X-Y plane as depicted). However, it should be understood that the longitudinal frame 130 may be tilted with respect to the X-Y plane (e.g., about an axis of rotation generally parallel to the Y-axis in the coordinate axes depicted in FIG. 1) or rotated with respect to the X-Y plane (e.g., about an axis of rotation generally parallel to the X-axis in the coordinate axes depicted in FIG. 1). While FIG. 1 generally depicts the longitudinal frame 130 as being substantially planar, in other embodiments, the longitudinal frame 130 may be contoured and may include portions that extend out of the horizontal plane. In some embodiments, the longitudinal frame 130 may include a first side rail 132 and a second side rail 134, where the first side rail 132 and the second side rail 134 extend substantially parallel to each other in the longitudinal direction between the head column 122 and the foot column 124. The first side rail 132 and the second side rail 134 may be coupled to the head column 122 and the foot column 124, respectively, by a head support piece 136 and a foot support piece 138. The head support piece 136 may be coupled between the head column 122 and the first and second side rails 132, 134. In embodiments, the head support piece 136 and the foot support piece 138 may be pivotable with respect to the head column 122 and the foot column 124 about an axis of rotation that is generally parallel to the X-axis in the coordinate axes depicted in FIG. 1. The foot support piece 138 may be coupled between the foot column 124 and the first and second side rails 132, 134.

Referring still to FIG. 1, as noted above, the head column 122 and the foot column 124 may be adjustable in the vertical direction such that the head column 122 and the foot column 124 may raise or lower the longitudinal frame 130 with respect to the base frame 110 in the vertical direction. In some embodiments, at least one column actuator 121 is coupled to the head column 122 and/or the foot column 124. The at least one column actuator 121 moves the head column 122 and the foot column 124 upward and downward in the vertical direction with respect to the base frame 110. The column actuator 121 may be a powered actuator, such as an electric motor, linear actuator, pneumatic cylinder, hydraulic cylinder, or the like, or may be manually powered, such as by a system of gears actuated by a pedal, a crank, or the like, or even a hydraulic cylinder actuated by a pedal, a crank, or the like. For example, the column actuator 121 may also include a linear actuator, a hydraulic actuator, a pneumatic actuator, an electro-mechanical actuator, or the like.

The head column 122 and the foot column 124 may be raised and lowered in the vertical direction independent of one another such that the longitudinal frame 130 may be tilted with respect to the horizontal plane (e.g., the X-Y plane), as described above. For example, the head column 122 may be raised with respect to the foot column 124 in the vertical direction such that the head end of the longitudinal frame 130 is positioned higher than the foot end of the longitudinal frame 130 in the vertical direction (e.g., a reverse Trendelenburg position). Conversely, the foot column 124 may be raised with respect to the head column 122 in the vertical direction, such that the foot end of the longitudinal frame 130 is positioned higher than the head end of the longitudinal frame 130 in the vertical direction (e.g., a Trendelenburg position). In some embodiments, both the head column 122 and the foot column 124 of the primary support frame 120 may be raised or lowered in the vertical direction simultaneously and in conjunction with one another, thereby raising both the head end and the foot end of the longitudinal frame 130.

The primary support frame 120 may generally support a support deck 170 thereon. In the embodiment depicted in FIG. 1, the support deck 170 may include a head support member 172, a chest support member 174, a pair of hip support assemblies 200A, 200B, a pair of thigh support assemblies 600A, 600B, and a leg support member 180. As described herein, the head support member 172, the chest support member 174, the pair of hip support assemblies 200A, 200B, the pair of thigh support assemblies 600A, 600B, and the leg support member 180 may be independently movable relative to one another in a longitudinal direction (e.g., generally along the X-axis) along the longitudinal frame 130. Although not shown, a head pad may be provided on the head support member 172 and a leg pad may be provided on the leg support member 180 to provide a cushion for a subject's head and legs, respectively, when positioned on the person support apparatus 100.

As depicted in FIG. 1, the pair of hip support assemblies 200A, 200B includes a first hip support assembly 200A provided on the first side rail 132 and a second hip support assembly 200B provided on the second side rail 134. It should be appreciated that the first hip support assembly 200A and the second hip support assembly 200B include identical structure. As such, only the first hip support assembly 200A will be discussed in detail herein. However, it should be appreciated that the description of the first hip support assembly 200A is equally applicable to the second hip support assembly 200B.

As discussed in more detail herein, the hip support assemblies 200A, 200B are oriented downward in a direction toward one another so as to conform to the hips of a subject positioned in a face down position on the support deck 170 of the person support apparatus 100 with the subject's head positioned at and supported by the head support member 172 and the subject's feet positioned at and supported by the leg support member 180.

Figure 2:
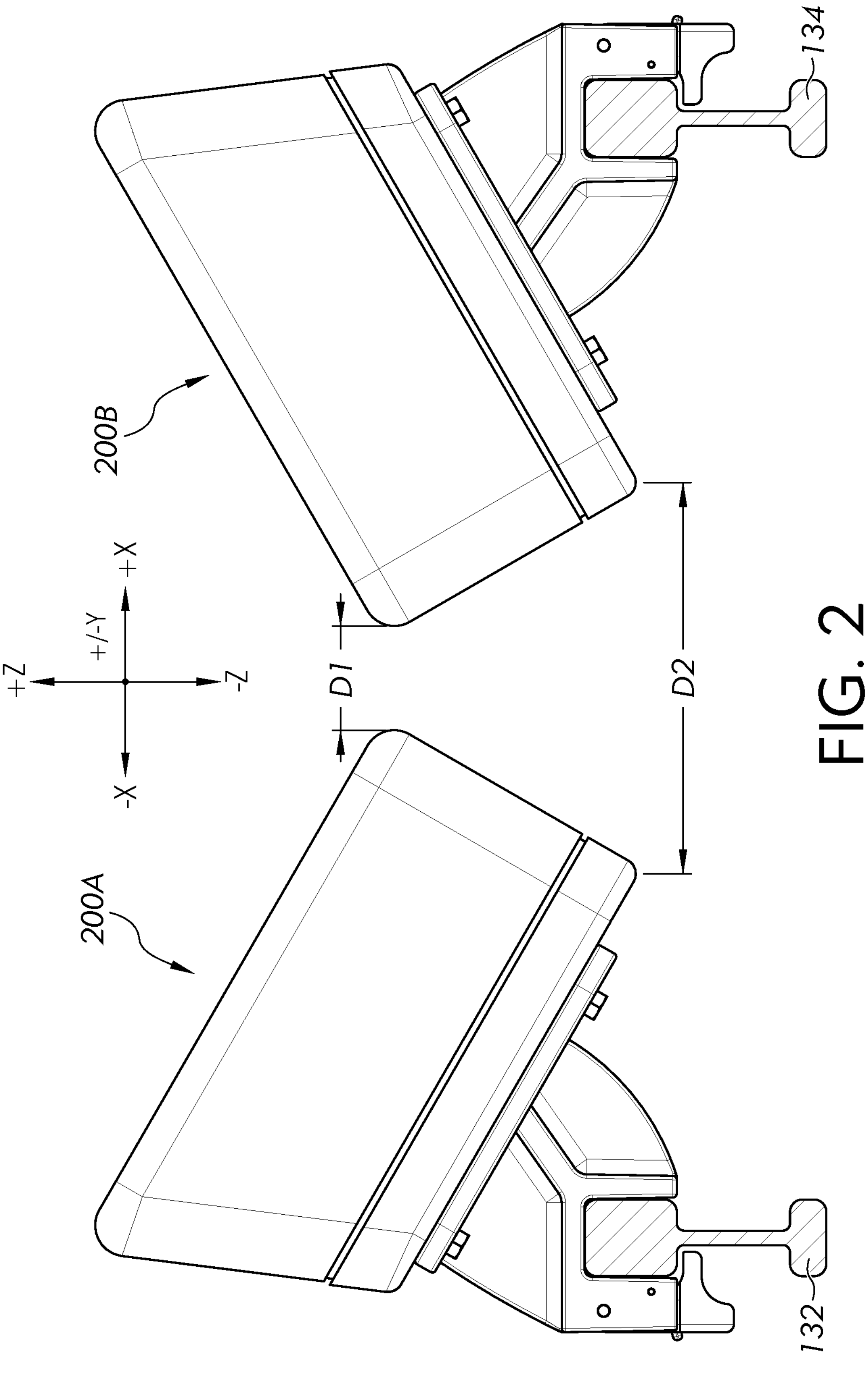
FIG. 2 schematically depicts a cross-sectional view of the pair of hip support assemblies of FIG. 1, according to one or more embodiments shown or described herein.

Referring now to FIG. 2, the hip support assemblies 200A, 200B are shown provided on the first side rail 132 and the second side rail 134, respectively, and spaced apart from one another in the +/−X-direction of the coordinate axes depicted in the drawings. Due to the orientation and shape of the hip support assemblies 200A, 200B, a first distance D1 between an upper end of the hip support assemblies 200A, 200B is less than a second distance D2 between an opposite lower end of the hip support assemblies 200A, 200B.

Figure 3:
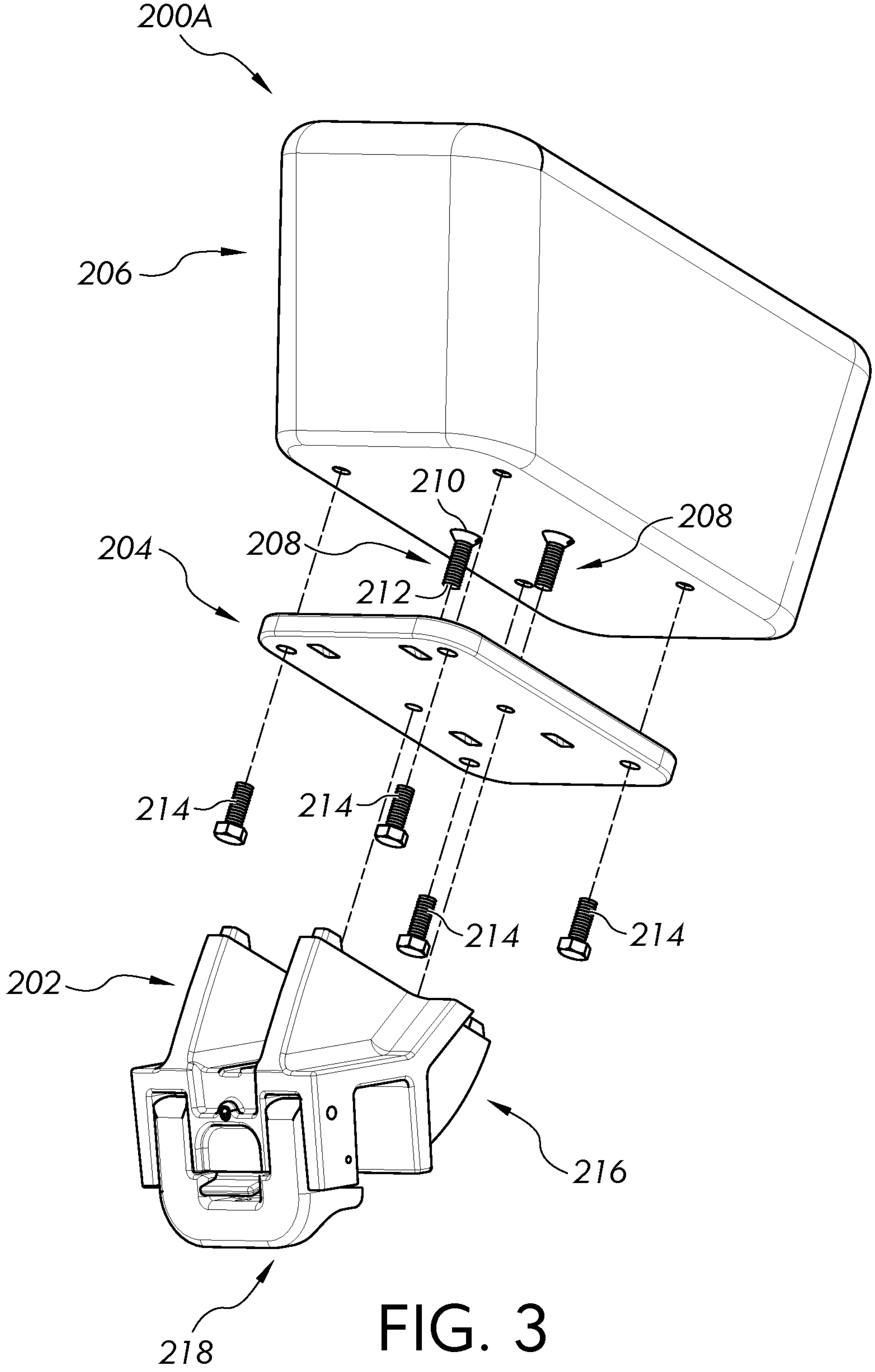
FIG. 3 schematically depicts an exploded view of the hip support assembly of FIG. 1, according to one or more embodiments shown or described herein.

Referring now to FIG. 3, the first hip support assembly 200A is described in more detail. However, as noted above, the first hip support assembly 200A is identical in structure to the second hip support assembly 200B and, thus, the description of the first hip support assembly 200A is equally applicable to the second hip support assembly 200B. Specifically, the first hip support assembly 200A generally includes a hip support base 202, a hip support exterior plate 204 removably attached to the hip support base 202, and a hip support pad 206 removably attached to the hip support exterior plate 204.

The first hip support assembly 200A includes one or more fasteners 208 that secure the hip support exterior plate 204 to the hip support base 202. Although FIG. 3 depicts a plurality of fasteners 208 represented as threaded fasteners, it should be appreciated that any number of fasteners 208, such as non-threaded fasteners, clips, latches, and the like, may be suitable for attaching the hip support exterior plate 204 to the hip support base 202. In embodiments, the fasteners 208 may include a head 210 and a shaft 212 extending from the head 210. More particularly, the head 210 of the fasteners 208 may be tapered in a direction toward the shaft 212 so as to nest within the hip support exterior plate 204 and reduce a clearance required between the hip support exterior plate 204 and the hip support pad 206, as described in more detail herein.

Similarly, the first hip support assembly 200A includes one or more fasteners 214 that secure the hip support pad 206 to the hip support exterior plate 204. Although FIG. 3 depicts a plurality of fasteners 214 represented as threaded fasteners, it should be appreciated that any number of suitable fasteners, such as non-threaded fasteners, clips, latches, and the like, may be suitable for attaching the hip support pad 206 to the hip support exterior plate 204.

The hip support base 202 includes a hip support base frame 216 and a locking member 218 received within the hip support base frame 216 and rotatably coupled thereto. As described in more detail herein, the locking member 218 is positionable between an unlocked position and a locked position, as depicted in FIG. 3, to selectively secure the hip support base frame 216 to the longitudinal frame 130 (FIG. 2), particularly, the first side rail 132 of the longitudinal frame 130. In doing so, the hip support base frame 216 is inhibited from being removed from the first side rail 132 of the longitudinal frame 130 and sliding along the first side rail 132 of the longitudinal frame 130 in the +/−Y-direction of the coordinate axes depicted in the drawings.

Figure 4:
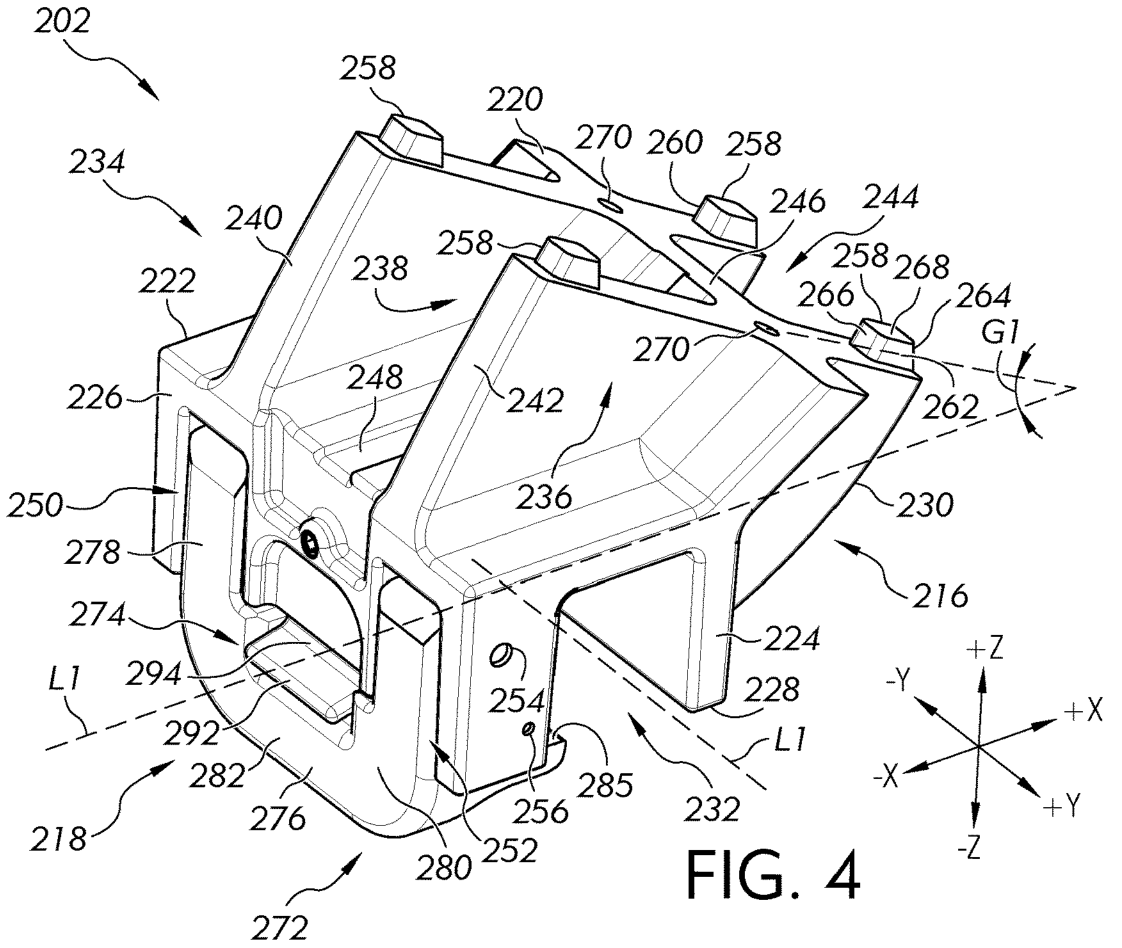
FIG. 4 schematically depicts a perspective view of a hip support base of the hip support assembly of FIG. 1, according to one or more embodiments shown or described herein.
Figure 5:
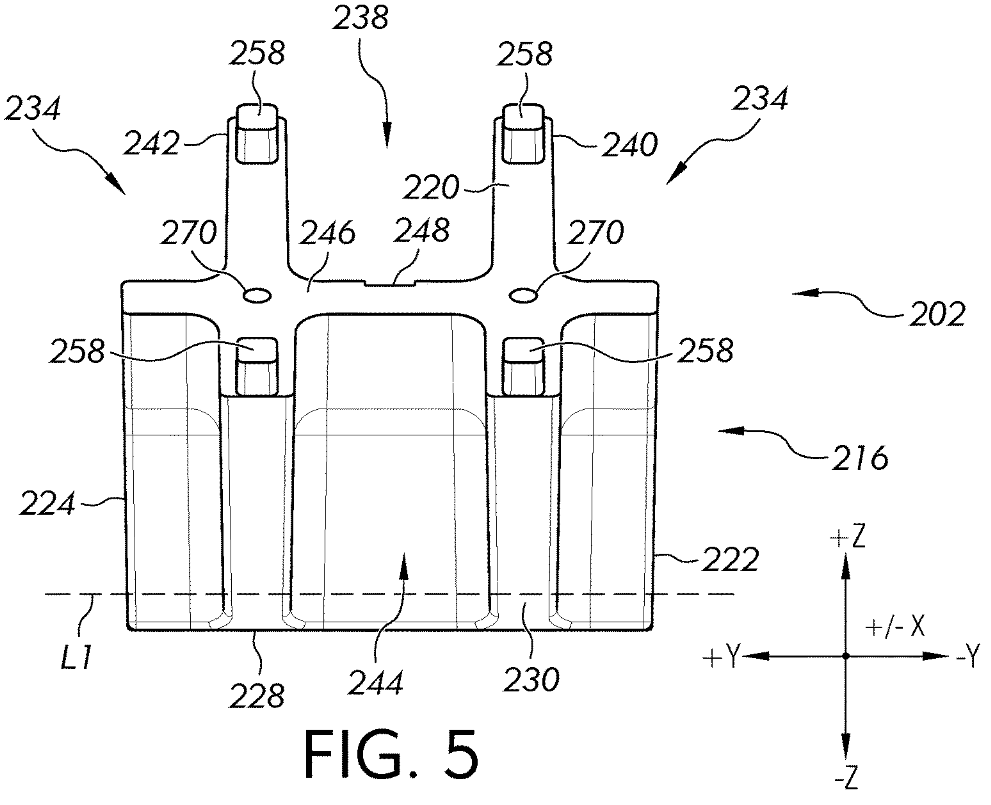
FIG. 5 schematically depicts a side view of the hip support base of the hip support assembly of FIG. 1, according to one or more embodiments shown or described herein.

Referring now to FIGS. 4 and 5, the hip support base 202 including the hip support base frame 216 and the locking member 218 is depicted. The hip support base frame 216 includes an upper surface 220, a front surface 222, a rear surface 224 opposite the front surface 222, an outer surface 226, a lower surface 228 opposite the upper surface 220, and an inner surface 230 opposite the outer surface 226. The front surface 222 and the rear surface 224 are spaced apart from one another and extend between the upper surface 220, the lower surface 228, the outer surface 226, and the inner surface 230. As such, the outer surface 226 and the inner surface 230 each extend between the upper surface 220, the front surface 222, the rear surface 224, and the lower surface 228.

A longitudinal channel 232 is formed within the hip support base frame 216 and extends through the front surface 222 and the rear surface 224 of the hip support base frame 216. The longitudinal channel 232 is open at the lower surface 228 of the hip support base frame 216 to permit the hip support base 202 to be lowered onto the first side rail 132 of the longitudinal frame 130 (FIG. 2). In embodiments, the longitudinal channel 232 has a rectangular cross-section corresponding to a cross-section of the first side rail 132. The longitudinal channel 232 defines a longitudinal axis L1 extending parallel to the Y-axis of the coordinate axes and a lateral axis L2 extending perpendicular to the longitudinal axis L1 of the longitudinal channel 232, and thus parallel to the X-axis of the coordinate axes. The upper surface 220 of the hip support base frame 216 is oriented at an acute angle G1 relative to the lateral axis L2 of the longitudinal channel 232. Stated another way, the upper surface 220 of the hip support base frame 216 is oriented at an acute angle relative to the horizontal plane (X-Y plane). In embodiments, the acute angle G1 is equal to or greater than 10 degrees and less than or equal to 80 degrees. In embodiments, the acute angle G1 is equal to or greater than 20 degrees and less than or equal to 70 degrees. In embodiments, the acute angle G1 is equal to or greater than 40 degrees and less than or equal to 60 degrees.

In embodiments, a front recess 234 is formed at an upper portion of the front surface 222 of the hip support base frame 216 and extends in a direction toward the rear surface 224 of the hip support base frame 216. Similarly, in embodiments, a rear recess 236 is formed at an upper portion of the rear surface 224 of the hip support base frame 216 and extends in a direction toward the front surface 222 of the hip support base frame 216. Additionally, in embodiments, an outer recess 238 is formed in the upper surface 220 and the outer surface 226 of the hip support base frame 216 to define a first fin 240 and a second fin 242 (e.g., a pair of fins) spaced apart from one another and adjacent the front recess 234 and the rear recess 236, respectively. In embodiments, the outer recess 238 has a constant thickness extending between the front surface 222 and the rear surface 224 such that the first fin 240 and the second fin 242 extend parallel to one another from the outer surface 226 toward the inner surface 230.

In embodiments, an inner recess 244 is formed in the upper surface 220 and the inner surface 230 of the hip support base frame 216 to define a third fin 246, which separates the outer recess 238 and the inner recess 244. The third fin 246 extends perpendicular to the first fin 240 and the second fin 242. It should be appreciated that upper surfaces of each of the first fin 240, the second fin 242, and the third fin 246 define the upper surface 220 of the hip support base frame 216 and the particular portion of the hip support base frame 216 that will support the hip support exterior plate 204 when secured to the hip support base frame 216. In embodiments, a groove 248 is formed within the outer recess 238 of the hip support base frame 216 between the first fin 240 and the second fin 242. The groove 248 extends from the outer surface 226 of the hip support base frame 216 to the third fin 246 at the upper surface 220 of the hip support base frame 216.

It should be appreciated that the front recess 234, the rear recess 236, the outer recess 238, and the inner recess 244 formed in the hip support base frame 216 aid in reducing an overall weight of the hip support base frame 216 and, thus, reduce overall material costs during manufacturing. However, it should be appreciated that embodiments are contemplated in which the front recess 234, the rear recess 236, the outer recess 238, and the inner recess 244 are not formed in the hip support base frame 216. In other embodiments, additional recesses, cavities, apertures, and the like may be formed in any portion of the hip support base frame 216, such as within the first fin 240, the second fin 242, and the third fin 246, to further reduce material costs in forming the hip support base frame 216.

Figure 6:
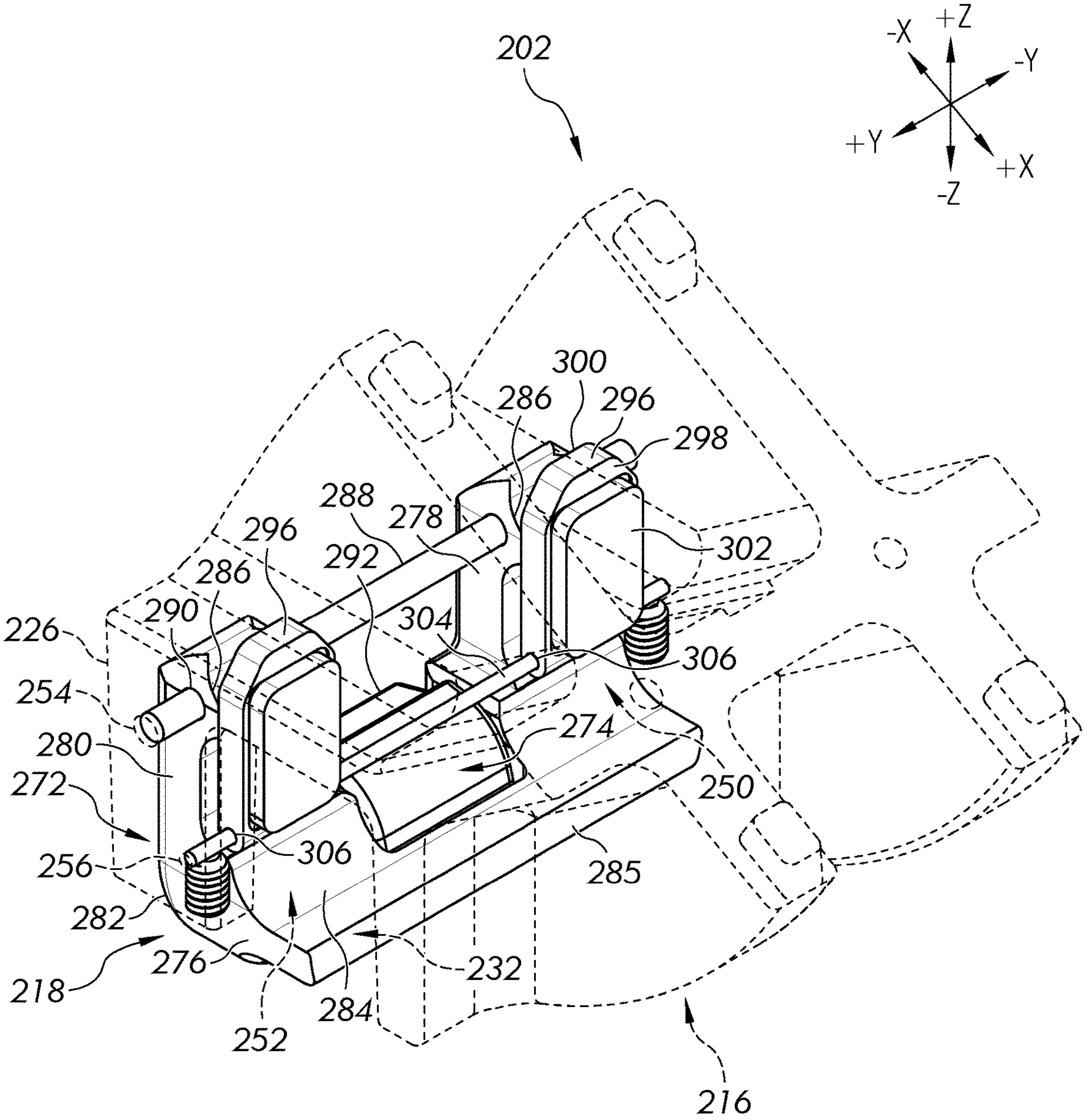
FIG. 6 schematically depicts a perspective view of the hip support base of the hip support assembly of FIG. 1 with a hip support base frame shown in phantom, according to one or more embodiments shown or described herein.

In embodiments, a first slot 250 and a second slot 252 are formed in the outer surface 226 and the lower surface 228 of the hip support base frame 216 for receiving the locking member 218, as described in more detail herein. The first slot 250 and the second slot 252 are spaced apart from one another such that the first slot 250 is formed closer to the front surface 222 and the second slot 252 is formed closer to the rear surface 224. As depicted in FIG. 6, the first slot 250 and the second slot 252 are open to the longitudinal channel 232 such that a portion of the locking member 218 may contact the first side rail 132 to assist in retaining the hip support base frame 216 on the first side rail 132, as discussed in more detail herein. Referring again to FIG. 4, a first pivot hole 254 is formed to extend through the entire hip support base frame 216 from the front surface 222 to the rear surface 224. Additionally, a second pivot hole 256 is formed to extend through the entire hip support base frame 216 from the front surface 222 to the rear surface 224 and is located between the first pivot hole 254 and the lower surface 228 of the hip support base frame 216. Accordingly, the first pivot hole 254 is located closer to the upper surface 220 than the second pivot hole 256. Additionally, a distance between the second pivot hole 256 and the longitudinal channel 232 is less than a distance between the first pivot hole 254 and the longitudinal channel 232. Stated another way, the second pivot hole 256 is located closer to the longitudinal channel 232 than the first pivot hole 254. Accordingly, the first pivot hole 254 is located closer to the outer surface 226 than the second pivot hole 256.

In embodiments, one or more protrusions 258 are formed on the upper surface 220 of the hip support base frame 216 to engage the hip support exterior plate 204 (FIG. 3). As depicted in FIGS. 4 and 5, a plurality of protrusions 258 are provided. In embodiments in which the hip support base frame 216 includes the first fin 240 and the second fin 242, the plurality of protrusions 258 are formed on the upper surface 220 at the first fin 240 and the second fin 242. As depicted, a pair of protrusions 258 are formed on each of the first fin 240 and the second fin 242.

In embodiments, each protrusion 258 has a trapezoidal shape. Specifically, each protrusion 258 has a front surface 260, a rear surface 262 opposite the front surface 260, an inner surface 264 extending between the front surface 260 and the rear surface 262, an outer surface 266 opposite the inner surface 264, and an upper surface 268 opposite the upper surface 220 of the hip support base frame 216. In embodiments, the inner surface 264 of the protrusion 258 is oriented at an oblique angle relative to the outer surface 266 of the protrusion 258 to define the trapezoidal shape of the protrusion 258.

In embodiments, one or more fastener holes 270 are formed in the upper surface 220 of the hip support base frame 216. As shown in FIGS. 4 and 5, a fastener hole 270 is formed in the upper surface 220 of the hip support base frame 216 at each intersection of the first fin 240 and the second fin 242 with the third fin 246. Accordingly, in embodiments in which a pair of protrusions 258 are provided on each of the first fin 240 and the second fin 242, the fastener holes 270 are provided between the protrusions 258 of each pair of protrusions 258.

As depicted in FIGS. 4 and 6, the locking member 218 is partially received within the hip support base frame 216 and, particularly, within the first slot 250 and the second slot 252. The locking member 218 generally includes a handle 272 and a release lever 274.

The handle 272 includes a grip portion 276, a first arm 278 extending from a first end of the grip portion 276, and a second arm 280 extending from an end of the grip portion 276 opposite the first arm 278. The handle 272 has an outer surface 282 exposed at the outer surface 226 of the hip support base frame 216 and an opposite inner surface 284. A flange 285 extends from the inner surface 284 of the handle 272 in a direction opposite the outer surface 282 of the handle 272. Additionally, a tooth 286 is formed at the inner surface 284 of the handle 272 on each of the first arm 278 and the second arm 280 proximate an end of the first arm 278 and the second arm 280 opposite the grip portion 276. Specifically, the tooth 286 protrudes in a direction opposite the outer surface 282 of the handle 272. Referring still to FIG. 6, a handle pin 288 extends through a handle hole 290 formed in the first arm 278 and the second arm 280 and through the first pivot hole 254 formed in the hip support base frame 216 to rotatably couple the handle 272 to the hip support base frame 216. The handle 272 is positionable between an engaged position, as depicted in FIGS. 4 and 6, and a disengaged position in which the grip portion 276 of the handle 272 is rotated in a direction away from the hip support base frame 216.

The release lever 274 is positioned between the first arm 278 and the second arm 280. The release lever 274 includes an engaging portion 292 and an abutment portion 294 extending substantially perpendicular to the engaging portion 292. The release lever 274 is movable relative to the grip portion 276 between an extended position, as depicted in FIGS. 4 and 6, and a depressed position. In embodiments, a biasing member is provided between the release lever 274 and the grip portion 276 to provide a biasing force against the release lever 274 to urge the release lever 274 into the extended position. To position the release lever 274 into the depressed position, the release lever 274 is pushed in the −Z-direction toward the handle 272.

In embodiments, the locking member 218 includes one or more friction pads 296. As depicted in FIG. 6, the locking member 218 includes a pair of friction pads 296 received within the first slot 250 and the second slot 252, respectively. However, it should be appreciated that the locking member 218 may include only a single friction pad 296 received within either the first slot 250 or the second slot 252, or no friction pad 296. Each friction pad 296 has an inner surface 298 and an outer surface 300 opposite the inner surface 298. A coating material 302, such as rubber, foam, or the like, is provided on the inner surface 298 of the friction pad 296 to increase gripability between the friction pad 296 and the first side rail 132 (FIG. 2) when in contact therewith. Referring still to FIG. 6, a friction pad pin 304 extends through a friction pad hole 306 formed in each of the friction pads 296 and through the second pivot hole 256 formed in the hip support base frame 216 to rotatably couple the friction pads 296 to the hip support base frame 216.

As depicted in FIGS. 4 and 6, the handle 272 is positioned in the engaged position and the release lever 274 is positioned in the depressed position such that the locking member 218 is in a locked position. With the handle 272 in the engaged position, the flange 285 is positioned below the hip support base frame 216 so as to partially overlap the longitudinal channel 232 formed in the hip support base frame 216 in the +/−Z-direction of the coordinate axes. Accordingly, when the first side rail 132 (FIG. 2) is positioned within the longitudinal channel 232, the flange 285 prevents the first hip support assembly 200A from being lifted and removed from the first side rail 132. Additionally, with the locking member 218 in the locked position, and particularly the handle 272 in the engaged position, the tooth 286 formed on the first arm 278 and the second arm 280 apply a force against a respective friction pad 296 such that the friction pads 296, and specifically the coating material 302 of each friction pad 296, comes into contact with the first side rail 132. The friction applied by the friction pads 296 against the first side rail 132 inhibits sliding of the first hip support assembly 200A along the first side rail 132 in the +/−X-direction of the coordinate axes.

To maintain the locking member 218 in the locked position, the release lever 274 is in the extended position such that the abutment portion 294 of the release lever 274 abuts against a portion of the hip support base frame 216. To move the locking member 218 into an unlocked position, the release lever 274 is moved into the depressed position by applying pressure to the release lever 274, particularly at the engaging portion 292, to move the release lever 274 in the −Z-direction. Movement of the release lever 274 in the −Z-direction moves the abutment portion 294 out of contact with the hip support base frame 216.

Thereafter, the handle 272 is permitted to rotate about the handle pin 288 such that the handle 272 rotates from the engaged position to the disengaged position. When the handle 272 is in the disengaged position, the flange 285 of the handle 272 is no longer provided below the longitudinal channel 232. By rotating the handle 272 from the engaged position to the disengaged position, the tooth 286 of the first arm 278 and the second arm 280 each moves out of contact with the friction pads 296 such that pressure against the friction pads 296 by the handle 272 is released. Thus, the friction pads 296 are permitted to rotate about the friction pad pin 304 and frictionally disengage or move out of contact with the first side rail 132 (FIG. 2).

Figure 7:
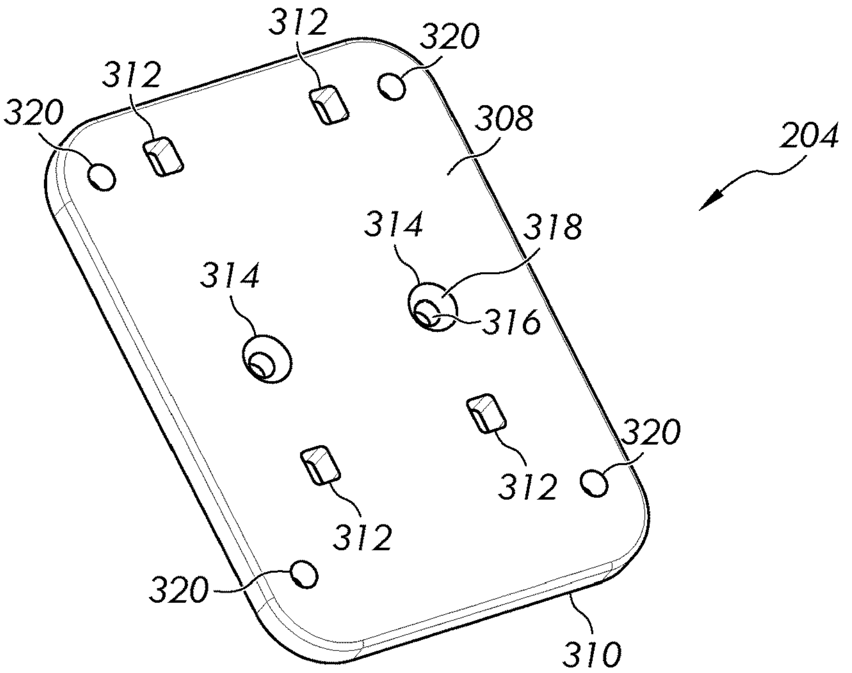
FIG. 7 schematically depicts a perspective view of a hip support exterior plate of the hip support assembly of FIG. 1, according to one or more embodiments shown or described herein.

Referring now to FIG. 7, the hip support exterior plate 204 is depicted. The hip support exterior plate 204 has a generally rectangular shape and includes an upper surface 308 and a lower surface 310 opposite the upper surface 308. However, it should be appreciated that the shape of the hip support exterior plate 204 is not limited that depicted herein. For example, the hip support exterior plate 204 may have a triangular shape, a circular shape, or any other suitable shape.

As described herein, the hip support exterior plate 204 is removably mounted onto the hip support base 202 (FIG. 3). Accordingly, the hip support exterior plate 204 has one or more holes formed therein to facilitate engagement with the hip support base frame 216. In embodiments, the hip support exterior plate 204 has one or more protrusion-receiving holes 312 formed therein. As depicted in FIG. 7, a plurality of protrusion-receiving holes 312 are formed in the hip support exterior plate 204 and extend through the upper surface 308 and the lower surface 310 of the hip support exterior plate 204. Specifically, four protrusion-receiving holes 312 are depicted corresponding to the number and location of the plurality of protrusions 258 formed on the hip support base frame 216 (FIG. 4). However, it should be appreciated that any number of protrusion-receiving holes 312 may be formed in the hip support exterior plate 204, such as two, three, or more than four. In embodiments in which the protrusions 258 of the hip support base frame 216 have a trapezoidal shape, the protrusion-receiving holes 312 have a similar shape such that each of the protrusions 258 may be received within a corresponding protrusion-receiving hole 312.

In addition, in embodiments, the hip support exterior plate 204 has one or more inner fastener holes 314 formed therein. As depicted in FIG. 7, a plurality of inner fastener holes 314 are formed in the hip support exterior plate 204 and extend through the upper surface 308 and the lower surface 310 of the hip support exterior plate 204. Specifically, two inner fastener holes 314 are depicted corresponding to the number and location of the plurality of fastener holes 270 formed on the hip support base frame 216 (FIG. 4). However, it should be appreciated that any number of inner fastener holes 314 may be formed in the hip support exterior plate 204, such as one or more than two. In embodiments, the inner fastener holes 314 define a tubular portion 316 extending from the lower surface 310 and a tapered portion 318 extending between the upper surface 308 of the hip support exterior plate 204 and the tubular portion 316. The tapered portion 318 tapers in a direction from the upper surface 308 toward the tubular portion 316.

The hip support exterior plate 204 also has one or more outer fastener holes 320 formed in therein. As depicted in FIG. 7, a plurality of outer fastener holes 320 are formed in the hip support exterior plate 204 and extend through the upper surface 308 and the lower surface 310 of the hip support exterior plate 204. Specifically, four outer fastener holes 320 are depicted. However, it should be appreciated that any number of outer fastener holes 320 may be formed in the hip support exterior plate 204, such as one, two, three, or more than four.

The hip support exterior plate 204 is removably mounted onto the hip support base 202 (FIG. 4) by positioning the hip support exterior plate 204 on the upper surface 220 of the hip support base frame 216 such that the protrusions 258 formed on the hip support base frame 216 nest within the respective protrusion-receiving holes 312 formed in the hip support exterior plate 204. As described herein, the protrusions 258 and the protrusion-receiving holes 312 may have a trapezoidal shape. As such, this ensures that the hip support exterior plate 204 is only permitted to engage the hip support base 202 in one specific orientation, for example, with the lower surface 310 of the hip support exterior plate 204 facing the hip support base 202. Thereafter, the fasteners 208 (FIG. 3) may be inserted into the inner fastener holes 314 of the hip support exterior plate 204 to further secure the hip support exterior plate 204 to the hip support base 202. Additionally, in embodiments in which the fasteners 214 include the head 210 being tapered and the inner fastener holes 314 include the tapered portion 318, the fasteners 208 may extend further into the inner fastener holes 314 to reduce a distance that the fasteners 208 extend out of the upper surface 308 of the hip support exterior plate 204.

Figure 8:
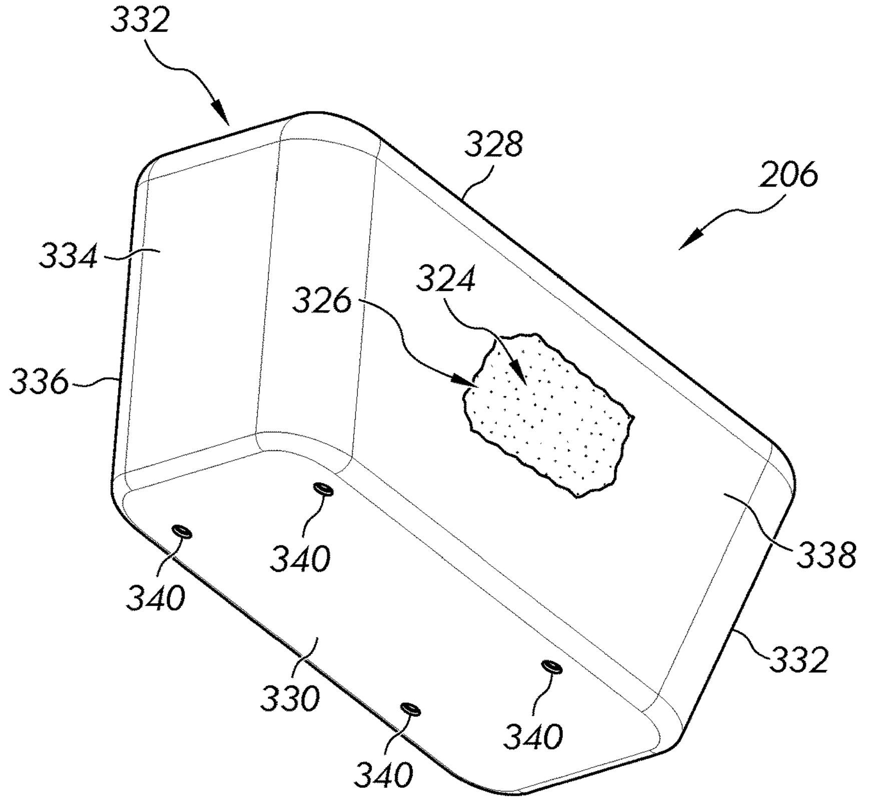
FIG. 8 schematically depicts a perspective view of a hip support pad of the hip support assembly of FIG. 1, according to one or more embodiments shown or described herein.

Referring now to FIG. 8, the hip support pad 206 is depicted. In embodiments, the hip support pad 206 includes a hip support pad shell 322 and a hip support pad cushion 324 provided within an interior 326 of the hip support pad shell 322. The hip support pad shell 322 includes an upper surface 328, a lower surface 330 opposite the upper surface 328, and one or more side surfaces extending between the upper surface 328 and the lower surface 330, such as an inner surface 332, an outer surface 334 opposite the inner surface 332, a front surface 336 extending between the inner surface 332 and the outer surface 334, and a rear surface 338 opposite the front surface 336 and extending between the inner surface 332 and the outer surface 334. In embodiments, as depicted in FIG. 8, the hip support pad shell 322 has a trapezoidal shape such that the inner surface 332 of the hip support pad shell 322 is oriented at an oblique angle relative to the outer surface 334 of the hip support pad shell 322. However, other geometries of the hip support pad shell 322 are contemplated as being within the scope of the present disclosure. For example, the hip support pad shell 322 may have a triangular shape, a rectangular shape, a circular shape, or any other suitable shape.

In embodiments, one or more fastener holes 340 are formed in the lower surface 330 of the hip support pad shell 322. As depicted in FIG. 8, a plurality of fastener holes 340 are formed in the lower surface 330 of the hip support pad shell 322. It should be appreciated that the fastener holes 340 formed in the lower surface 330 of the hip support pad shell 322 correspond to the outer fastener holes 320 formed in the hip support exterior plate 204 (FIG. 7). Accordingly, in embodiments in which the four outer fastener holes 320 are formed in the hip support exterior plate 204, four fastener holes 340 are similarly formed in the lower surface 330 of the hip support pad shell 322. Additionally, the location of the fastener holes 340 formed in the hip support pad shell 322 corresponds to the location of the outer fastener holes 320 formed in the hip support exterior plate 204 such that the fastener holes 340 in the hip support pad shell 322 align with the outer fastener holes 320 formed in the hip support exterior plate 204 when the hip support pad 206 is positioned on the hip support exterior plate 204.

As depicted in FIG. 8, a portion of the hip support pad shell 322 is removed for illustrative purposes to show the hip support pad cushion 324 provided within the interior 326 of the hip support pad shell 322. The hip support pad cushion 324 has a shape generally corresponding to the interior 326 of the hip support pad shell 322 so that the hip support pad cushion 324 fills the interior 326 of the hip support pad shell 322. Accordingly, the hip support pad cushion 324 similarly has a trapezoidal shape. However, the hip support pad cushion 324 may have any suitable shape corresponding to any shape of the hip support pad shell 322. The hip support pad cushion 324 may be formed from any suitable material such as, for example, latex, polyurethane, foam, memory foam, and the like. It should be appreciated that the hip support pad cushion 324 may be inserted into the hip support pad shell 322 through an opening, which is then closed such as by sewing or the like.

Figure 9:
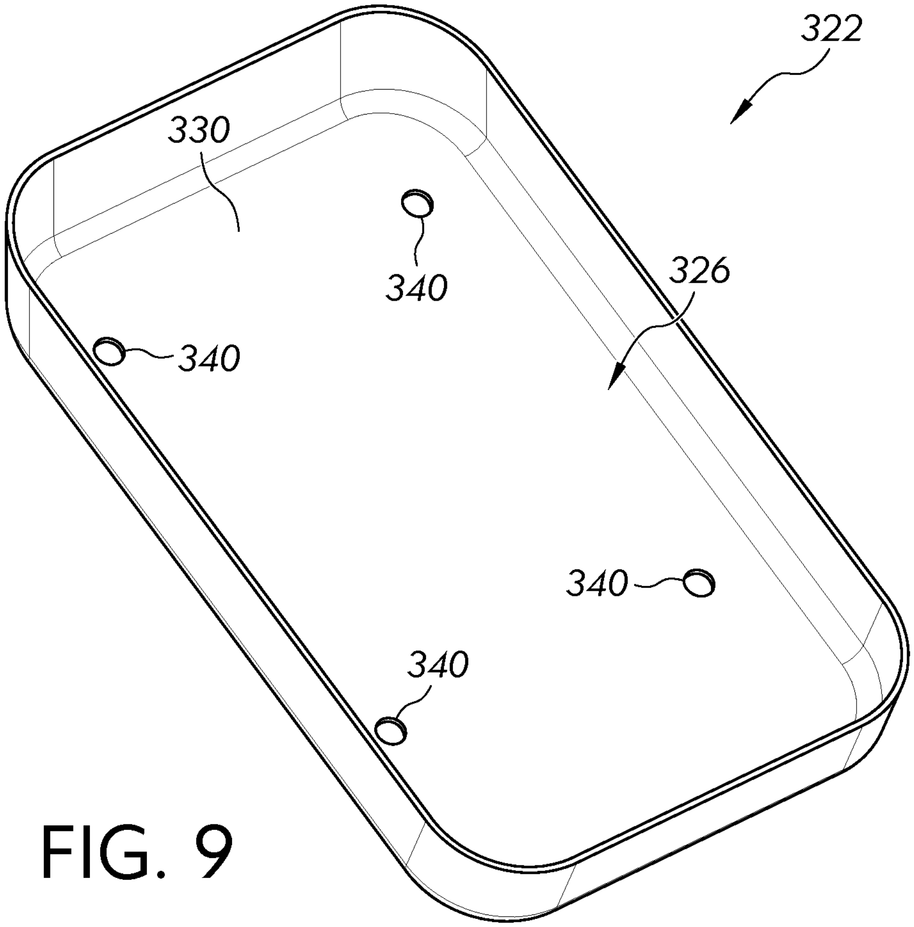
FIG. 9 schematically depicts a perspective view of a lower portion of the hip support pad of the hip support assembly of FIG. 1, according to one or more embodiments shown or described herein.

Referring now to FIG. 9, a partial view of a lower portion of the hip support pad shell 322 opposite the upper surface 328 is depicted, which partially defines the interior 326 of the hip support pad shell 322. As depicted, the fastener holes 340 extend through the lower surface 330 of the hip support pad shell 322.

Figure 10:
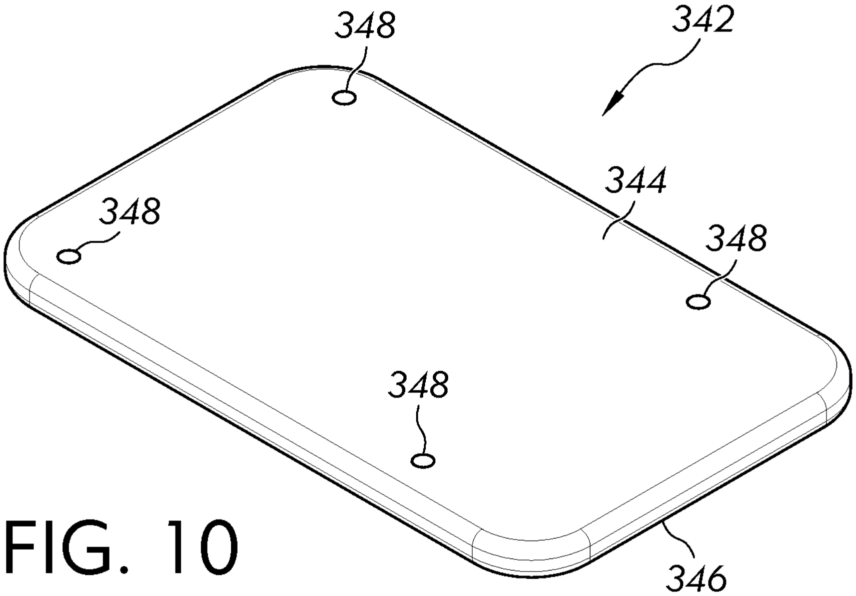
FIG. 10 schematically depicts a perspective view of a hip support pad interior plate of the hip support pad of the hip support assembly of FIG. 1, according to one or more embodiments shown or described herein.

The hip support pad 206 further includes a hip support pad interior plate 342 as depicted in FIG. 10. The hip support pad interior plate 342 has an upper surface 344, a lower surface 346 opposite the upper surface 344, and one or more fastener holes 348 extending through the upper surface 344 and the lower surface 346. As depicted in FIG. 10, a plurality of fastener holes 348 are formed in the hip support pad interior plate 342 and extend through the upper surface 344 and the lower surface 346 of the hip support pad interior plate 342. Specifically, four fastener holes 348 are depicted corresponding to the number and location of the plurality of fastener holes 340 formed on the lower surface 330 of the hip support pad shell 322 (FIG. 9), and thus similarly correspond to the number and location of the outer fastener holes 320 formed in the hip support exterior plate 204 (FIG. 7). Accordingly, in embodiments in which the four fastener holes 340 are formed in the hip support pad shell 322, four fastener holes 348 are similarly formed in the hip support pad interior plate 342.

Figure 11:
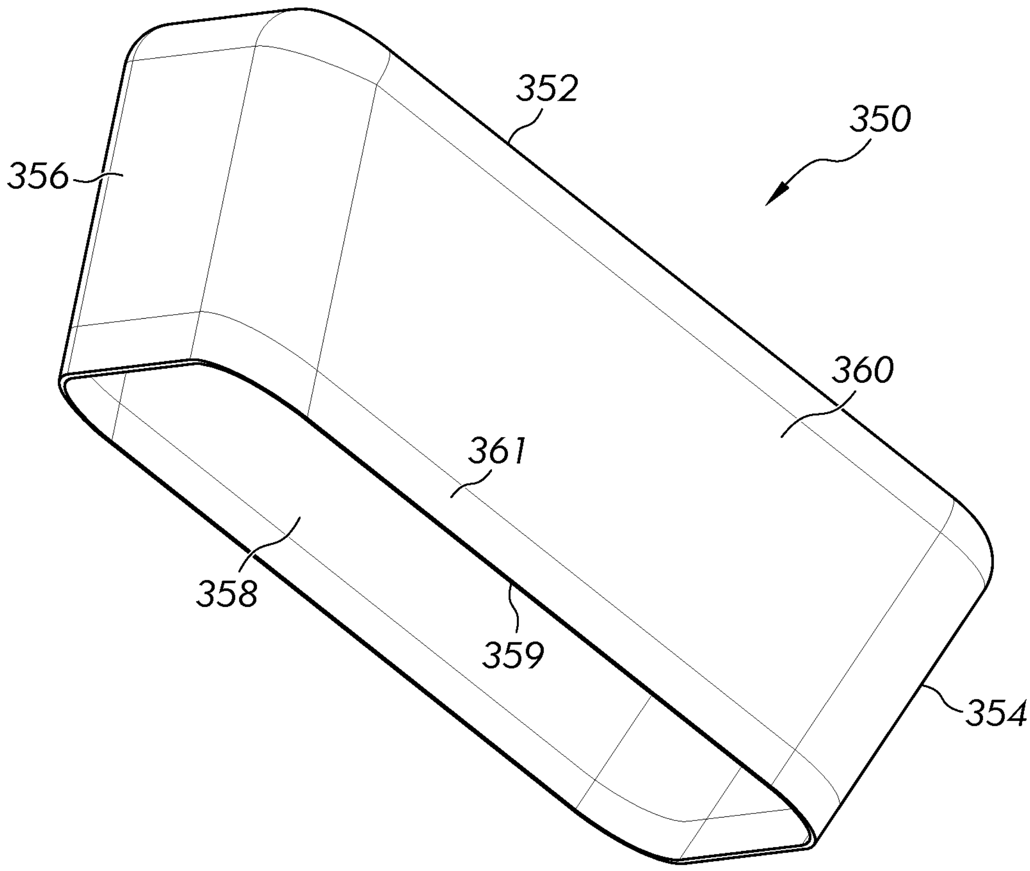
FIG. 11 schematically depicts a perspective view of a hip support pad cover of the hip support pad of the hip support assembly of FIG. 1, according to one or more embodiments shown or described herein.

In embodiments, a hip support pad cover 350 may be provided as depicted in FIG. 11. The hip support pad cover 350 includes an upper surface 352 and one or more side surfaces extending from the upper surface 352, such as an inner surface 354, an outer surface 356 opposite the inner surface 354, a front surface 358 extending between the inner surface 354 and the outer surface 356, and a rear surface 360 opposite the front surface 358 and extending between the inner surface 354 and the outer surface 356. The hip support pad cover 350 is open at a lower end 359 opposite the upper surface 352. In embodiments, the hip support pad cover 350 includes an elastic band 361 at the lower end extending around an entire perimeter of the hip support pad cover 350. The elastic band 361 facilitates retaining the hip support pad cover 350 on the hip support pad shell 322 when positioned thereon.

It should be appreciated that the hip support pad cover 350 has a shape corresponding to the shape of the hip support pad shell 322 and the hip support pad cushion 324 (FIG. 8). Accordingly, in embodiments, the hip support pad cover 350 has a trapezoidal shape such that the inner surface 354 of the hip support pad cover 350 is oriented at an oblique angle relative to the outer surface 356 of the hip support pad cover 350. However, other geometries of the hip support pad cover 350 are contemplated as being within the scope of the present disclosure. For example, the hip support pad cover 350 may have a triangular shape, a rectangular shape, a circular shape, or any other suitable shape. The hip support pad cover 350 serves as a removable sleeve to protect the hip support pad shell 322. In use, the hip support pad shell 322 is inserted through the lower end 359 of the hip support pad cover 350 to be positioned within an interior of the hip support pad cover 350.

Although not illustrated in FIG. 8, it should be understood that the hip support pad interior plate 342 (FIG. 10) is positioned within the interior 326 of the hip support pad shell 322 between the hip support pad cushion 324 and the lower surface 330 of the hip support pad shell 322 (FIG. 8). Accordingly, when the hip support pad interior plate 342 is positioned within the hip support pad shell 322, the fastener holes 348 formed in the hip support pad interior plate 342 align with the fastener holes 340 formed in the hip support pad shell 322. Additionally, the fastener holes 348 formed in the hip support pad interior plate 342 and the fastener holes 340 formed in the hip support pad shell 322 align with the outer fastener holes 320 formed in the hip support exterior plate 204 when the hip support pad 206 is positioned on the hip support exterior plate 204 (FIG. 7). Thus, to secure the hip support pad 206 to the hip support exterior plate 204, which is initially mounted to the hip support base 202 (FIG. 4) in the manner discussed herein, the hip support pad 206 is positioned onto the hip support exterior plate 204 and the fasteners 214 (FIG. 3) are inserted through the fastener holes 348 formed in the hip support pad interior plate 342, the fastener holes 340 formed in the hip support pad shell 322, and the outer fastener holes 320 formed in the hip support exterior plate 204.

It should be appreciated that the hip support base 202 is capable of accommodating any sized hip support pad so long as corresponding fastener holes align. Accordingly, the hip support pad 206 may have any suitable dimensions other than that depicted herein without deviating from the scope of the present disclosure. For example, the hip support pad 206 may be wider and/or longer than that depicted herein. However, in embodiments, a hip support assembly may include additional structure for supporting a larger hip support pad that may otherwise not be supported by the hip support base 202 depicted herein.

For example, as depicted in FIGS. 12-18, a hip support base 402 and a hip support pad 406 are depicted in which the hip support pad 406 is longer than the hip support pad 206 depicted in FIG. 8 and the hip support base 402 includes additional structure not provided in the hip support base 202 depicted in FIG. 4 for providing additional support for the hip support pad 406. However, it should be appreciated that the hip support base 402 and the hip support pad 406 depicted in FIGS. 12-18 are similar to the hip support base 202 and the hip support pad 206 depicted in FIGS. 4 and 8, and thus like reference numbers will be used to refer to like parts.

Figure 12:
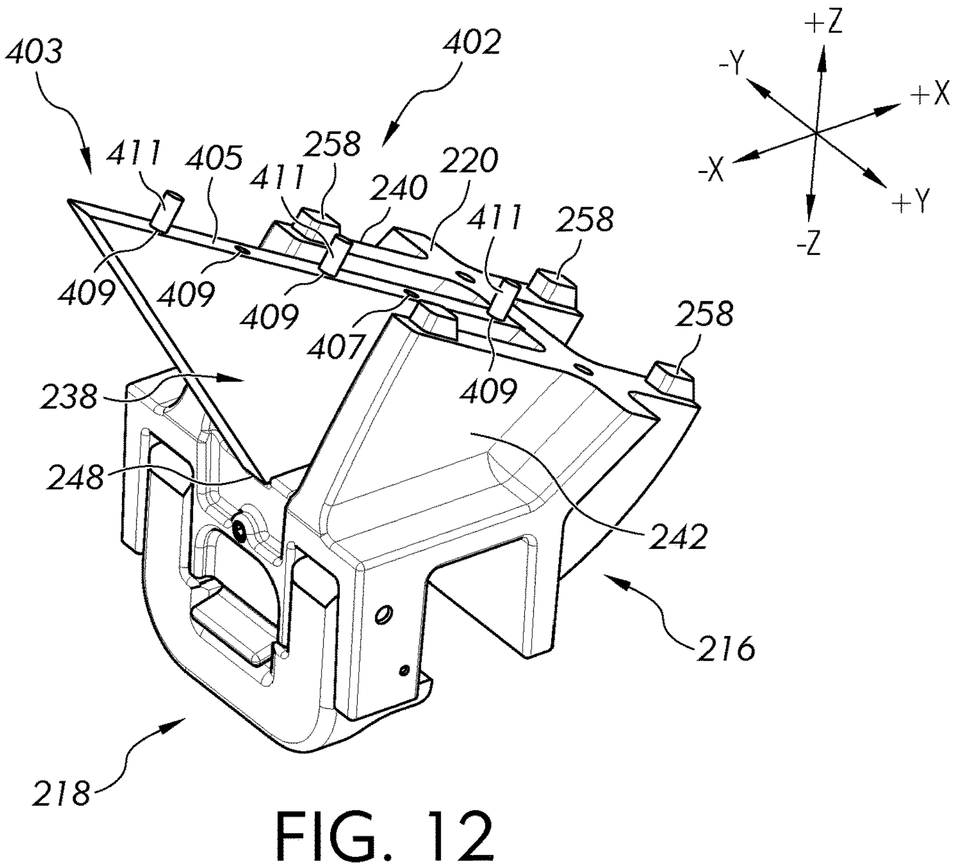
FIG. 12 schematically depicts a perspective view of another hip support base, according to one or more embodiments shown or described herein.
Figure 13:
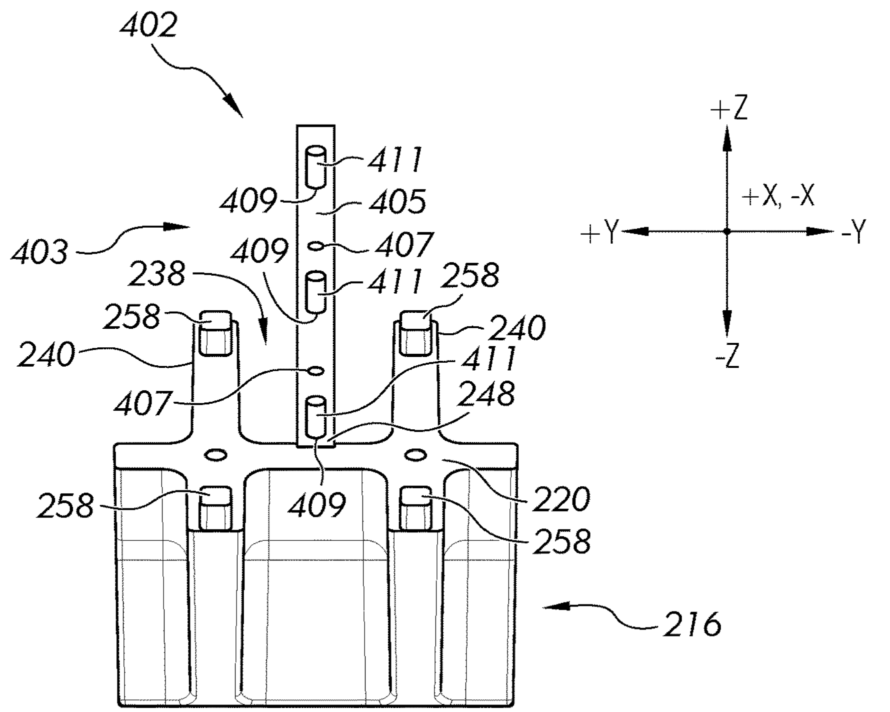
FIG. 13 schematically depicts a side view of the hip support base of FIG. 12, according to one or more embodiments shown or described herein.

Referring now to FIGS. 12 and 13, the hip support base 402 is depicted. The hip support base 402 includes the hip support base frame 216, the locking member 218, and a hip support extension 403. The hip support extension 403 is positioned at least partially between the first fin 240 and the second fin 242 of the hip support base frame 216 and is received within the groove 248 formed in the outer recess 238. In embodiments, the hip support extension 403 has a triangular shape. However, it should be appreciated that the hip support extension 403 may have any suitable shape. The hip support extension 403 has an upper surface 405 provided in the same plane as the upper surface 220 of the hip support base frame 216. In embodiments, one or more holes are formed in the upper surface 405 of the hip support extension 403. The holes may include one or more fastener holes 407 and one or more positioning holes 409. As depicted in FIGS. 12 and 13, a pair of fastener holes 407 and three positioning holes 409 are formed in the upper surface 405 of the hip support extension 403 in an alternating arrangement. However, it should be appreciated that any number of fastener holes 407 and positioning holes 409 may be provided in any arrangement. In embodiments, a pin 411 is positionable within each of the positioning holes 409. In other embodiments, the pins 411 may be integrally formed with the hip support extension 403 as a one piece, monolithic structure. As shown, in embodiments, the pins 411 have a cylindrical shape. However, it should be appreciated that the pins 411 may have any shape such as rectangular, trapezoidal, or the like.

Figure 14:
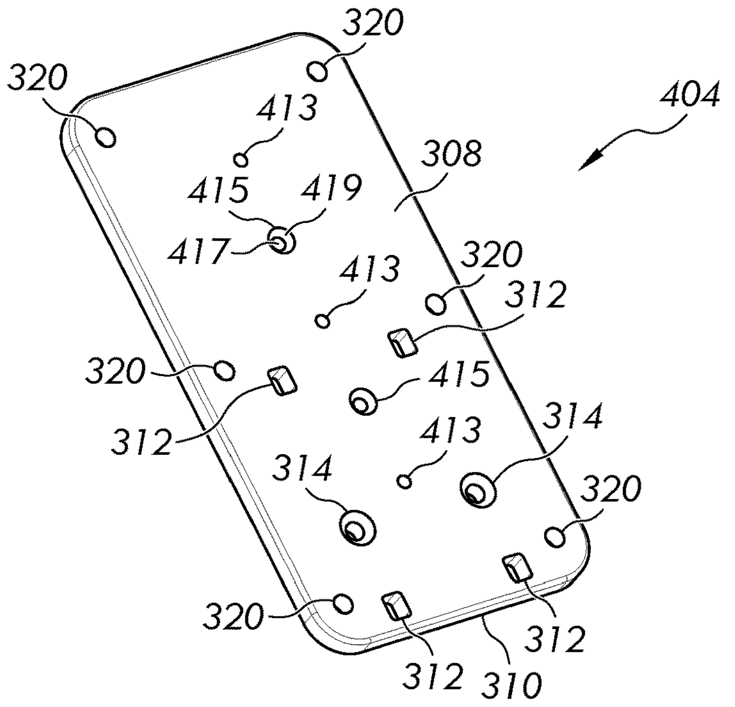
FIG. 14 schematically depicts a perspective view of another hip support exterior plate, according to one or more embodiments shown or described herein.

Referring now to FIG. 14, a hip support exterior plate 404 is depicted. The hip support exterior plate 404 is similar to the hip support exterior plate 204 depicted in FIG. 7 and, therefore, like parts will be depicted by like reference numbers. However, it should be appreciated that the hip support exterior plate 404 is longer than the hip support exterior plate 204. The hip support exterior plate 404 includes the upper surface 308 and the lower surface 310 opposite the upper surface 308.

As described in more detail herein, the hip support exterior plate 404 is removably mounted onto the hip support base 202 including the hip support extension 403 (FIG. 12). Accordingly, the hip support exterior plate 404 has one or more holes formed therein to facilitate engagement with the hip support base frame 216. Specifically, in embodiments, the hip support exterior plate 404 includes the protrusion-receiving holes 312 corresponding to the number and location of the plurality of protrusions 258 formed on the hip support base frame 216 (FIG. 12). In addition, in embodiments, the hip support exterior plate 404 includes the inner fastener holes 314 formed in the hip support exterior plate 404 corresponding to the number and location of the plurality of fastener holes 270 formed on the hip support base frame 216. In embodiments, the hip support exterior plate 404 also includes the plurality of outer fastener holes 320 formed in the hip support exterior plate 204. However, due to the increased length of the hip support exterior plate 404 as compared to the hip support exterior plate 204 (FIG. 7), the hip support exterior plate 404 includes six outer fastener holes 320 formed therein. However, it should be appreciated that any number of outer fastener holes 320 may be formed in the hip support exterior plate 404, such as more than six outer fastener holes 320.

In addition, referring still to FIG. 14, the hip support exterior plate 404 includes one or more centrally-aligned holes formed therein and extending through the upper surface 308 and the lower surface 310 of the hip support exterior plate 404. Specifically, in embodiments, the one or more centrally-aligned holes includes a plurality of pin-receiving holes 413 and a plurality of central fastener holes 415 each positioned between the outer fastener holes 320 and the protrusion-receiving holes 312. The pin-receiving holes 413 and the central fastener holes 415 may be arranged in an alternating arrangement in a length direction. As such, the pin-receiving holes 413 and the central fastener holes 415 correspond to the number and location of the positioning holes 409 (and/or pins 411) and the fastener holes 407 of the hip support extension 403 (FIG. 12), respectively. In embodiments, the central fastener holes 415 each define a tubular portion 417 extending from the lower surface 310 of the hip support exterior plate 404 and a tapered portion 419 extending between the upper surface 308 of the hip support exterior plate 404 and the tubular portion 417. The tapered portion 419 tapers in a direction from the upper surface 308 toward the tubular portion 417.

Similar to the hip support exterior plate 204, the hip support exterior plate 404 is removably mounted onto the hip support base 202 by positioning the hip support exterior plate 404 on the upper surface 220 of the hip support base frame 216 (FIG. 12) such that the protrusions 258 formed on the hip support base frame 216 nest within the respective protrusion-receiving holes 312 formed in the hip support exterior plate 404. In addition, the pins 411 of the hip support extension 403 (FIG. 12) are received within the pin-receiving holes 413 formed in the hip support exterior plate 404. Thereafter, fasteners, such as the fasteners 208 (FIG. 3), may be inserted into the inner fastener holes 314 and the central fastener holes 415 of the hip support exterior plate 404 to further secure the hip support exterior plate 404 to the hip support base 202. In embodiments in which the fasteners include a tapered head, the fasteners may extend further into the central fastener holes 415 of the hip support exterior plate 404 to reduce a distance that the fasteners extend out of the upper surface 308 of the hip support exterior plate 404.

Figure 15:
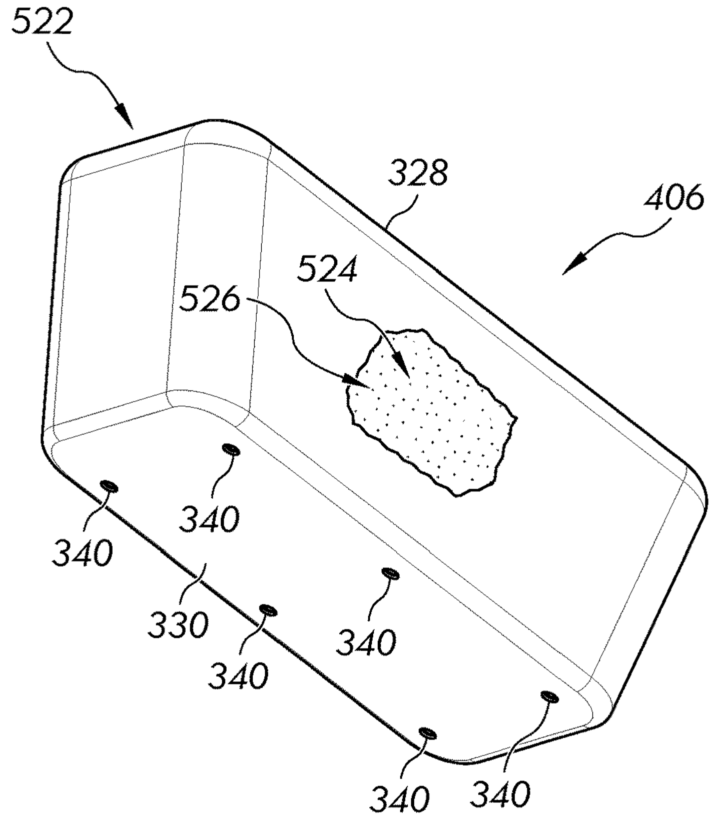
FIG. 15 schematically depicts a perspective view of another hip support pad, according to one or more embodiments shown or described herein.

Referring now to FIG. 15, a hip support pad 406 is depicted. The hip support pad 406 is similar to the hip support pad 206 depicted in FIG. 8 and, therefore, like parts will be depicted by like reference numbers. However, it should be appreciated that the hip support pad 406 is longer than the hip support pad 206.

In embodiments, the hip support pad 406 includes a hip support pad shell 522 and a hip support pad cushion 524 provided within an interior 526 of the hip support pad shell 522. As with the hip support pad shell 322 (FIG. 11), the hip support pad shell 522 includes the upper surface 328, the lower surface 330 opposite the upper surface 328, and one or more side surfaces extending between the upper surface 328 and the lower surface 330.

Figure 16:
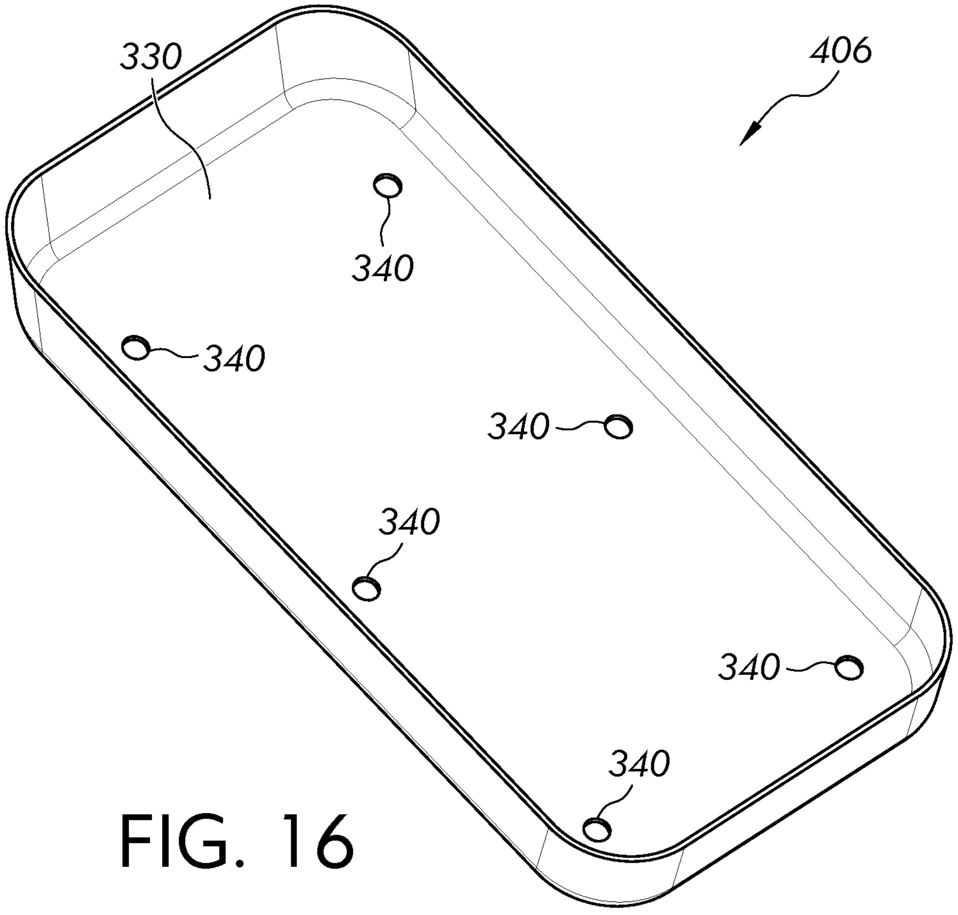
FIG. 16 schematically depicts a perspective view of a lower portion of the hip support pad of FIG. 15, according to one or more embodiments shown or described herein.

In embodiments, as depicted in FIGS. 15 and 16, the hip support pad shell 522 includes the fastener holes 340 formed in the lower surface 330 of the hip support pad shell 522. However, due to the increased length of the hip support pad 406 as compared to the hip support pad 206 (FIG. 8), the hip support pad shell 522 includes six fastener holes 340 formed therein corresponding to the number and location of the outer fastener holes 320 formed in the hip support exterior plate 404 (FIG. 14). However, it should be appreciated that any number of fastener holes 340 may be formed in the hip support pad shell 522, such as more than six fastener holes 340.

As depicted in FIG. 15, a portion of the hip support pad shell 522 is removed for illustrative purposes to show the hip support pad cushion 524 provided within the interior 526 of the hip support pad shell 522. The hip support pad cushion 524 is similar to the hip support pad cushion 324 (FIG. 8) other than that the hip support pad cushion 524 is longer than the hip support pad cushion 324.

Figure 17:
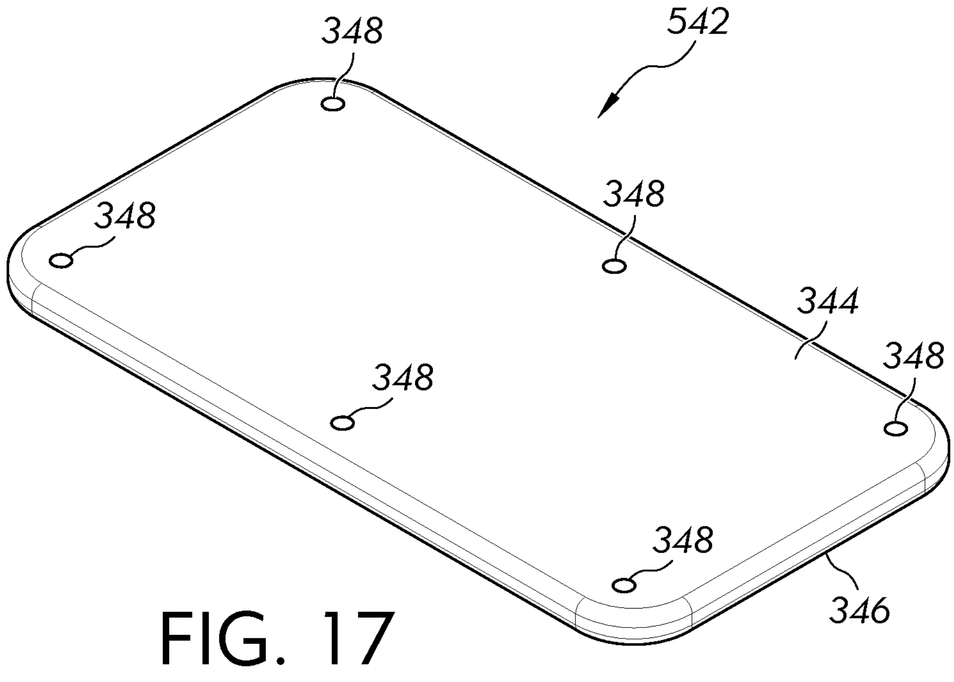
FIG. 17 schematically depicts a perspective view of another hip support pad interior plate of the hip support pad of FIG. 15, according to one or more embodiments shown or described herein.

The hip support pad 406 further includes a hip support pad interior plate 542 as depicted in FIG. 17. Similar to the hip support pad interior plate 342 (FIG. 10), the hip support pad interior plate 542 includes the upper surface 344, the lower surface 346 opposite the upper surface 344, and the one or more fastener holes 348 extending through the upper surface 344 and the lower surface 346. However, due to the length of the hip support pad interior plate 542 being longer than the length of the hip support pad interior plate 342, six fastener holes 348 are depicted corresponding to the number and location of the plurality of fastener holes 340 formed on the lower surface 330 of the hip support pad shell 522 (FIG. 15), and thus similarly correspond to the number and location of the outer fastener holes 320 formed in the hip support exterior plate 404 (FIG. 14). Accordingly, in embodiments in which the six fastener holes 340 are formed in the hip support pad shell 522, six fastener holes 348 are similarly formed in the hip support pad interior plate 542.

Figure 18:
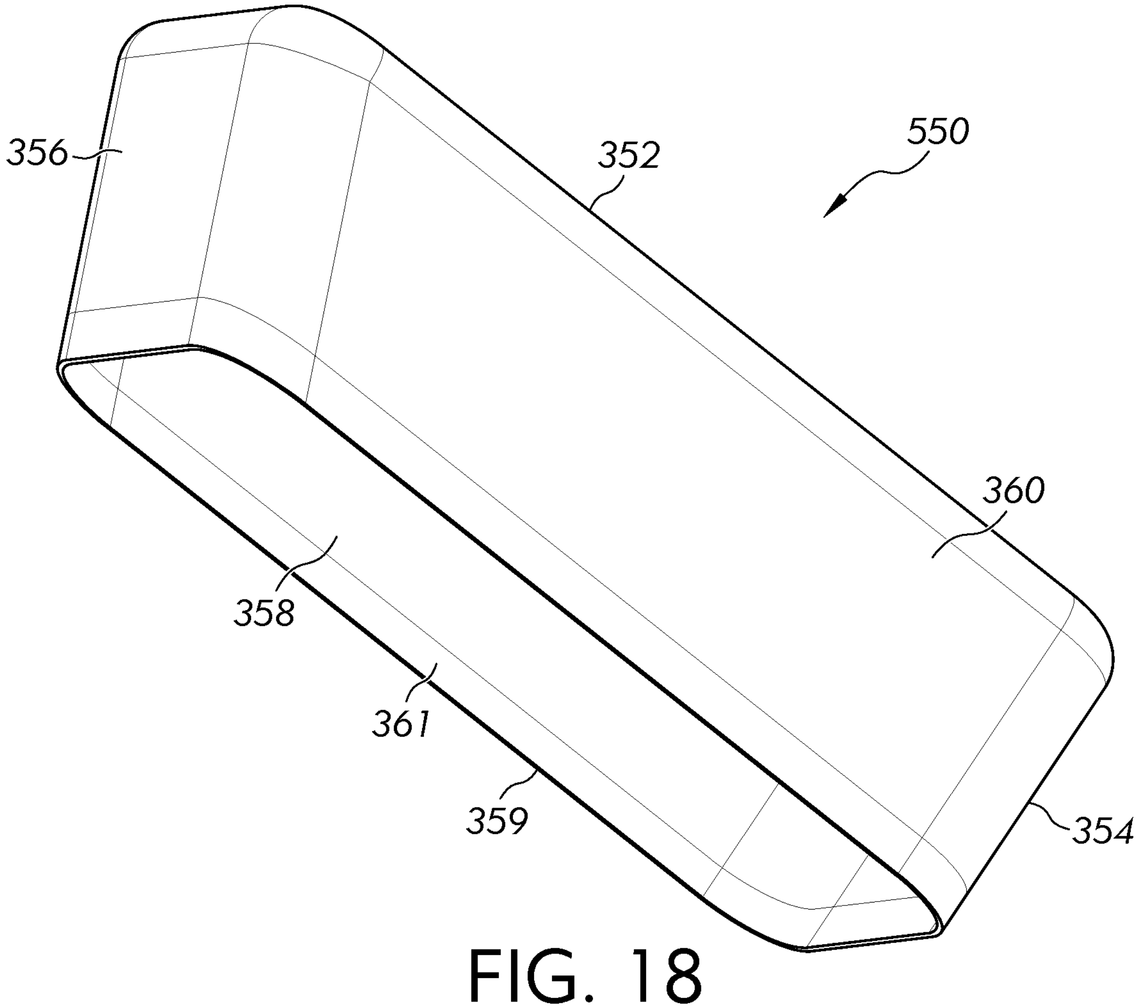
FIG. 18 schematically depicts a perspective view of another hip support pad cover of the hip support pad of FIG. 15, according to one or more embodiments shown or described herein.

In embodiments, a hip support pad cover 550 may be provided as depicted in FIG. 18. The hip support pad cover 550 is similar to the hip support pad cover 350 (FIG. 11). However, the length of the hip support pad cover 550 is longer than the length of the hip support pad cover 350. As such, the hip support pad cover 550 includes the upper surface 352 and one or more side surfaces extending from the upper surface 352, such as the inner surface 354, the outer surface 356 opposite the inner surface 354, the front surface 358 extending between the inner surface 354 and the outer surface 356, and the rear surface 360 opposite the front surface 358 and extending between the inner surface 354 and the outer surface 356. The hip support pad cover 350 is open at the lower end 359 opposite the upper surface 352. The hip support pad cover 550 includes the elastic band 361 at the lower end 359 extending around an entire perimeter of the hip support pad cover 550.

Although not illustrated in FIG. 15, it should be understood that the hip support pad interior plate 542 (FIG. 17) is positioned within the interior 526 of the hip support pad shell 522 between the hip support pad cushion 524 and the lower surface 330 of the hip support pad shell 522 (FIG. 15). Accordingly, when the hip support pad interior plate 542 is positioned within the hip support pad shell 522, the fastener holes 348 formed in the hip support pad interior plate 542 align with the fastener holes 340 formed in the hip support pad shell 522. Additionally, the fastener holes 348 formed in the hip support pad interior plate 542 and the fastener holes 340 formed in the hip support pad shell 522 align with the outer fastener holes 320 formed in the hip support exterior plate 404 when the hip support pad 406 is positioned on the hip support exterior plate 404 (FIG. 14). Thus, to secure the hip support pad 406 to the hip support exterior plate 404, which is initially mounted to the hip support base 402 (FIG. 12) in the manner discussed herein, the hip support pad 406 is positioned onto the hip support exterior plate 404 and the fasteners are inserted through the fastener holes 348 formed in the hip support pad interior plate 542, the fastener holes 340 formed in the hip support pad shell 522, and the outer fastener holes 320 formed in the hip support exterior plate 404.

Accordingly, it should be appreciated that the hip support base 402 is capable of supporting a hip support pad having any suitable length based upon the particular hip support exterior plate provided and whether the hip support extension 403 is provided. For example, the hip support base 402 may support either the hip support pad 206 (FIG. 8) or the hip support pad 406 (FIG. 15). Additionally, hip support pads having dimensions and shapes other than that depicted herein may be attached to and supported by the hip support base 402.

Figure 19:
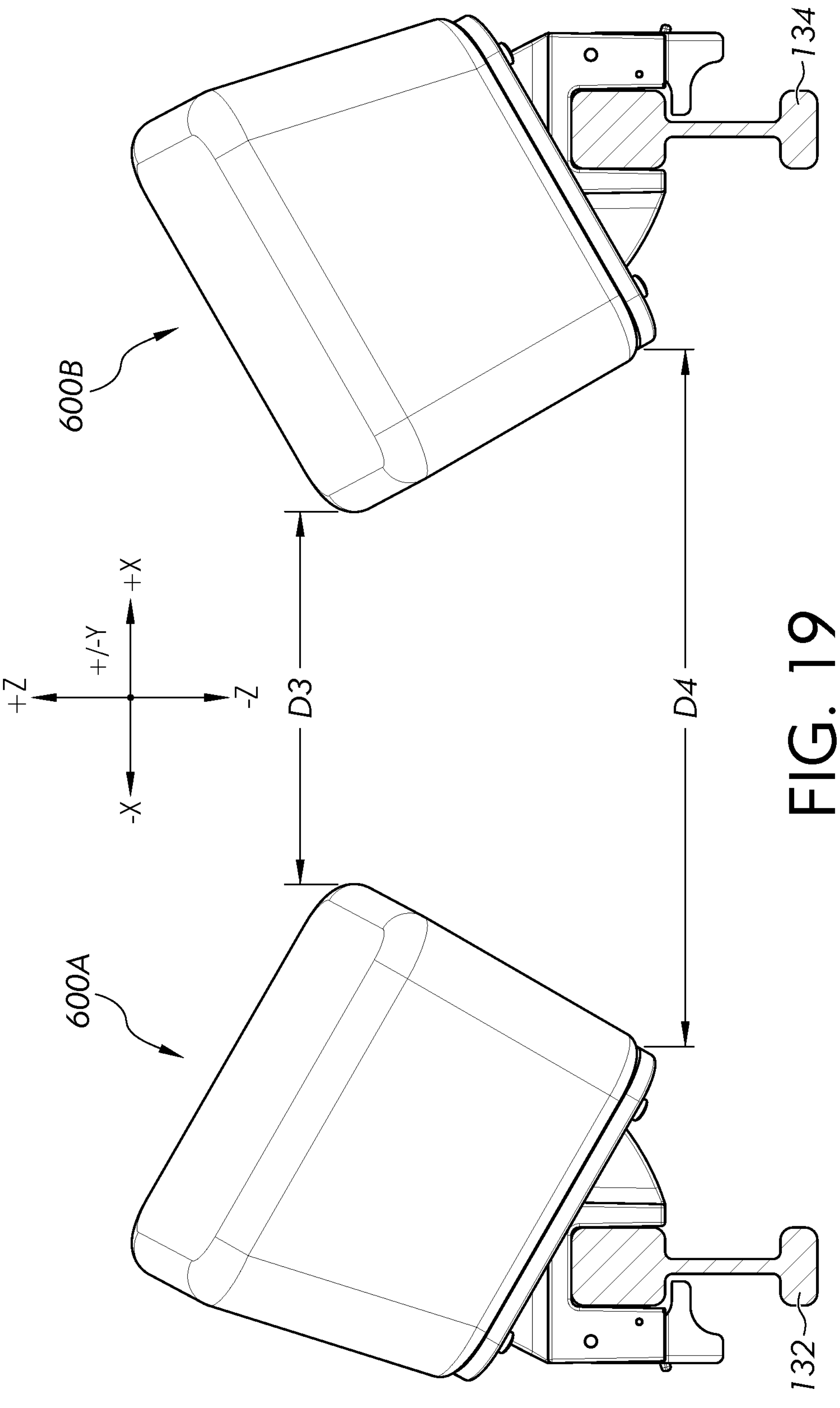
FIG. 19 schematically depicts a cross-sectional view of the pair of thigh support assemblies of FIG. 1, according to one or more embodiments shown or described herein.

Referring now to FIG. 19, the thigh support assemblies 600A, 600B are shown provided on the first side rail 132 and the second side rail 134, respectively, and spaced apart from one another in the +/−X-direction of the coordinate axes depicted in the drawings. Due to the orientation and shape of the thigh support assemblies 600A, 600B, a first distance D3 between an upper end of the thigh support assemblies 600A, 600B is less than a second distance D4 between an opposite lower end of the thigh support assemblies 600A, 600B.

Figure 20:
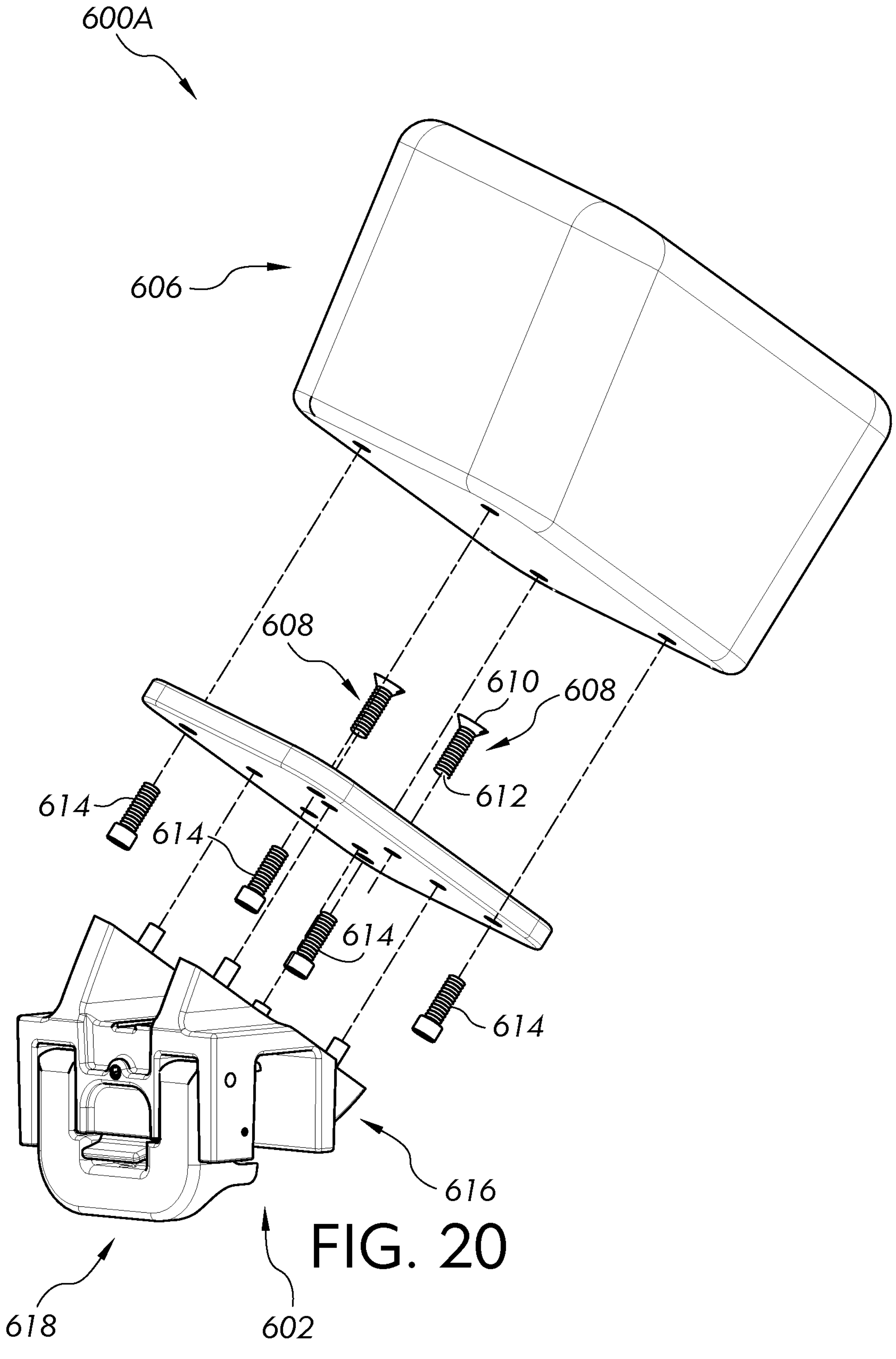
FIG. 20 schematically depicts an exploded view of the thigh support assembly of FIG. 1, according to one or more embodiments shown or described herein.

Referring now to FIG. 20, the first thigh support assembly 600A is described in more detail. However, the first thigh support assembly 600A is an identical mirror image to the second thigh support assembly 600B and, thus, only the first thigh support assembly 600A is described in detail herein and the description of the first thigh support assembly 600A is equally applicable to the second thigh support assembly 600B. Specifically, the first thigh support assembly 600A generally includes a thigh support base 602, a thigh support exterior plate 604 removably attached to the thigh support base 602, and a thigh support pad 606 removably attached to the thigh support exterior plate 604.

The first thigh support assembly 600A includes one or more fasteners 608 that secure the thigh support exterior plate 604 to the thigh support base 602. Although FIG. 20 depicts a plurality of fasteners 608 represented as threaded fasteners, it should be appreciated that any number of fasteners 608, such as non-threaded fasteners, clips, latches, and the like, may be suitable for attaching the thigh support exterior plate 604 to the thigh support base 602. In embodiments, the fasteners 608 may include a head 610 and a shaft 612 extending from the head 610. More particularly, the head 610 of the fasteners 608 may be tapered in a direction toward the shaft 612 so as to nest within the thigh support exterior plate 604 and reduce a clearance required between the thigh support exterior plate 604 and the thigh support pad 606, as described in more detail herein.

Similarly, the first thigh support assembly 600A includes one or more fasteners 614 that secure the thigh support pad 606 to the thigh support exterior plate 604. Although FIG. 20 depicts a plurality of fasteners 614 represented as threaded fasteners, it should be appreciated that any number of suitable fasteners, such as non-threaded fasteners, clips, latches, and the like, may be suitable for attaching the thigh support pad 606 to the thigh support exterior plate 604.

The thigh support base 602 includes a thigh support base frame 616 and a locking member 618 received within the thigh support base frame 616 and rotatably coupled thereto. It should be appreciated that the locking member 618 is identical to the locking member 218 of the hip support base 202 (FIG. 4) and, thus, like reference numbers will be used to refer to like parts.

As with the locking member 218, the locking member 618 is positionable between an unlocked position and a locked position, as depicted in FIG. 20, to selectively secure the thigh support base frame 616 to the longitudinal frame 130, particularly, the first side rail 132 of the longitudinal frame 130 (FIG. 19). In doing so, the thigh support base frame 616 is inhibited from being removed from the first side rail 132 of the longitudinal frame 130 and sliding along the first side rail 132 of the longitudinal frame 130 in the +/−Y-direction of the coordinate axes depicted in the drawings.

Figure 21:
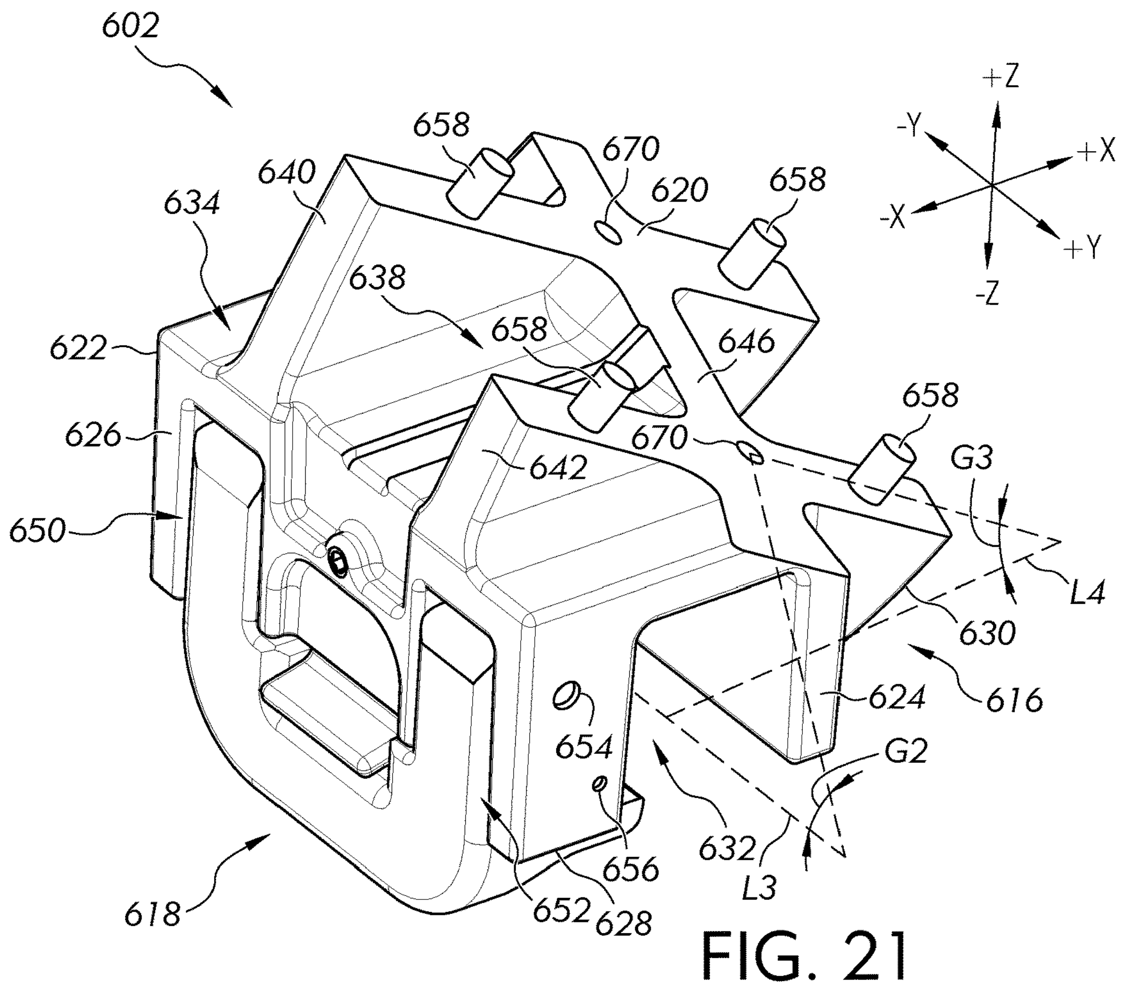
FIG. 21 schematically depicts a perspective view of a thigh support base of the thigh support assembly of FIG. 1, according to one or more embodiments shown or described herein.
Figure 22:
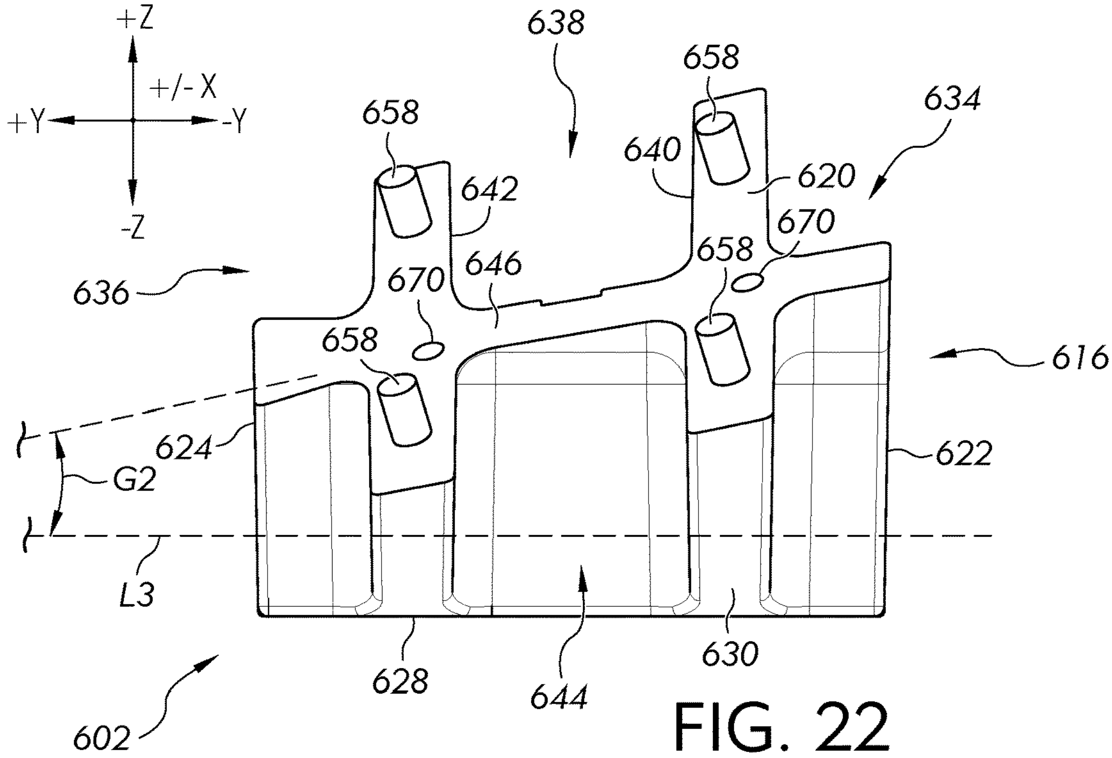
FIG. 22 schematically depicts a side view of the thigh support base of the thigh support assembly of FIG. 1, according to one or more embodiments shown or described herein.

Referring now to FIGS. 21 and 22, the thigh support base 602 including the thigh support base frame 616 and the locking member 618 is depicted. The thigh support base frame 616 includes an upper surface 620, a front surface 622, a rear surface 624 opposite the front surface 622, an outer surface 626, a lower surface 628 opposite the upper surface 620, and an inner surface 630 opposite the outer surface 626. The front surface 622 and the rear surface 624 are spaced apart from one another and extend between the upper surface 620, the lower surface 628, the outer surface 626, and the inner surface 630. As such, the outer surface 626 and the inner surface 630 each extend between the upper surface 620, the front surface 622, the rear surface 624, and the lower surface 628.

A longitudinal channel 632 is formed within the thigh support base frame 616 and extends through the front surface 622 and the rear surface 624 of the thigh support base frame 616. The longitudinal channel 632 is open at the lower surface 628 of the thigh support base frame 616 to permit the thigh support base 602 to be lowered onto the first side rail 132 of the longitudinal frame 130 (FIG. 2). In embodiments, the longitudinal channel 632 has a rectangular cross-section corresponding to a cross-section of the first side rail 132. The longitudinal channel 632 defines a longitudinal axis L3 extending parallel to the Y-axis of the coordinate axes and a lateral axis LA extending perpendicular to the longitudinal axis L3 of the longitudinal channel 632, and thus parallel to the X-axis of the coordinate axes. The upper surface 620 of the thigh support base frame 616 is oriented at an acute angle G2 relative to the longitudinal axis L3 and an acute angle G3 relative to the lateral axis L4 of the longitudinal channel 632. Stated another way, the upper surface 620 of the thigh support base frame 616 is oriented at an acute angle relative to each of the horizontal plane (X-Y plane) and the vertical plane (X-Z plane). In embodiments, the acute angle G2, G3 are equal to or greater than 10 degrees and less than or equal to 80 degrees. In embodiments, the acute angles G2, G3 are equal to or greater than 20 degrees and less than or equal to 70 degrees. In embodiments, the acute angles G2, G3 are equal to or greater than 40 degrees and less than or equal to 60 degrees. It should be appreciated that the acute angle G2 may not be equal to the acute angle G3.

In embodiments, a front recess 634 is formed at an upper portion of the front surface 622 of the thigh support base frame 616 and extends in a direction toward the rear surface 624 of the thigh support base frame 616. Similarly, in embodiments, a rear recess 636 is formed at an upper portion of the rear surface 624 of the thigh support base frame 616 and extends in a direction toward the front surface 622 of the thigh support base frame 616. Additionally, in embodiments, an outer recess 638 is formed in the upper surface 620 and the outer surface 626 of the thigh support base frame 616 to define a first fin 640 and a second fin 642 spaced apart from one another and adjacent the front recess 634 and the rear recess 636, respectively. In embodiments, the outer recess 638 has a constant thickness extending between the front surface 622 and the rear surface 624 such that the first fin 640 and the second fin 642 extend parallel to one another from the outer surface 626 toward the inner surface 630.

In embodiments, an inner recess 644 is formed in the upper surface 620 and the inner surface 630 of the thigh support base frame 616 to define a third fin 646, which separates the outer recess 638 and the inner recess 644. The third fin 646 extends perpendicular to the first fin 640 and the second fin 642. It should be appreciated that upper surfaces of each of the first fin 640, the second fin 642, and the third fin 646 define the upper surface 620 of the thigh support base frame 616 and the particular portion of the thigh support base frame 616 that will support the thigh support exterior plate 604 when secured to the thigh support base frame 616.

It should be appreciated that the front recess 634, the rear recess 636, the outer recess 638, and the inner recess 644 formed in the thigh support base frame 616 aid in reducing an overall weight of the thigh support base frame 616 and, thus, reduce overall material costs during manufacturing. However, it should be appreciated that embodiments are contemplated in which the front recess 634, the rear recess 636, the outer recess 638, and the inner recess 644 are not formed in the thigh support base frame 616. In other embodiments, additional recesses, cavities, apertures, and the like may be formed in any portion of the thigh support base frame 616, such as within the first fin 640, the second fin 642, and the third fin 646, to further reduce material costs in forming the thigh support base frame 616.

Figure 23:
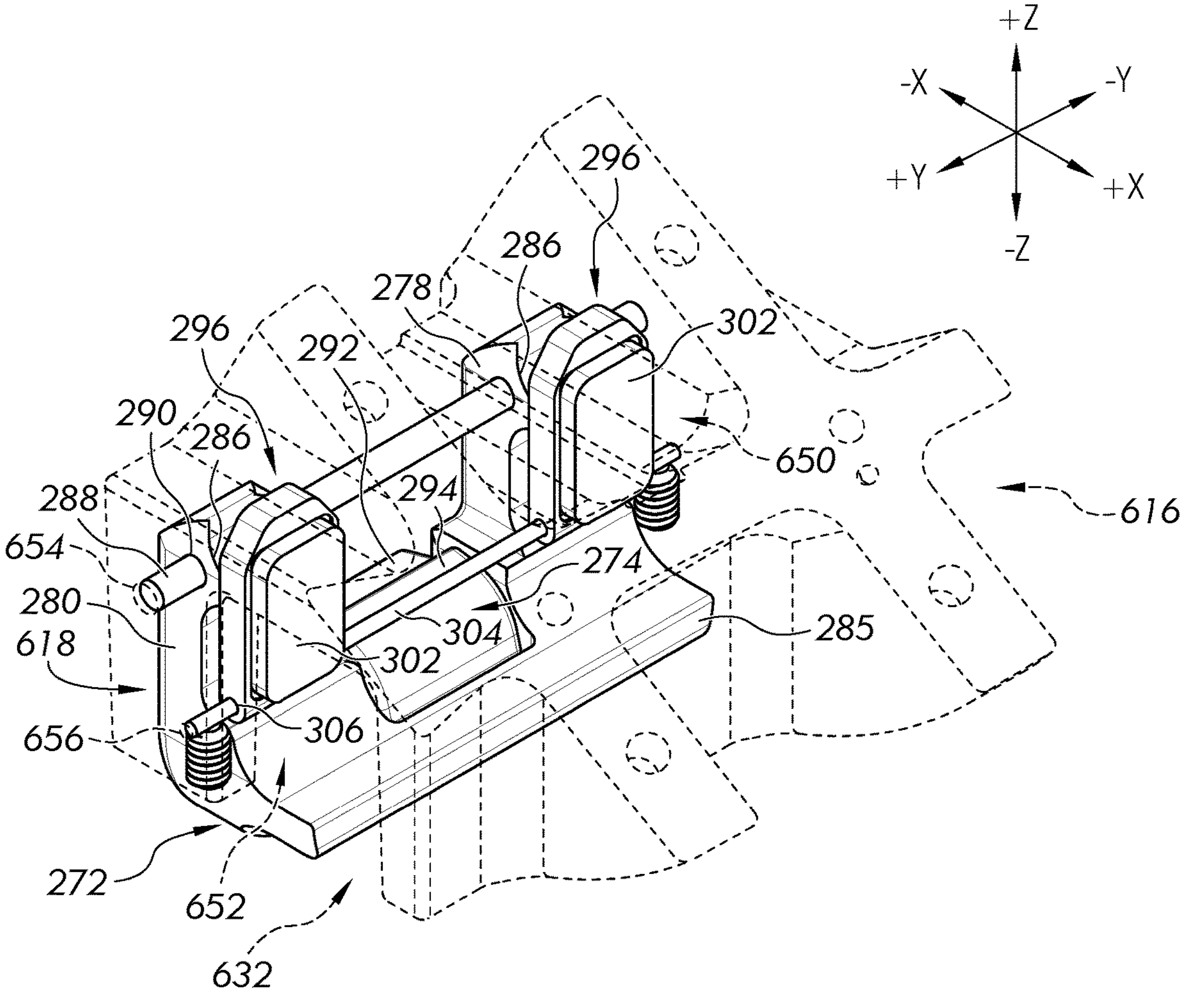
FIG. 23 schematically depicts a perspective view of the thigh support base of the thigh support assembly of FIG. 1 with a hip support base frame shown in phantom, according to one or more embodiments shown or described herein.

In embodiments, a first slot 650 and a second slot 652 are formed in the outer surface 626 and the lower surface 628 of the thigh support base frame 616 for receiving the locking member 618, as described in more detail herein. The first slot 650 and the second slot 652 are spaced apart from one another such that the first slot 650 is formed closer to the front surface 622 and the second slot 652 is formed closer to the rear surface 624. As depicted in FIG. 23, the first slot 650 and the second slot 652 are open to the longitudinal channel 632 such that a portion of the locking member 618 may contact the first side rail 132 (FIG. 2) to assist in retaining the thigh support base frame 616 on the first side rail 132, as discussed in more detail herein. Referring again to FIG. 21, a first pivot hole 654 is formed to extend through the entire thigh support base frame 616 from the front surface 622 to the rear surface 624. Additionally, a second pivot hole 656 is formed to extend through the entire thigh support base frame 616 from the front surface 622 to the rear surface 624 and is located between the first pivot hole 654 and the lower surface 628 of the thigh support base frame 616. Accordingly, the first pivot hole 654 is located closer to the upper surface 620 than the second pivot hole 656. Additionally, a distance between the second pivot hole 656 and the longitudinal channel 632 is less than a distance between the first pivot hole 654 and the longitudinal channel 632. Stated another way, the second pivot hole 656 is located closer to the longitudinal channel 632 than the first pivot hole 654. Accordingly, the first pivot hole 654 is located closer to the outer surface 626 than the second pivot hole 656.

In embodiments, one or more protrusions 658 are formed on the upper surface 620 of the thigh support base frame 616 to engage the thigh support exterior plate 604 (FIG. 20). As depicted in FIGS. 21 and 22, a plurality of protrusions 658 are provided. In embodiments in which the thigh support base frame 616 includes the first fin 640 and the second fin 642, the plurality of protrusions 658 are formed on the upper surface 620 at the first fin 640 and the second fin 642. As depicted, a pair of protrusions 658 are formed on each of the first fin 640 and the second fin 642.

As depicted in FIG. 21, each protrusion 658 has a cylindrical shape. However, it is contemplated that the protrusions 658 may have any suitable shape such as trapezoidal, as described herein with respect to the protrusions 258 of the hip support base frame 216.

In embodiments, one or more fastener holes 670 are formed in the upper surface 620 of the thigh support base frame 616. As shown in FIGS. 21 and 22, a fastener hole 670 is formed in the upper surface 620 of the thigh support base frame 616 at each intersection of the first fin 640 and the second fin 642 with the third fin 646. Accordingly, in embodiments in which a pair of protrusions 658 are provided on each of the first fin 640 and the second fin 642, the fastener holes 670 are provided between the protrusions 658 of each pair of protrusions 658.

As depicted in FIGS. 21 and 23, the locking member 618 is partially received within the thigh support base frame 616 and, particularly, within the first slot 650 and the second slot 652. As described herein, the locking member 618 includes the same structure as the locking member 218 and, thus, the locking member 618 will not be described in detail herein for purpose of brevity. Accordingly, the locking member 618 includes the handle 272 and the release lever 274.

As depicted in FIG. 23, the handle pin 288 extends through the handle hole 290 formed in the first arm 278 and the second arm 280 and through the first pivot hole 654 formed in the thigh support base frame 616 to rotatably couple the handle 272 to the thigh support base frame 616. The handle 272 is positionable between the engaged position, as depicted in FIGS. 21 and 23, and the disengaged position in which the grip portion 276 of the handle 272 is rotated in a direction away from the thigh support base frame 616.

In embodiments, the locking member 618 includes the friction pads 296 received within the first slot 650 and the second slot 652, respectively. The coating material 302, such as rubber, foam, or the like, is provided on the inner surface 298 of the friction pad 296 to increase a coefficient of friction between the friction pad 296 and the first side rail 132 (FIG. 2) when in contact therewith. Referring still to FIG. 23, the friction pad pin 304 extends through the friction pad hole 306 formed in each of the friction pads 296 and through the second pivot hole 656 formed in the thigh support base frame 616 to rotatably couple the friction pads 296 to the thigh support base frame 616.

As depicted in FIGS. 21 and 23, with the handle 272 in the engaged position, the flange 285 is positioned below the thigh support base frame 616 so as to partially overlap the longitudinal channel 632 formed in the thigh support base frame 616 in the +/−Z-direction of the coordinate axes. Accordingly, when the first side rail 132 (FIG. 2) is positioned within the longitudinal channel 632, the flange 285 prevents the first thigh support assembly 600A from being lifted and removed from the first side rail 132. Additionally, with the locking member 618 in the locked position, and particularly the handle 272 in the engaged position, the tooth 286 formed on the first arm 278 and the second arm 280 apply a force against a respective friction pad 296 such that the friction pads 296, and specifically the coating material 302 of each friction pad 296, comes into contact with the first side rail 132. The friction applied by the friction pads 296 against the first side rail 132 inhibits sliding of the first thigh support assembly 600A along the first side rail 132 in the +/−X-direction of the coordinate axes.

To maintain the locking member 618 in the locked position, the release lever 274 is in the extended position such that the abutment portion 294 of the release lever 274 abuts against a portion of the thigh support base frame 616. To move the locking member 618 into the unlocked position, the release lever 274 is moved into the depressed position by applying pressure to the release lever 274, particularly at the engaging portion 292, to move the release lever 274 in the −Z-direction. Movement of the release lever 274 in the −Z-direction moves the abutment portion 294 out of contact with the thigh support base frame 616.

Thereafter, the handle 272 is permitted to rotate about the handle pin 288 such that the handle 272 rotates from the engaged position to the disengaged position. When the handle 272 is in the disengaged position, the flange 285 of the handle 272 is no longer provided below the longitudinal channel 632. By rotating the handle 272 from the engaged position to the disengaged position, the tooth 286 of the first arm 278 and the second arm 280 each moves out of contact with the friction pads 296 such that pressure against the friction pads 296 by the handle 272 is released. Thus, the friction pads 296 are permitted to rotate about the friction pad pin 304 and frictionally disengage or move out of contact with the first side rail 132 (FIG. 2).

Figure 24:
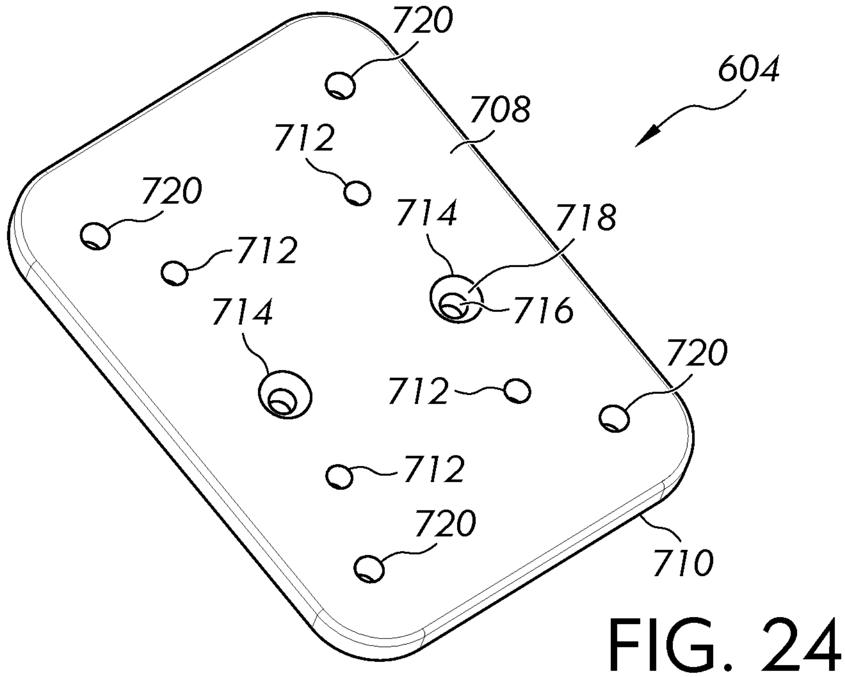
FIG. 24 schematically depicts a perspective view of a thigh support exterior plate of the thigh support assembly of FIG. 1, according to one or more embodiments shown or described herein.

Referring now to FIG. 24, the thigh support exterior plate 604 is depicted. The thigh support exterior plate 604 has a generally rectangular shape and includes an upper surface 708 and a lower surface 710 opposite the upper surface 708. However, it should be appreciated that the shape of the thigh support exterior plate 604 is not limited that depicted herein. For example, the thigh support exterior plate 604 may have a triangular shape, a circular shape, or any other suitable shape.

As described herein, the thigh support exterior plate 604 is removably mounted onto the thigh support base 602 (FIG. 20). Accordingly, the thigh support exterior plate 604 has one or more holes formed therein to facilitate engagement with the thigh support base frame 616. In embodiments, the thigh support exterior plate 604 has one or more protrusion-receiving holes 712 formed therein. As depicted in FIG. 24, a plurality of protrusion-receiving holes 712 are formed in the thigh support exterior plate 604 and extend through the upper surface 708 and the lower surface 710 of the thigh support exterior plate 604. Specifically, four protrusion-receiving holes 712 are depicted corresponding to the number and location of the plurality of protrusions 658 formed on the thigh support base frame 616. However, it should be appreciated that any number of protrusion-receiving holes 712 may be formed in the thigh support exterior plate 604, such as two, three, or more than four. In embodiments in which the protrusions 658 of the thigh support base frame 616 has a cylindrical shape, the protrusion-receiving holes 712 have a similar shape such that each of the protrusions 658 may be received within a corresponding protrusion-receiving hole 712. However, in other embodiments in which the protrusions 658 have a trapezoidal shape, the protrusion-receiving holes 712 have a similar shape as well.

In addition, in embodiments, the thigh support exterior plate 604 has one or more inner fastener holes 714 formed therein. As depicted in FIG. 24, a plurality of inner fastener holes 714 are formed in the thigh support exterior plate 604 and extend through the upper surface 708 and the lower surface 710 of the thigh support exterior plate 604. Specifically, two inner fastener holes 714 are depicted corresponding to the number and location of the plurality of fastener holes 670 formed on the thigh support base frame 616. However, it should be appreciated that any number of inner fastener holes 714 may be formed in the thigh support exterior plate 604, such as one or more than two. In embodiments, the inner fastener holes 714 define a tubular portion 716 extending from the lower surface 710 and a tapered portion 718 extending between the upper surface 708 of the thigh support exterior plate 604 and the tubular portion 716. The tapered portion 718 tapers in a direction from the upper surface 708 toward the tubular portion 716.

The thigh support exterior plate 604 also has one or more outer fastener holes 720 formed in therein. As depicted in FIG. 24, a plurality of outer fastener holes 720 are formed in the thigh support exterior plate 604 and extend through the upper surface 708 and the lower surface 710 of the thigh support exterior plate 604. Specifically, four outer fastener holes 720 are depicted. However, it should be appreciated that any number of outer fastener holes 720 may be formed in the thigh support exterior plate 604, such as one, two, three, or more than four.

The thigh support exterior plate 604 is removably mounted onto the thigh support base 602 (FIG. 21) by positioning the thigh support exterior plate 604 on the upper surface 620 of the thigh support base frame 616 such that the protrusions 658 formed on the thigh support base frame 616 nest within the respective protrusion-receiving holes 712 formed in the thigh support exterior plate 604. Thereafter, the fasteners 608 (FIG. 20) may be inserted into the inner fastener holes 714 of the thigh support exterior plate 604 to further secure the thigh support exterior plate 604 to the thigh support base 602. Additionally, in embodiments in which the fasteners 614 include the head 610 being tapered and the inner fastener holes 714 include the tapered portion 718, the fasteners 608 may extend further into the inner fastener holes 714 to reduce a distance that the fasteners 608 extend out of the upper surface 708 of the thigh support exterior plate 604.

Figure 25:
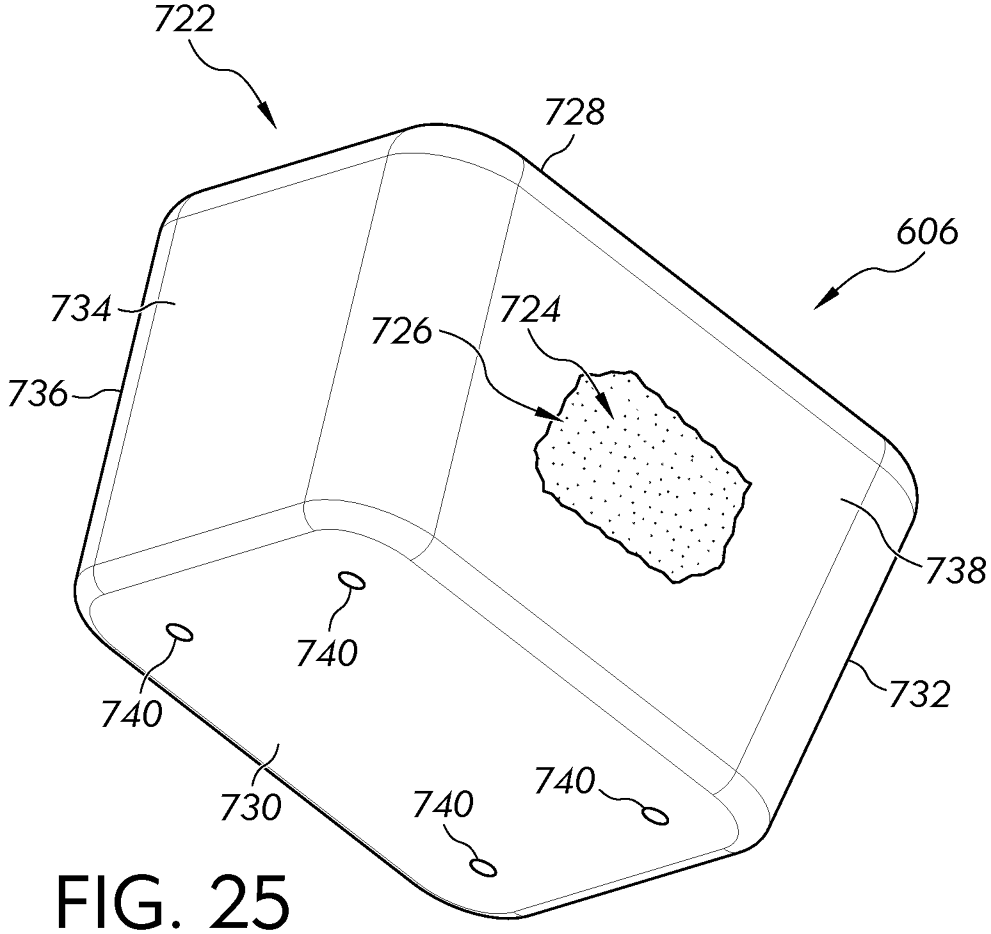
FIG. 25 schematically depicts a perspective view of a thigh support pad of the thigh support assembly of FIG. 1, according to one or more embodiments shown or described herein.

Referring now to FIG. 25, the thigh support pad 606 is depicted. In embodiments, the thigh support pad 606 includes a thigh support pad shell 722 and a thigh support pad cushion 724 provided within an interior 726 of the thigh support pad shell 722. The thigh support pad shell 722 includes an upper surface 728, a lower surface 730 opposite the upper surface 728, and one or more side surfaces extending between the upper surface 728 and the lower surface 730, such as an inner surface 732, an outer surface 734 opposite the inner surface 732, a front surface 736 extending between the inner surface 732 and the outer surface 734, and a rear surface 738 opposite the front surface 736 and extending between the inner surface 732 and the outer surface 734. In embodiments, as depicted in FIG. 25, the thigh support pad shell 722 has a trapezoidal shape such that the inner surface 732 of the thigh support pad shell 722 is oriented at an oblique angle relative to the outer surface 734 of the thigh support pad shell 722. However, other geometries of the thigh support pad shell 722 are contemplated as being within the scope of the present disclosure. For example, the thigh support pad shell 722 may have a triangular shape, a rectangular shape, a circular shape, or any other suitable shape.

In embodiments, one or more fastener holes 740 are formed in the lower surface 730 of the thigh support pad shell 722. As depicted in FIG. 25, a plurality of fastener holes 740 are formed in the lower surface 730 of the thigh support pad shell 722. It should be appreciated that the fastener holes 740 formed in the lower surface 730 of the thigh support pad shell 722 correspond to the outer fastener holes 720 formed in the thigh support exterior plate 604 (FIG. 24). Accordingly, in embodiments in which the four outer fastener holes 720 are formed in the thigh support exterior plate 604, four fastener holes 740 are similarly formed in the lower surface 730 of the thigh support pad shell 722. Additionally, the location of the fastener holes 740 formed in the thigh support pad shell 722 corresponds to the location of the outer fastener holes 720 formed in the thigh support exterior plate 604 such that the fastener holes 740 in the thigh support pad shell 722 align with the outer fastener holes 720 formed in the thigh support exterior plate 604 when the thigh support pad 606 is positioned on the thigh support exterior plate 604.

As depicted in FIG. 25, a portion of the thigh support pad shell 722 is removed for illustrative purposes to show the thigh support pad cushion 724 provided within the interior 726 of the thigh support pad shell 722. The thigh support pad cushion 724 has a shape generally corresponding to the interior 726 of the thigh support pad shell 722 so that the thigh support pad cushion 724 fills the interior 726 of the thigh support pad shell 722. Accordingly, the thigh support pad cushion 724 similarly has a trapezoidal shape. However, the thigh support pad cushion 724 may have any suitable shape corresponding to any shape of the thigh support pad shell 722. The thigh support pad cushion 724 may be formed from any suitable material such as, for example, latex, polyurethane, foam, memory foam, and the like. It should be appreciated that the thigh support pad cushion 724 may be inserted into the thigh support pad shell 722 through an opening, which is then closed such as by sewing or the like.

Figure 26:
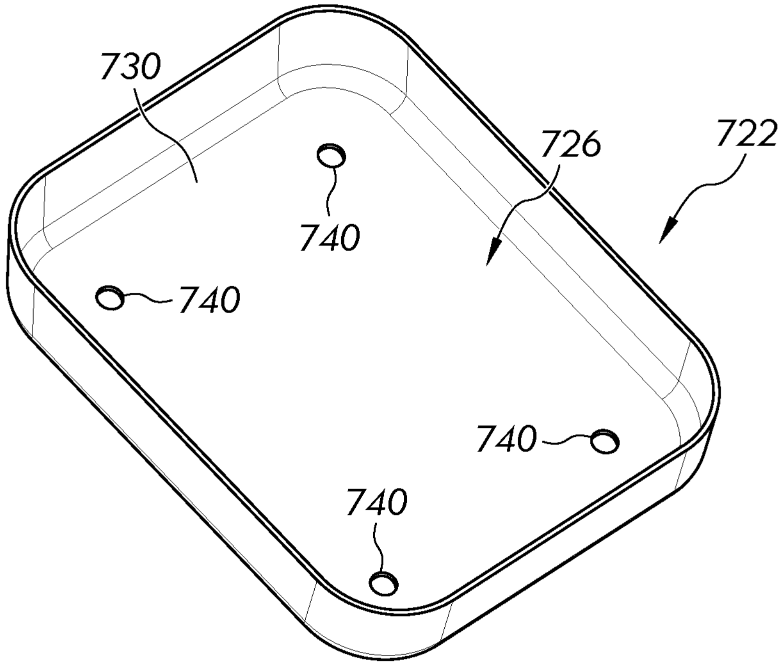
FIG. 26 schematically depicts a perspective view of a lower portion of the thigh support pad of the thigh support assembly of FIG. 1, according to one or more embodiments shown or described herein.

Referring now to FIG. 26, a partial view of a lower portion of the thigh support pad shell 722 opposite the upper surface 728 is depicted, which partially defines the interior 726 of the thigh support pad shell 722. As depicted, the fastener holes 740 extend through the lower surface 730 of the thigh support pad shell 722.

Figure 27:
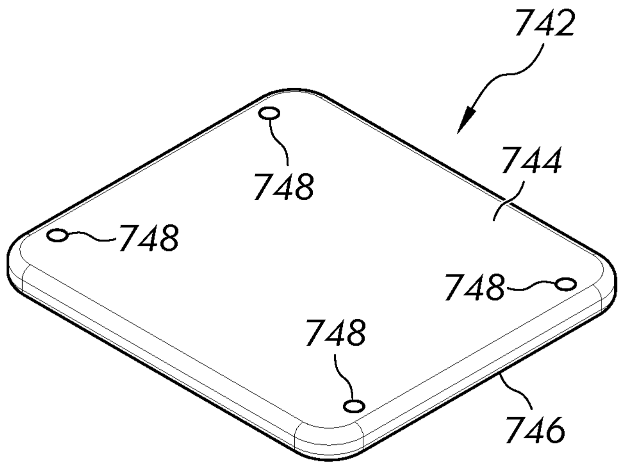
FIG. 27 schematically depicts a perspective view of a thigh support pad interior plate of the thigh support pad of the hip support assembly of FIG. 1, according to one or more embodiments shown or described herein.

The thigh support pad 606 further includes a thigh support pad interior plate 742 as depicted in FIG. 27. The thigh support pad interior plate 742 has an upper surface 744, a lower surface 746 opposite the upper surface 744, and one or more fastener holes 748 extending through the upper surface 744 and the lower surface 746. As depicted in FIG. 27, a plurality of fastener holes 748 are formed in the thigh support pad interior plate 742 and extend through the upper surface 744 and the lower surface 746 of the thigh support pad interior plate 742. Specifically, four fastener holes 748 are depicted corresponding to the number and location of the plurality of fastener holes 740 formed on the lower surface 730 of the thigh support pad shell 722 (FIG. 25), and thus similarly correspond to the number and location of the outer fastener holes 720 formed in the thigh support exterior plate 604 (FIG. 24). Accordingly, in embodiments in which the four fastener holes 740 are formed in the thigh support pad shell 722, four fastener holes 748 are similarly formed in the thigh support pad interior plate 742.

Figure 28:
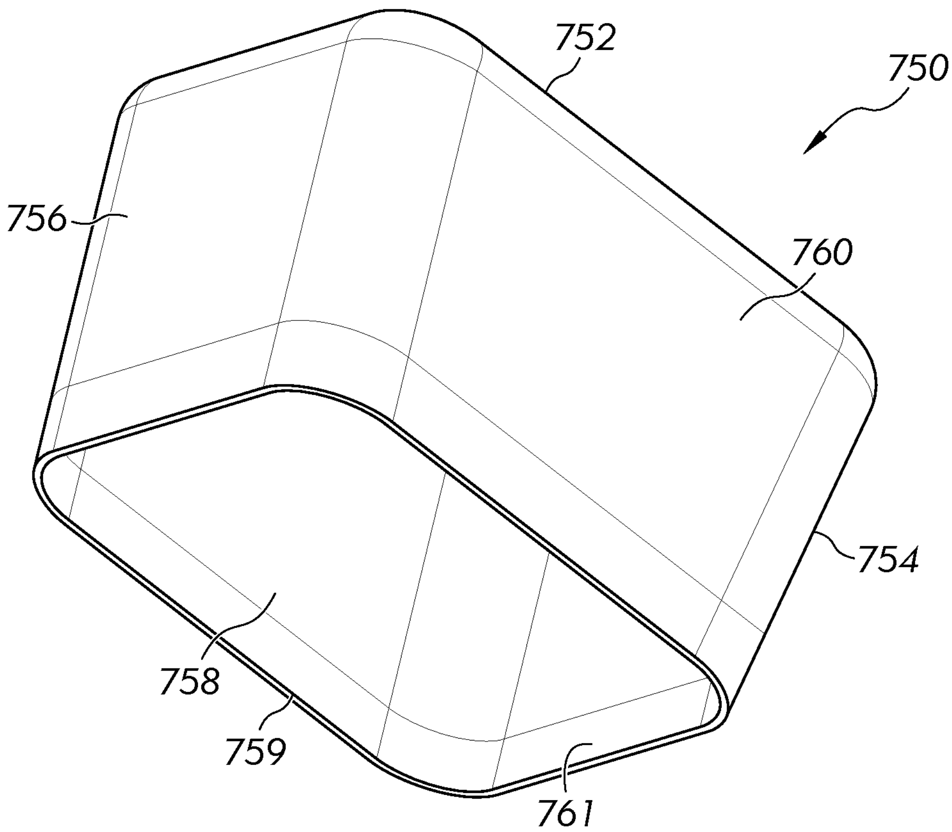
FIG. 28 schematically depicts a perspective view of a thigh support pad cover of the thigh support pad of the hip support assembly of FIG. 1, according to one or more embodiments shown or described herein.

In embodiments, a thigh support pad cover 750 may be provided as depicted in FIG. 28. The thigh support pad cover 750 includes an upper surface 752 and one or more side surfaces extending from the upper surface 752, such as an inner surface 754, an outer surface 756 opposite the inner surface 754, a front surface 758 extending between the inner surface 754 and the outer surface 756, and a rear surface 760 opposite the front surface 758 and extending between the inner surface 754 and the outer surface 756. The thigh support pad cover 750 is open at a lower end 759 opposite the upper surface 752. In embodiments, the thigh support pad cover 750 includes an elastic band 761 at the lower end 759 extending around an entire perimeter of the thigh support pad cover 750. The elastic band 761 facilitates retaining the thigh support pad cover 750 on the thigh support pad shell 722 when positioned thereon.

It should be appreciated that the thigh support pad cover 750 has a shape corresponding to the shape of the thigh support pad shell 722 and the thigh support pad cushion 724 (FIG. 25). Accordingly, in embodiments, the thigh support pad cover 750 has a trapezoidal shape such that the inner surface 754 of the thigh support pad cover 750 is oriented at an oblique angle relative to the outer surface 756 of the thigh support pad cover 750. However, other geometries of the thigh support pad cover 750 are contemplated as being within the scope of the present disclosure. For example, the thigh support pad cover 750 may have a triangular shape, a rectangular shape, a circular shape, or any other suitable shape. The thigh support pad cover 750 serves as a removable sleeve to protect the thigh support pad shell 722. In use, the thigh support pad shell 722 is inserted through the lower end 759 of the thigh support pad cover 750 to be positioned within an interior of the thigh support pad cover 750.

Although not illustrated in FIG. 25, it should be understood that the thigh support pad interior plate 742 (FIG. 27) is positioned within the interior 726 of the thigh support pad shell 722 between the thigh support pad cushion 724 and the lower surface 730 of the thigh support pad shell 722. Accordingly, when the thigh support pad interior plate 742 is positioned within the thigh support pad shell 722, the fastener holes 748 formed in the thigh support pad interior plate 742 align with the fastener holes 740 formed in the thigh support pad shell 722. Additionally, the fastener holes 748 formed in the thigh support pad interior plate 742 and the fastener holes 740 formed in the thigh support pad shell 722 align with the outer fastener holes 720 formed in the thigh support exterior plate 604 (FIG. 24) when the thigh support pad 606 is positioned on the thigh support exterior plate 604. Thus, to secure the thigh support pad 606 to the thigh support exterior plate 604, which is initially mounted to the thigh support base 602 in the manner discussed herein, the thigh support pad 606 is positioned onto the thigh support exterior plate 604 and the fasteners 614 (FIG. 20) are inserted through the fastener holes 748 formed in the thigh support pad interior plate 742, the fastener holes 740 formed in the thigh support pad shell 722, and the outer fastener holes 720 formed in the thigh support exterior plate 604.

Referring now to FIG. 29, a person support apparatus 100' is depicted. The person support apparatus 100' is similar to the person support apparatus 100 depicted in FIG. 1 and, thus, like reference numbers will be used to refer to like parts. Accordingly, the person support apparatus 100' generally includes the base frame 110, the longitudinal frame 130 supported on the base frame 110, and the primary support frame 120 coupled to the longitudinal frame 130. It should be appreciated that operation of the person support apparatus 100' is the same as operation of the person support apparatus 100. Thus, the person support apparatus 100' will not be described in greater detail for purposes of brevity.

The primary support frame 120 may generally support a support deck 170' thereon. In the embodiment depicted in FIG. 29, the support deck 170' may include the head support member 172, the chest support member 174, a pair of hip/thigh support assemblies 800A, 800B, and the leg support member 180. As described herein, the head support member 172, the chest support member 174, the pair of hip/thigh support assemblies 800A, 800B, the leg support member 180 may be independently movable relative to one another in a longitudinal direction (e.g., generally along the X-axis) along the longitudinal frame 130.

As depicted in FIG. 29, the pair of hip/thigh support assemblies 800A, 800B includes a first hip/thigh support assembly 800A provided on the first side rail 132 and a second hip/thigh support assembly 800B provided on the second side rail 134. It should be appreciated that the first hip/thigh support assembly 800A is an identical mirror image to the second hip/thigh support assembly 800B and, thus, only the first hip/thigh support assembly 800A is described in detail herein and the description of the first hip/thigh support assembly 800A is equally applicable to the second hip/thigh support assembly 800B.

As discussed in more detail herein, the hip/thigh support assemblies 800A, 800B are oriented downward in a direction toward one another so as to conform to the hips and thighs of a subject positioned in a face down position on the support deck 170' of the person support apparatus 100' with the subject's head positioned at and supported by the head support member 172 and the subject's feet positioned at and supported by the leg support member 180.

Figure 30:
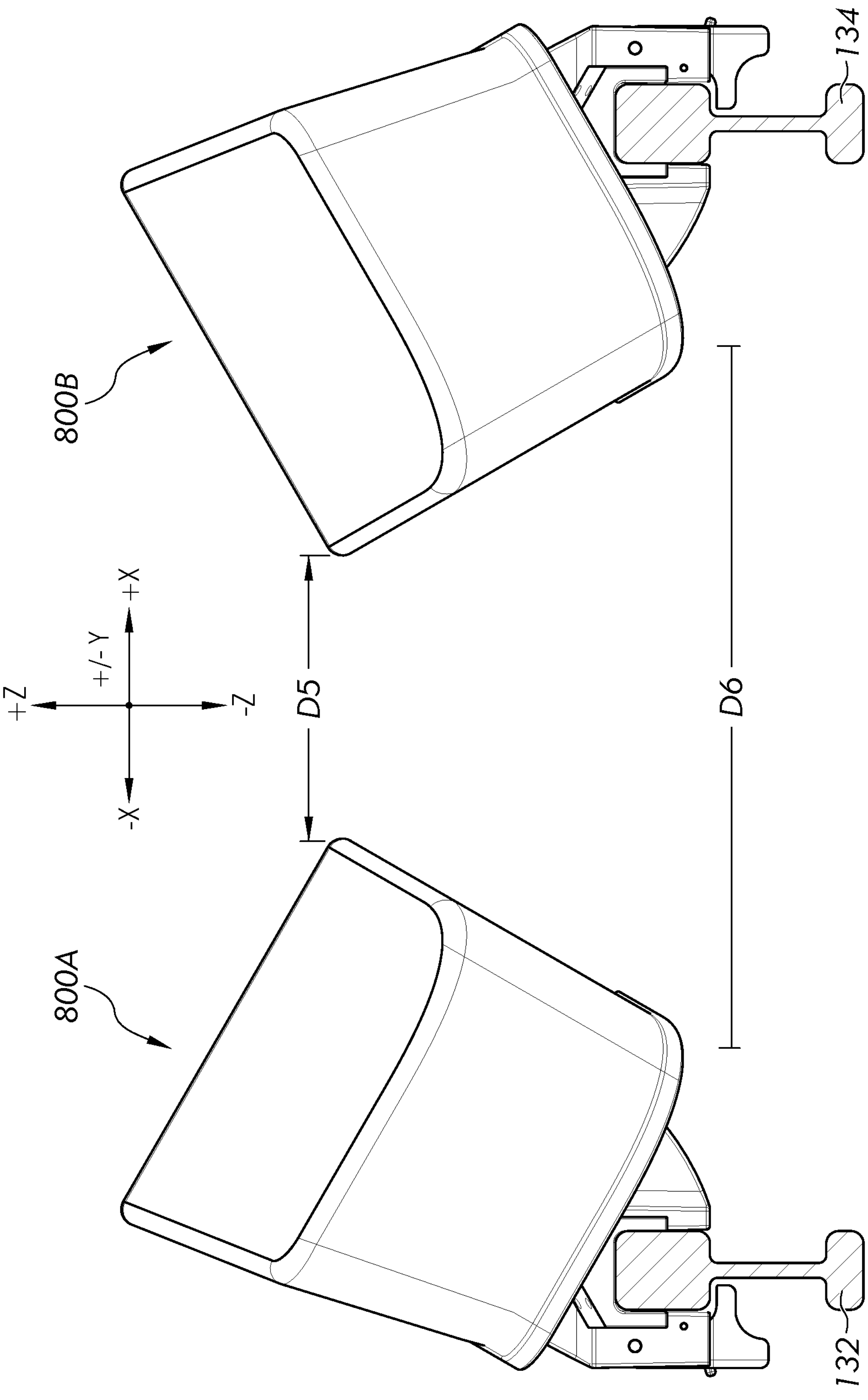
FIG. 30 schematically depicts a cross-sectional view of the pair of hip/thigh support assemblies of FIG. 29, according to one or more embodiments shown or described herein.

Referring now to FIG. 30, the hip/thigh support assemblies 800A, 800B are shown provided on the first side rail 132 and the second side rail 134, respectively, and spaced apart from one another in the +/−X-direction of the coordinate axes depicted in the drawings. Due to the orientation and shape of the hip/thigh support assemblies 800A, 800B, a first distance D5 between an upper end of the hip/thigh support assemblies 800A, 800B is less than a second distance D6 between an opposite lower end of the hip/thigh support assemblies 800A, 800B.

Figure 31:
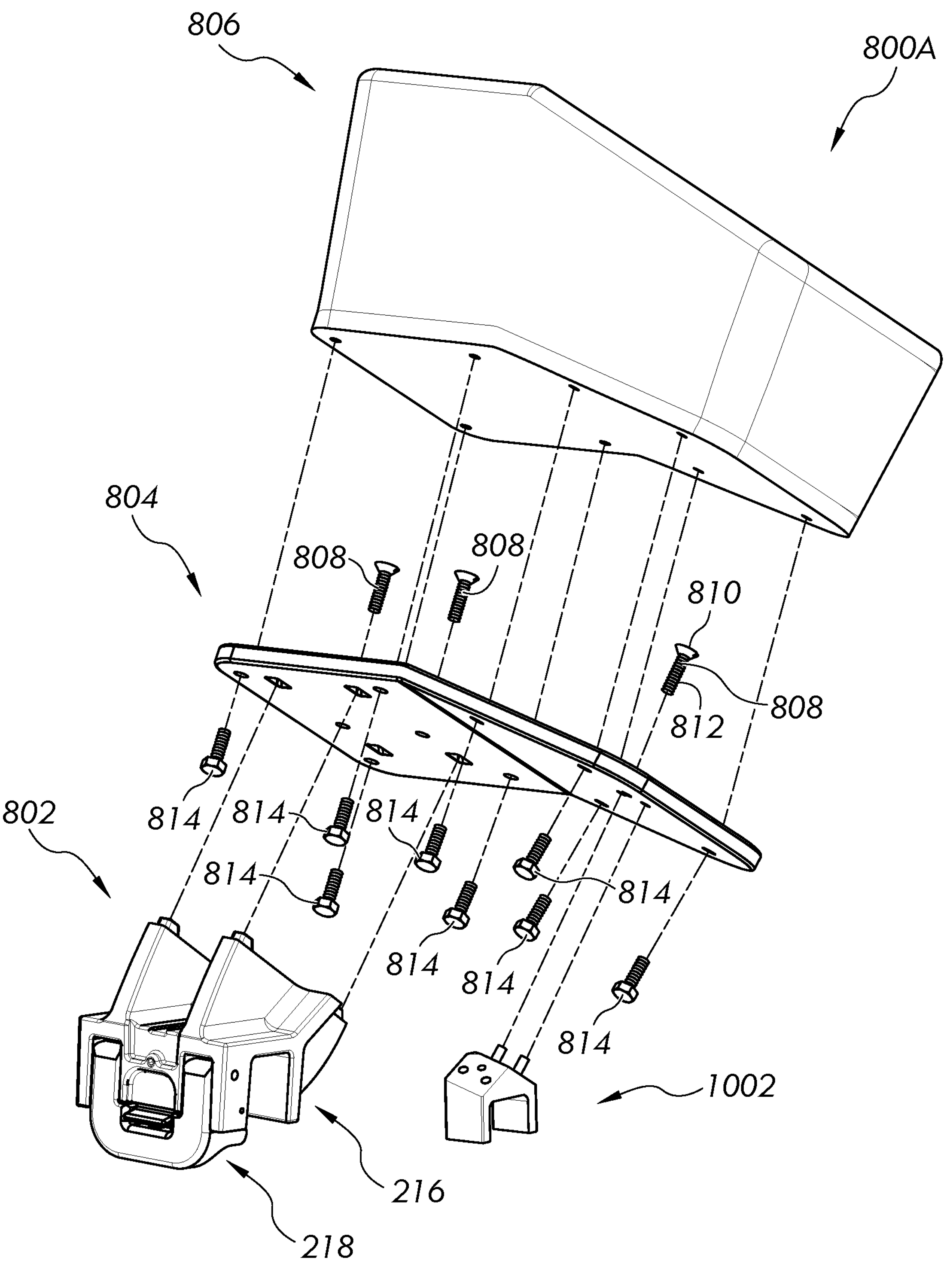
FIG. 31 schematically depicts an exploded view of the hip/thigh support assembly of FIG. 29, according to one or more embodiments shown or described herein.

Referring now to FIG. 31, the first hip/thigh support assembly 800A is described in more detail. However, as noted above, the first hip/thigh support assembly 800A is an identical mirror image of the second hip/thigh support assembly 800B and, thus, the description of the first hip/thigh support assembly 800A is equally applicable to the second hip/thigh support assembly 800B. Specifically, the first hip/thigh support assembly 800A generally includes a hip support base 802, a thigh support base 1002, a hip/thigh support exterior plate 804 removably attached to the hip support base 802 and the thigh support base 1002, and a hip/thigh support pad 806 removably attached to the hip/thigh support exterior plate 804.

The first hip/thigh support assembly 800A includes one or more fasteners 808 that secure the hip/thigh support exterior plate 804 to the hip support base 802 and the thigh support base 1002. Although FIG. 31 depicts a plurality of fasteners 808 represented as threaded fasteners, it should be appreciated that any number of fasteners 808, such as non-threaded fasteners, clips, latches, and the like, may be suitable for attaching the hip/thigh support exterior plate 804 to the hip support base 802 and the thigh support base 1002. In embodiments, the fasteners 808 may include a head 810 and a shaft 812 extending from the head 810. More particularly, the head 810 of the fasteners 808 may be tapered in a direction toward the shaft 812 so as to nest within the hip/thigh support exterior plate 804 and reduce a clearance required between the hip/thigh support exterior plate 804 and the hip/thigh support pad 806, as described in more detail herein.

Similarly, the first hip/thigh support assembly 800A includes one or more fasteners 814 that secure the hip/thigh support pad 806 to the hip/thigh support exterior plate 804. Although FIG. 31 depicts a plurality of fasteners 814 represented as threaded fasteners, it should be appreciated that any number of suitable fasteners, such as non-threaded fasteners, clips, latches, and the like, may be suitable for attaching the hip/thigh support pad 806 to the hip/thigh support exterior plate 804.

It should be appreciated that the hip support base 802 is identical to the hip support base 202 of the first hip support assembly 200A depicted in FIG. 3. Accordingly, like reference numbers will be used to refer to like parts and the hip support base 802 will not be described in detail herein for purposes of brevity. Accordingly, the hip support base 802 includes the hip support base frame 216 and the locking member 218 received within the hip support base frame 216 and rotatably coupled thereto.

Figure 32:
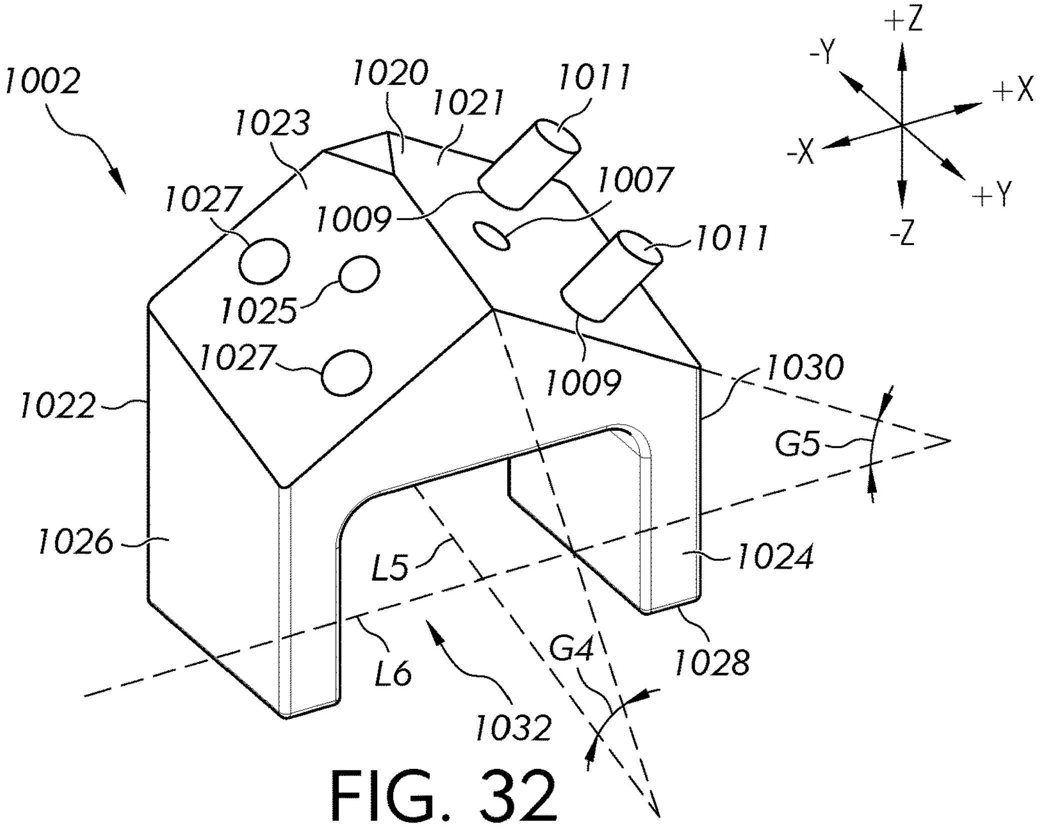
FIG. 32 schematically depicts a perspective view of a thigh support base of the hip/thigh support assembly of FIG. 29, according to one or more embodiments shown or described herein.
Figure 33:
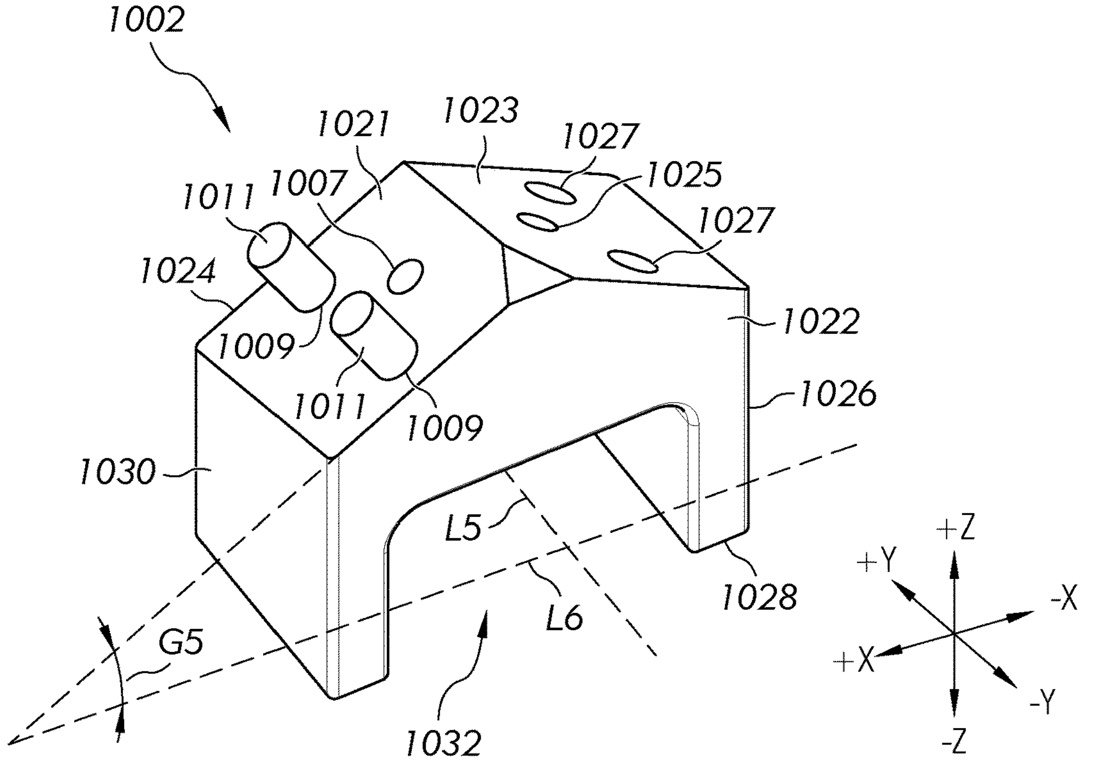
FIG. 33 schematically depicts an opposite perspective view of the thigh support base of the hip/thigh support assembly of FIG. 29, according to one or more embodiments shown or described herein.

Referring now to FIGS. 32 and 33, the thigh support base 1002 is depicted. The thigh support base 1002 includes an upper surface 1020, a front surface 1022, a rear surface 1024 opposite the front surface 1022, an outer surface 1026, a lower surface 1028 opposite the upper surface 1020, and an inner surface 1030 opposite the outer surface 1026. The front surface 1022 and the rear surface 1024 are spaced apart from one another and extend between the upper surface 1020, the lower surface 1028, the outer surface 1026, and the inner surface 1030. As such, the outer surface 1026 and the inner surface 1030 each extend between the upper surface 1020, the front surface 1022, the rear surface 1024, and the lower surface 1028. The upper surface 1020 includes an inner upper surface tapered portion 1021 extending toward the inner surface 1030 of the thigh support base 1002.

A longitudinal channel 1032 is formed within the thigh support base 1002 and extends through the front surface 1022 and the rear surface 1024 of the thigh support base 1002. The longitudinal channel 1032 is open at the lower surface 1028 of the thigh support base 1002 to permit the thigh support base 1002 to be lowered onto the first side rail 132 of the longitudinal frame 130 (FIG. 30). In embodiments, the longitudinal channel 1032 has a rectangular cross-section corresponding to a cross-section of the first side rail 132. The longitudinal channel 1032 defines a longitudinal axis L5 extending parallel to the Y-axis of the coordinate axes and a lateral axis L6 extending perpendicular to the longitudinal axis L5 of the longitudinal channel 1032, and thus parallel to the X-axis of the coordinate axes. The inner upper surface tapered portion 1021 is oriented at an acute angle G4 relative to the longitudinal axis L5 and an acute angle G5 relative to the lateral axis L6 of the longitudinal channel 1032. Stated another way, the inner upper surface tapered portion 1021 is oriented at an acute angle relative to each of the horizontal plane (X-Y plane) and the vertical plane (X-Z plane). In embodiments, the acute angles G4, G5 are equal to or greater than 20 degrees and less than or equal to 70 degrees. In embodiments, the acute angles G4, G5 are equal to or greater than 40 degrees and less than or equal to 60 degrees. It should be appreciated that the acute angle G4 may not be equal to the acute angle G5.

In embodiments, one or more holes are formed in the inner upper surface tapered portion 1021. The holes may include one or more fastener holes 1007 and one or more positioning holes 1009. As depicted in FIGS. 32 and 33, one fastener hole 1007 and two positioning holes 1009 are formed in the inner upper surface tapered portion 1021. However, it should be appreciated that any number of fastener holes 1007 and positioning holes 1009 may be provided. In embodiments, a pin 1011 is positionable within each of the positioning holes 1009. In other embodiments, the pins 1011 may be integrally formed with the thigh support base 1002 as a one piece, monolithic structure.

In embodiments, the upper surface 1020 also includes an outer upper surface tapered portion 1023 extending from the inner upper surface tapered portion 1021 to the outer surface 1026 of the thigh support base 1002. The outer upper surface tapered portion 1023 extends in a direction opposite the inner upper surface tapered portion 1021. However, similar to the inner upper surface tapered portion 1021, the outer upper surface tapered portion 1023 is also oriented at an acute angle relative to the longitudinal axis L5 and an acute angle relative to the lateral axis L6 of the longitudinal channel 1032.

In embodiments, one or more holes are also formed in the outer upper surface tapered portion 1023. The holes may include one or more fastener holes 1025 and one or more positioning holes 1027. As depicted in FIGS. 32 and 33, one fastener hole 1025 and two positioning holes 1027 are formed in the outer upper surface tapered portion 1023. However, it should be appreciated that any number of fastener holes 1025 and positioning holes 1027 may be provided. In embodiments, a pin is positionable within each of the positioning holes 1027. In other embodiments, the pins may be integrally formed with the thigh support base 1002 as a one piece, monolithic structure.

In embodiments in which the thigh support base 1002 includes both the inner upper surface tapered portion 1021 and the outer upper surface tapered portion 1023 as described herein, the thigh support base 1002 of the first hip/thigh support assembly 800A is identical to the thigh support base 1002 of the second hip/thigh support assembly 800B.

Figure 34:
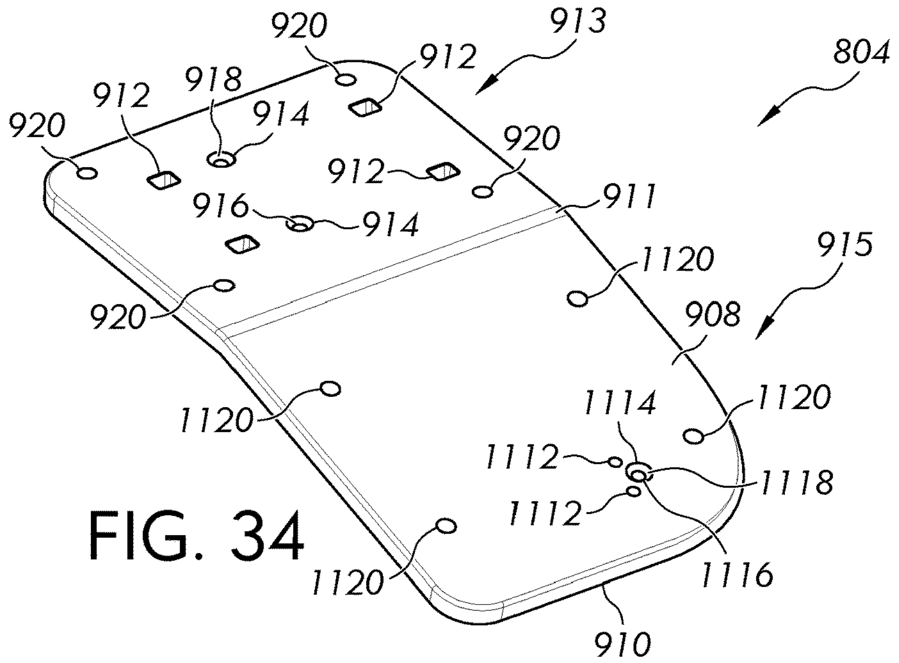
FIG. 34 schematically depicts a top perspective view of a hip/thigh support exterior plate of the hip/thigh support assembly of FIG. 29, according to one or more embodiments shown or described herein.
Figure 35:
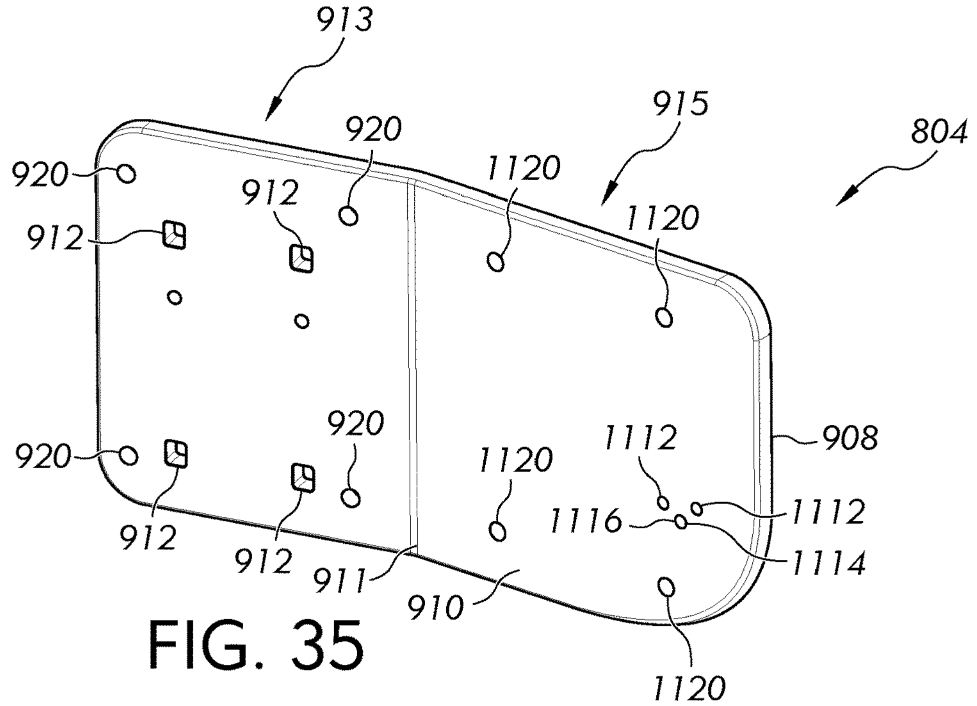
FIG. 35 schematically depicts a bottom perspective view of the hip/thigh support exterior plate of the hip/thigh support assembly of FIG. 29, according to one or more embodiments shown or described herein.
Figure 36:
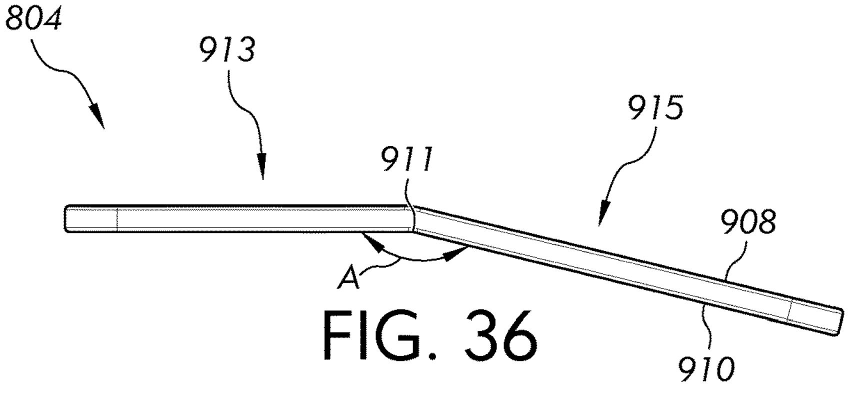
FIG. 36 schematically depicts a side view of the hip/thigh support exterior plate of the hip/thigh support assembly of FIG. 29, according to one or more embodiments shown or described herein.

Referring now to FIGS. 34-36, the hip/thigh support exterior plate 804 is depicted. The hip/thigh support exterior plate 804 has a bend 911 formed in a substantially central portion thereof and includes an upper surface 908 and a lower surface 910 opposite the upper surface 908. The bend 911 defines a hip support exterior plate portion 913 and a thigh support exterior plate portion 915. The thigh support exterior plate portion 915 extends from the hip support exterior plate portion 913 at an obtuse joint angle A (FIG. 36) less than 180 degrees and greater than 90 degrees. In embodiments, the joint angle A is less than 180 degrees and equal to or greater than 120 degrees. In embodiments, the joint angle A is less than 180 degrees and equal to or greater than 140 degrees. In embodiments, the joint angle A is less than 180 degrees and equal to or greater than 160 degrees. The hip/thigh support exterior plate 804 has a generally rectangular shape. However, it should be appreciated that the shape of the hip/thigh support exterior plate 804 is not limited that depicted herein. For example, the hip/thigh support exterior plate 804 may have a triangular shape, a circular shape, or any other suitable shape.

As described herein, the hip/thigh support exterior plate 804 is removably mounted onto the hip support base 802 and the thigh support base 1002 (FIG. 31). Particularly, the hip support exterior plate portion 913 is mounted onto the hip support base 802 and the thigh support exterior plate portion 915 is mounted onto the thigh support base 1002. Accordingly, the hip support exterior plate portion 913 has one or more holes formed therein to facilitate engagement with the hip support base frame 216. In embodiments, the hip support exterior plate portion 913 has one or more protrusion-receiving holes 912 formed therein. As depicted in FIGS. 34 and 35, a plurality of protrusion-receiving holes 912 are formed in the hip support exterior plate portion 913 and extend through the upper surface 908 and the lower surface 910 of the hip/thigh support exterior plate 804. Specifically, four protrusion-receiving holes 912 are depicted corresponding to the number and location of the plurality of protrusions 258 formed on the hip support base frame 216 (FIG. 4). However, it should be appreciated that any number of protrusion-receiving holes 912 may be formed in the hip/thigh support exterior plate 804, such as two, three, or more than four. In embodiments in which the protrusions 258 of the hip support base frame 216 have a trapezoidal shape, the protrusion-receiving holes 912 have a similar shape such that each of the protrusions 258 may be received within a corresponding protrusion-receiving hole 912.

In addition, in embodiments, the hip support exterior plate portion 913 has one or more inner fastener holes 914 formed therein. As depicted in FIGS. 34 and 35, a plurality of inner fastener holes 914 are formed in the hip support exterior plate portion 913 and extend through the upper surface 908 and the lower surface 910 of the hip/thigh support exterior plate 804. Specifically, two inner fastener holes 914 are depicted corresponding to the number and location of the plurality of fastener holes 270 formed on the hip support base frame 216 (FIG. 4). However, it should be appreciated that any number of inner fastener holes 914 may be formed in the hip support exterior plate portion 913, such as one or more than two. In embodiments, the inner fastener holes 914 define a tubular portion 916 extending from the lower surface 910 and a tapered portion 918 extending between the upper surface 908 of the hip/thigh support exterior plate 804 and the tubular portion 916. The tapered portion 918 tapers in a direction from the upper surface 908 toward the tubular portion 916.

The hip support exterior plate portion 913 also has one or more outer fastener holes 920 formed in therein. As depicted in FIGS. 34 and 35, a plurality of outer fastener holes 920 are formed in the hip support exterior plate portion 913 and extend through the upper surface 908 and the lower surface 910 of the hip/thigh support exterior plate 804. Specifically, four outer fastener holes 920 are depicted. However, it should be appreciated that any number of outer fastener holes 920 may be formed in the hip support exterior plate portion 913, such as one, two, three, or more than four.

The thigh support exterior plate portion 915 has one or more holes formed therein to facilitate engagement with the thigh support base 1002 (FIG. 31). In embodiments, the thigh support exterior plate portion 915 has one or more pin-receiving holes 1112 formed therein. As depicted in FIGS. 34 and 35, a plurality of pin-receiving holes 1112 are formed in the thigh support exterior plate portion 915 and extend through the upper surface 908 and the lower surface 910 of the hip/thigh support exterior plate 804. Specifically, two pin-receiving holes 1112 are depicted corresponding to the number and location of the plurality of pins 1011 (FIG. 32) provided on the thigh support base 1002. However, it should be appreciated that any number of pin-receiving holes 1112 may be formed in the thigh support exterior plate portion 915, such as one or more than two. In embodiments in which the pins 1011 of the thigh support base 1002 have a cylindrical shape, the pin-receiving holes 1112 have a similar shape such that each of the pins 1011 may be received within a corresponding pin-receiving hole 1112.

In addition, in embodiments, the hip support exterior plate portion 915 has one or more inner fastener holes 1114 formed therein. As depicted in FIGS. 34 and 35, a plurality of inner fastener holes 1114 are formed in the thigh support exterior plate portion 915 and extend through the upper surface 908 and the lower surface 910 of the hip/thigh support exterior plate 804. Specifically, one inner fastener hole 1114 is depicted corresponding to the number and location of the fastener hole 1007 formed on the thigh support base 1002 (FIG. 32). However, it should be appreciated that any number of inner fastener holes 1114 may be formed in the thigh support exterior plate portion 915, such as more than one. In embodiments, the inner fastener hole 1114 define a tubular portion 1116 extending from the lower surface 910 and a tapered portion 1118 extending between the upper surface 908 of the hip/thigh support exterior plate 804 and the tubular portion 1116. The tapered portion 1118 tapers in a direction from the upper surface 908 toward the tubular portion 1116.

The thigh support exterior plate portion 915 also has one or more outer fastener holes 1120 formed in therein. As depicted in FIGS. 34 and 35, a plurality of outer fastener holes 1120 are formed in the thigh support exterior plate portion 915 and extend through the upper surface 908 and the lower surface 910 of the hip/thigh support exterior plate 804. Specifically, four outer fastener holes 1120 are depicted. However, it should be appreciated that any number of outer fastener holes 1120 may be formed in the thigh support exterior plate portion 915, such as one, two, three, or more than four.

The hip/thigh support exterior plate 804 is removably mounted onto the hip support base 202 (FIG. 4) by positioning the hip/thigh support exterior plate 804 on the upper surface 220 of the hip support base frame 216 such that the protrusions 258 formed on the hip support base frame 216 nest within the respective protrusion-receiving holes 912 formed in the hip support exterior plate portion 913. As described herein, the protrusions 258 and the protrusion-receiving holes 912 may have a trapezoidal shape. As such, this ensures that the hip/thigh support exterior plate 804 is only permitted to engage the hip support base 202 in one specific orientation, for example, with the lower surface 910 of the hip/thigh support exterior plate 804 facing the hip support base 202. Thereafter, the fasteners 808 (FIG. 31) may be inserted into the inner fastener holes 914 of the hip support exterior plate portion 913 to further secure the hip/thigh support exterior plate 804 to the hip support base 202. Additionally, in embodiments in which the fasteners 814 include the head 810 being tapered and the inner fastener holes 914 include the tapered portion 918, the fasteners 808 may extend further into the inner fastener holes 914 to reduce a distance that the fasteners 808 extend out of the upper surface 908 of the hip/thigh support exterior plate 804.

Additionally, the hip/thigh support exterior plate 804 is secured onto the thigh support base 1002 (FIG. 32) by positioning the hip/thigh support exterior plate 804 on the upper surface 1020 of the thigh support base 1002 such that the pins 1011 of the thigh support base 1002 are received within the respective pin-receiving holes 1112 formed in the thigh support exterior plate portion 915. Thereafter, the fasteners 808 (FIG. 31) may be inserted into the inner fastener hole 1114 of the thigh support exterior plate portion 915 to further secure the hip/thigh support exterior plate 804 to the thigh support base 1002.

Figure 37:
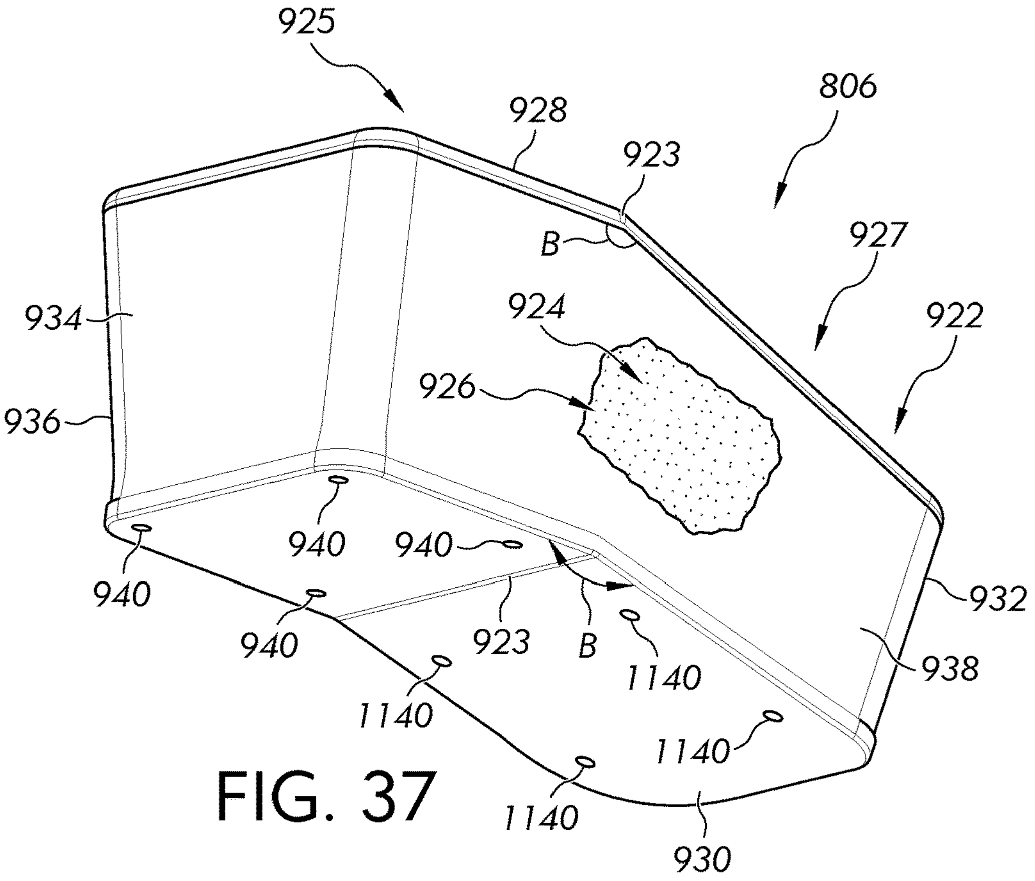
FIG. 37 schematically depicts a perspective view of a hip/thigh support pad of the hip/thigh support assembly of FIG. 29, according to one or more embodiments shown or described herein.

Referring now to FIG. 37, the hip/thigh support pad 806 is depicted. In embodiments, the hip/thigh support pad 806 includes a hip/thigh support pad shell 922 and a hip/thigh support pad cushion 924 provided within an interior 926 of the hip/thigh support pad shell 922. The hip/thigh support pad shell 922 includes an upper surface 928, a lower surface 930 opposite the upper surface 928, and one or more side surfaces extending between the upper surface 928 and the lower surface 930, such as an inner surface 932, an outer surface 934 opposite the inner surface 932, a front surface 936 extending between the inner surface 932 and the outer surface 934, and a rear surface 938 opposite the front surface 936 and extending between the inner surface 932 and the outer surface 934. In embodiments, as depicted in FIG. 37, the hip/thigh support pad shell 922 has a bend 923 formed in a substantially central portion thereof at the upper surface 928 and the lower surface 930. The bend 923 defines a hip support pad shell portion 925 and a thigh support pad shell portion 927. The thigh support pad shell portion 927 extends from the hip support pad shell portion 925 at an obtuse joint angle B less than 180 degrees and greater than 90 degrees. In embodiments, the joint angle B is less than 180 degrees and equal to or greater than 120 degrees. In embodiments, the joint angle B is less than 180 degrees and equal to or greater than 140 degrees. In embodiments, the joint angle B is less than 180 degrees and equal to or greater than 160 degrees. It should be appreciated that the joint angle B is equal to the joint angle A (FIG. 36).

In embodiments, one or more fastener holes 940 are formed in the lower surface 930 of the hip/thigh support pad shell 922 within the hip support pad shell portion 925. As depicted in FIG. 37, a plurality of fastener holes 940 are formed in the lower surface 930 of the hip/thigh support pad shell 922 within the hip support pad shell portion 925. It should be appreciated that the fastener holes 940 formed in the lower surface 930 of the hip/thigh support pad shell 922 correspond to the outer fastener holes 920 formed in the hip support exterior plate portion 913 (FIG. 34). Accordingly, in embodiments in which the four outer fastener holes 920 are formed in the hip support exterior plate portion 913, four fastener holes 940 are similarly formed in the lower surface 930 of the hip/thigh support pad shell 922 within the hip support pad shell portion 925. Additionally, the location of the fastener holes 940 formed in the hip support pad shell portion 925 corresponds to the location of the fastener holes 940 formed in the hip support exterior plate portion 913 such that the fastener holes 940 in the hip support pad shell portion 925 align with the outer fastener holes 920 formed in the hip support exterior plate portion 913 when the hip/thigh support pad 806 is positioned on the hip/thigh support exterior plate 804.

Similarly, in embodiments, one or more fastener holes 1140 are formed in the lower surface 930 of the hip/thigh support pad shell 922 within the thigh support pad shell portion 927. As depicted in FIG. 37, a plurality of fastener holes 1140 are formed in the lower surface 930 of the hip/thigh support pad shell 922 within the thigh support pad shell portion 927. It should be appreciated that the fastener holes 1140 formed in the lower surface 930 of the hip/thigh support pad shell 922 correspond to the outer fastener holes 1120 formed in the thigh support exterior plate portion 915 (FIG. 34). Accordingly, in embodiments in which the four outer fastener holes 1120 are formed in the thigh support exterior plate portion 915, four fastener holes 1140 are similarly formed in the lower surface 930 of the hip/thigh support pad shell 922 within the thigh support pad shell portion 927. Additionally, the location of the fastener holes 1140 formed in the thigh support pad shell portion 927 corresponds to the location of the fastener holes 1140 formed in the thigh support exterior plate portion 915 such that the fastener holes 1140 in the thigh support pad shell portion 927 align with the outer fastener holes 1120 formed in the thigh support exterior plate portion 915 when the hip/thigh support pad 806 is positioned on the hip/thigh support exterior plate 804.

Figure 38:
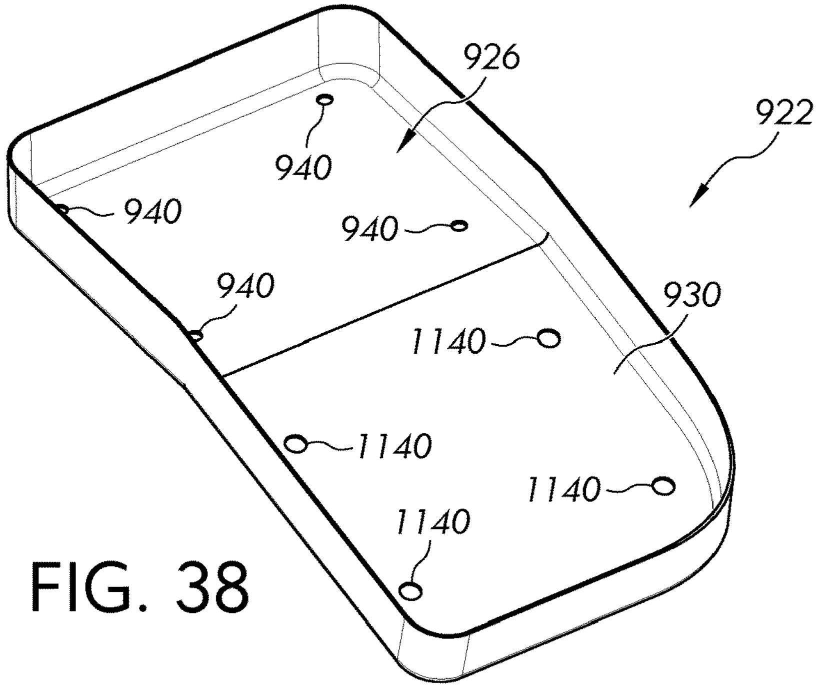
FIG. 38 schematically depicts a perspective view of a lower portion of the hip/thigh support pad of the hip support assembly of FIG. 29, according to one or more embodiments shown or described herein.

As depicted in FIG. 38, a portion of the hip/thigh support pad shell 922 is removed for illustrative purposes to show the hip/thigh support pad cushion 924 provided within the interior 926 of the hip/thigh support pad shell 922. The hip/thigh support pad cushion 924 has a shape generally corresponding to the interior 926 of the hip/thigh support pad shell 922 so that the hip/thigh support pad cushion 924 fills the interior 926 of the hip/thigh support pad shell 922. The hip/thigh support pad cushion 924 may be formed from any suitable material such as, for example, latex, polyurethane, foam, memory foam, and the like. It should be appreciated that the hip/thigh support pad cushion 924 may be inserted into the hip/thigh support pad shell 922 through an opening, which is then closed such as by sewing or the like.

Referring now to FIG. 38, a partial view of a lower portion of the hip/thigh support pad shell 922 opposite the upper surface 928 is depicted, which partially defines the interior 926 of the hip/thigh support pad shell 922. As depicted, the fastener holes 940 and the fastener holes 1140 extend through the lower surface 930 of the hip/thigh support pad shell 922 within the hip support pad shell portion 925 and the thigh support pad shell portion 927, respectively.

Figure 39:
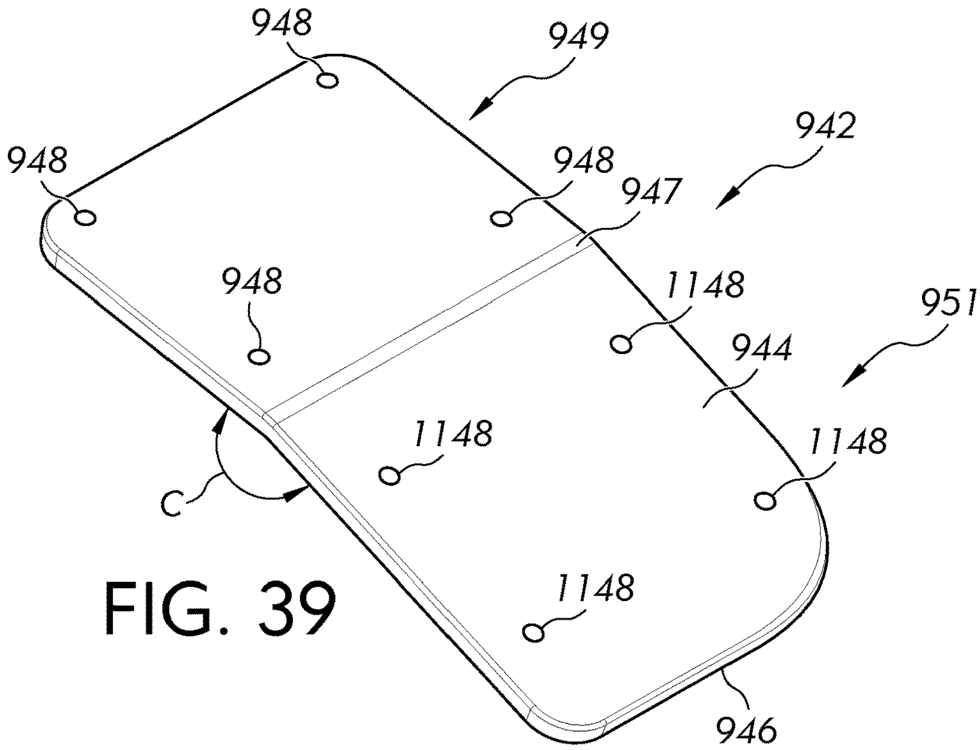
FIG. 39 schematically depicts a perspective view of a hip/thigh support pad interior plate of the hip/thigh support pad of the hip/thigh support assembly of FIG. 29, according to one or more embodiments shown or described herein.

The hip/thigh support pad 806 further includes a hip/thigh support pad interior plate 942 as depicted in FIG. 39. The hip/thigh support pad interior plate 942 has an upper surface 944, a lower surface 946 opposite the upper surface 944, and a bend 947 formed at a substantially central portion thereof. The bend 947 defines a hip support pad interior plate portion 949 and a thigh support pad interior plate portion 951. The thigh support pad interior plate portion 951 extends from the hip support pad interior plate portion 949 at an obtuse joint angle C less than 180 degrees and greater than 90 degrees. In embodiments, the joint angle C is less than 180 degrees and equal to or greater than 120 degrees. In embodiments, the joint angle C is less than 180 degrees and equal to or greater than 140 degrees. In embodiments, the joint angle C is less than 180 degrees and equal to or greater than 160 degrees. It should be appreciated that the joint angle C is equal to the joint angle A and the joint angle B (FIGS. 36 and 37).

One or more fastener holes 948 extend through the upper surface 944 and the lower surface 946 of the hip/thigh support pad interior plate 942 within the hip support pad interior plate portion 949. As depicted in FIG. 39, a plurality of fastener holes 948 are formed in the hip support pad interior plate portion 949 and extend through the upper surface 344 and the lower surface 346 of the hip/thigh support pad interior plate 942. Specifically, four fastener holes 948 are depicted corresponding to the number and location of the plurality of fastener holes 940 formed on the lower surface 330 of the hip/thigh support pad shell 922 within the hip support pad shell portion 925 (FIG. 38), and thus similarly correspond to the number and location of the outer fastener holes 920 formed in the hip support exterior plate portion 913 (FIG. 34). Accordingly, in embodiments in which the four fastener holes 940 are formed in the hip support pad shell portion 925, four fastener holes 948 are similarly formed in the hip/thigh support pad interior plate 942.

Similarly, one or more fastener holes 1148 extend through the upper surface 944 and the lower surface 946 of the hip/thigh support pad interior plate 942 within the thigh support pad interior plate portion 951. As depicted in FIG. 39, a plurality of fastener holes 1148 are formed in the thigh support pad interior plate portion 951 and extend through the upper surface 344 and the lower surface 346 of the hip/thigh support pad interior plate 942. Specifically, four fastener holes 1148 are depicted corresponding to the number and location of the plurality of fastener holes 1140 formed on the lower surface 330 of the hip/thigh support pad shell 922 within the thigh support pad shell portion 927 (FIG. 38), and thus similarly correspond to the number and location of the outer fastener holes 1120 formed in the thigh support exterior plate portion 804 (FIG. 34). Accordingly, in embodiments in which the four fastener holes 1140 are formed in the thigh support pad shell portion 927, four fastener holes 1148 are similarly formed in the hip/thigh support pad interior plate 942.

Figure 40:
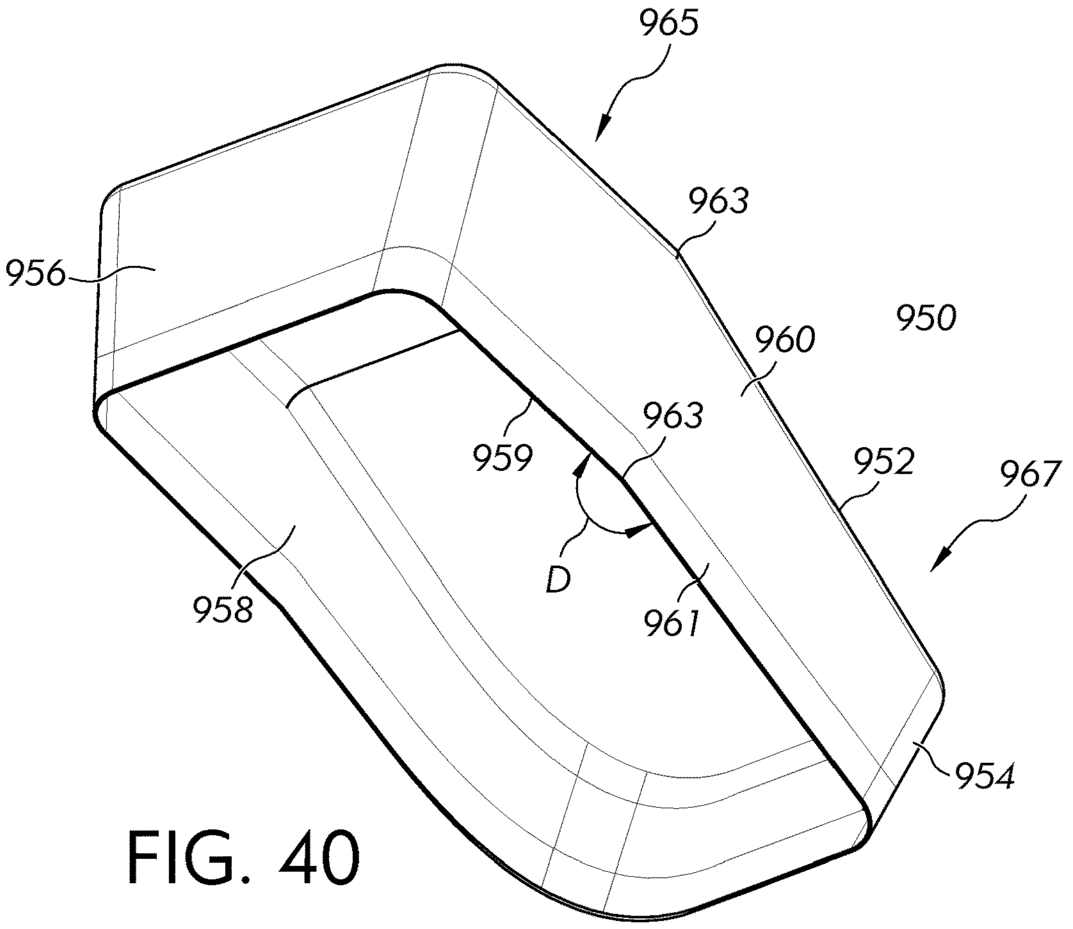
FIG. 40 schematically depicts a perspective view of a hip/thigh support pad cover of the hip/thigh support pad of the hip/thigh support assembly of FIG. 29, according to one or more embodiments shown or described herein.

In embodiments, a hip/thigh support pad cover 950 may be provided as depicted in FIG. 40. The hip/thigh support pad cover 950 includes an upper surface 952 and one or more side surfaces extending from the upper surface 952, such as an inner surface 954, an outer surface 956 opposite the inner surface 954, a front surface 958 extending between the inner surface 954 and the outer surface 956, and a rear surface 960 opposite the front surface 958 and extending between the inner surface 954 and the outer surface 956. The hip/thigh support pad cover 950 is open at a lower end 959 opposite the upper surface 952. In embodiments, the hip/thigh support pad cover 950 includes an elastic band 961 at the lower end 959 extending around an entire perimeter of the hip/thigh support pad cover 950. The elastic band 961 facilitates retaining the hip/thigh support pad cover 950 on the hip/thigh support pad shell 922 when positioned thereon.

It should be appreciated that the hip/thigh support pad cover 950 has a shape corresponding to the shape of the hip/thigh support pad shell 922 and the hip/thigh support pad cushion 924 (FIG. 37). Accordingly, in embodiments, the hip/thigh support pad cover 950 has a bend 963 formed in a substantially central portion thereof at the upper surface 952 and the lower end 959. The bend 963 defines a hip support pad cover portion 965 and a thigh support pad cover portion 967. The thigh support pad cover portion 967 extends from the hip support pad cover portion 965 at an obtuse joint angle D less than 180 degrees and greater than 90 degrees. In embodiments, the joint angle D is less than 180 degrees and equal to or greater than 120 degrees. In embodiments, the joint angle D is less than 180 degrees and equal to or greater than 140 degrees. In embodiments, the joint angle D is less than 180 degrees and equal to or greater than 160 degrees. It should be appreciated that the joint angle D is equal to the joint angle A, the joint angle B, and the joint angle C (FIGS. 36, 37, and 39). The hip/thigh support pad cover 950 serves as a removable sleeve to protect the hip/thigh support pad shell 922. In use, the hip/thigh support pad shell 922 is inserted through the lower end 959 of the hip/thigh support pad cover 950 to be positioned within an interior of the hip/thigh support pad cover 950.

Although not illustrated in FIG. 37, it should be understood that the hip/thigh support pad interior plate 942 (FIG. 39) is positioned within the interior 926 of the hip/thigh support pad shell 922 between the hip/thigh support pad cushion 924 and the lower surface 930 of the hip/thigh support pad shell 922. Accordingly, when the hip/thigh support pad interior plate 942 (FIG. 39) is positioned within the hip/thigh support pad shell 922, the fastener holes 948, 1148 formed in the hip/thigh support pad interior plate 942 align with the fastener holes 940, 1140 formed in the hip/thigh support pad shell 922, respectively. Additionally, the fastener holes 948, 1148 formed in the hip/thigh support pad interior plate 942 and the fastener holes 940, 1140 formed in the hip/thigh support pad shell 922 align with the outer fastener holes 920, 1120 formed in the hip/thigh support exterior plate 804 (FIG. 34) when the hip/thigh support pad 806 is positioned on the hip/thigh support exterior plate 804. Thus, to secure the hip/thigh support pad 806 to the hip/thigh support exterior plate 804, which is initially mounted to the hip support base 802 and the thigh support base 1002 in the manner discussed herein, the hip/thigh support pad 806 is positioned onto the hip/thigh support exterior plate 804 and the fasteners 814 (FIG. 31) are inserted through the fastener holes 948, 1148 formed in the hip/thigh support pad interior plate 942, the fastener holes 940, 1140 formed in the hip/thigh support pad shell 922, and the outer fastener holes 920, 1120 formed in the hip/thigh support exterior plate 804.

It should be appreciated that the hip support base 802 and the thigh support base 1002 are capable of accommodating any sized hip/thigh support pad so long as corresponding fastener holes align. Accordingly, the hip/thigh support pad 806 may have any suitable dimensions other than that depicted herein without deviating from the scope of the present disclosure. For example, the hip/thigh support pad 806 may be wider and/or longer than that depicted herein. However, in embodiments, a hip/thigh support assembly may include additional structure for supporting a larger hip/thigh support pad that may otherwise not be supported by the hip support base 802 and the thigh support base 1002 depicted herein.

It should now be understood that the person support apparatuses according to the present disclosure support hips and thighs of a subject supported on a longitudinal frame. The person support apparatus includes a pair of hip support assemblies and a pair of thigh support assemblies or, alternatively, a hip/thigh support assembly slidably positioned along the longitudinal frame. The hip support assembly includes a hip support pad independently movable relative to a thigh support assembly including a thigh support pad.

Further aspects of the embodiments described herein are provided by the subject matter of the following clauses:

Clause 1. A person support apparatus comprising: a base frame; a longitudinal frame coupled to the base frame and extending in a longitudinal direction; and a hip/thigh support assembly for supporting a hip and a thigh of a subject positioned on the longitudinal frame, the hip/thigh support assembly slidably positioned along the longitudinal frame, the hip/thigh support assembly comprising: a hip support base; a thigh support base; a hip/thigh support exterior plate removably attached to an upper surface of the hip support base and an upper surface of the thigh support base, the hip/thigh support exterior plate comprising a hip support exterior plate portion oriented at an acute angle relative to a lateral axis of the longitudinal frame, and a thigh support exterior plate portion extending from the hip support exterior plate portion at an obtuse angle and oriented at an acute angle relative to the lateral axis of the longitudinal frame and a longitudinal axis of the longitudinal frame; and a hip/thigh support pad removably attached to the hip/thigh support exterior plate.

Clause 2. The person support apparatus of clause 1, wherein the thigh support base comprises: the upper surface; a front surface extending from the upper surface; a rear surface opposite the front surface and extending from the upper surface; an outer surface extending between the upper surface, the front surface, and the rear surface; and an inner surface opposite the outer surface and extending between the upper surface, the front surface, and the rear surface, wherein a longitudinal channel is defined between the upper surface, the inner surface, and the outer surface to receive the longitudinal frame.

Clause 3. The person support apparatus of clause 2, wherein the upper surface comprises an inner upper surface tapered portion and an outer upper surface tapered portion, the inner surface extends from the inner upper surface tapered portion, and the outer surface extends from the outer upper surface tapered portion.

Clause 4. The person support apparatus of clause 2 or clause 3, wherein the thigh support exterior plate portion is removably secured to the thigh support base.

Clause 5. The person support apparatus of any of clauses 1-4, wherein the hip support base comprises: a hip support base frame; and a locking member for securing the hip support base frame to the longitudinal frame.

Clause 6. The person support apparatus of clause 5, wherein the locking member comprises: a friction pad rotatably coupled to the hip support base; a handle rotatably coupled to the hip support base frame and positionable between an unlocked position to permit removal of the hip support base frame from the longitudinal frame and a locked position to retain the hip support base frame on the longitudinal frame; and a release lever to permit the handle to move between the unlocked position and the locked position.

Clause 7. The person support apparatus of clause 6, wherein the handle includes a flange and the longitudinal frame extends between the hip support base frame and the flange of the handle when the handle is in the locked position.

Clause 8. The person support apparatus of clause 6 or clause 7, wherein the handle presses against the friction pad to rotate the friction pad in a direction toward the longitudinal frame when the handle is in the locked position.

Clause 9. The person support apparatus of any one of clauses 1-8, wherein the hip support base comprises a hip support base frame comprising: the upper surface, the upper surface oriented at an acute angle relative to the lateral axis of the longitudinal frame; a front surface extending from the upper surface; a rear surface opposite the front surface and extending from the upper surface; and an outer surface extending between the upper surface, the front surface, and the rear surface, wherein: a locking member is provided within the outer surface of the hip support base frame and rotatably coupled to the front surface and the rear surface of the hip support base frame; and a longitudinal channel extends through the front surface and the rear surface of the hip support base frame to receive the longitudinal frame.

Clause 10. The person support apparatus of clause 9, wherein the front surface and the rear surface are open at a lower end thereof such that the hip support base may be lowered onto the longitudinal frame to be received within the longitudinal channel.

Clause 11. The person support apparatus of clause 9 or clause 10, wherein a plurality of protrusions are formed on the upper surface to engage the hip/thigh support exterior plate.

Clause 12. The person support apparatus of clause 11, wherein the plurality of protrusions have a trapezoidal shape, a plurality of protrusion-receiving holes are formed in the hip/thigh support exterior plate corresponding to the plurality of protrusions, the plurality of protrusion-receiving holes have a trapezoidal cross-section.

Clause 13. The person support apparatus of clause 11 or clause 12, further comprising a plurality of fasteners extending through the hip support exterior plate portion and into respective fastener holes formed in the upper surface to secure the hip/thigh support exterior plate to the hip support base frame.

Clause 14. The person support apparatus of any one of clauses 11-13, wherein a plurality of recesses are formed in the hip support base frame to define a pair of fins spaced apart from one another, the plurality of protrusions formed on the pair of fins.

Clause 15. The person support apparatus of any one of clauses 1-14, wherein the hip/thigh support pad comprises: a hip/thigh support pad shell; a hip/thigh support pad cushion provided within the hip/thigh support pad shell; and a hip/thigh support pad interior plate provided between the hip/thigh support pad cushion and the hip/thigh support pad shell, the hip/thigh support pad interior plate removably secured to the hip/thigh support exterior plate.

Clause 16. The person support apparatus of clause 15, wherein the hip/thigh support pad comprises a hip/thigh support pad cover having an open interior in which the hip/thigh support pad shell is positionable, the hip/thigh support pad cover open at a lower end.

Clause 17. The person support apparatus of any one of clauses 1-16, wherein: the longitudinal frame comprises a first side rail and a second side rail; and the hip/thigh support assembly is provided on a respective one of the first side rail and the second side rail.

Clause 18. The person support apparatus of any one of clauses 1-17, further comprising a primary support frame supported by the base frame, the primary support frame extending upward in a vertical direction from the base frame and supports the longitudinal frame, the primary support frame comprising: a head column that extends upward in the vertical direction from a head portion of the base frame; and a foot column that extends upward in the vertical direction from a foot portion of the base frame, wherein the head column is spaced apart from the foot column.

Clause 19. The person support apparatus of clause 18, wherein the head column is actuatable to raise and lower the head column in the vertical direction with respect to the base frame.

Clause 20. The person support apparatus of clause 18 or clause 19, wherein the foot column is actuatable to raise and lower the foot column in the vertical direction with respect to the base frame.

Clause 21. The person support apparatus of any one of clauses 18-20, further comprising a column actuator coupled to at least one of the head column and the foot column to adjust a vertical position of the at least one of the head column and the foot column with respect to the base frame.

Clause 22. A hip/thigh support assembly comprising: a hip support base; a thigh support base; a hip/thigh support exterior plate removably attached to an upper surface of the hip support base and an upper surface of the thigh support base, the hip/thigh support exterior plate comprising a hip support exterior plate portion, and a thigh support exterior plate portion extending from the hip support exterior plate portion at an obtuse angle; and a hip/thigh support pad removably attached to the hip/thigh support exterior plate.

Clause 23. The hip/thigh support assembly of clause 22, wherein the thigh support base comprises: the upper surface; a front surface extending from the upper surface; a rear surface opposite the front surface and extending from the upper surface; an outer surface extending between the upper surface, the front surface, and the rear surface; and an inner surface opposite the outer surface and extending between the upper surface, the front surface, and the rear surface, wherein a longitudinal channel is defined between the upper surface, the inner surface, and the outer surface.

Clause 24. The hip/thigh support assembly of clause 23, wherein the upper surface comprises an inner upper surface tapered portion and an outer upper surface tapered portion, the inner surface extends from the inner upper surface tapered portion, and the outer surface extends from the outer upper surface tapered portion.

Clause 25. The hip/thigh support assembly of clause 23 or clause 24, wherein the thigh support exterior plate portion is removably secured to the thigh support base.

Clause 26. The hip/thigh support assembly of any one of clauses 22-25, wherein the hip support base comprises: a hip support base frame; and a locking member.

Clause 27. The hip/thigh support assembly of clause 26, wherein the locking member comprises: a friction pad rotatably coupled to the hip support base; a handle rotatably coupled to the hip support base frame and positionable between an unlocked position and a locked position; and a release lever to permit the handle to move between the unlocked position and the locked position.

Clause 28. The hip/thigh support assembly of clause 27, wherein the handle includes a flange provided below a lower end of the hip support base frame when the handle is in the locked position.

Clause 29. The hip/thigh support assembly of clause 27 or clause 28, wherein the handle presses against the friction pad to rotate the friction pad in a direction away from an outer surface of the hip support base frame when the handle is in the locked position.

Clause 30. The hip/thigh support assembly of any one of clauses 22-29, wherein the hip support base comprises a hip support base frame comprising: the upper surface; a front surface extending from the upper surface; a rear surface opposite the front surface and extending from the upper surface; and an outer surface extending between the upper surface, the front surface, and the rear surface, wherein: a locking member is provided within the outer surface of the hip support base frame and rotatably coupled to the front surface and the rear surface of the hip support base frame; and a longitudinal channel extends through the front surface and the rear surface of the hip support base frame.

Clause 31. The hip/thigh support assembly of clause 30, wherein the front surface and the rear surface are open at a lower end thereof.

Clause 32. The hip/thigh support assembly of clause 30 or clause 31, wherein a plurality of protrusions are formed on the upper surface to engage the hip/thigh support exterior plate.

Clause 33. The hip/thigh support assembly of clause 32, wherein the plurality of protrusions have a trapezoidal shape, a plurality of protrusion-receiving holes are formed in the hip/thigh support exterior plate corresponding to the plurality of protrusions, the plurality of protrusion-receiving holes have a trapezoidal cross-section.

Clause 34. The hip/thigh support assembly of clause 32 or clause 33, further comprising a plurality of fasteners extending through the hip support exterior plate portion and into respective fastener holes formed in the upper surface to secure the hip/thigh support exterior plate to the hip support base frame.

Clause 35. The hip/thigh support assembly of any one of clauses 32-34, wherein a plurality of recesses are formed in the hip support base frame to define a pair of fins spaced apart from one another, the plurality of protrusions formed on the pair of fins.

Clause 36. The hip/thigh support assembly of any one of clauses 22-35, wherein the hip/thigh support pad comprises: a hip/thigh support pad shell; a hip/thigh support pad cushion provided within the hip/thigh support pad shell; and a hip/thigh support pad interior plate provided between the hip/thigh support pad cushion and the hip/thigh support pad shell, the hip/thigh support pad interior plate removably secured to the hip/thigh support exterior plate.

Clause 37. The hip/thigh support assembly of clause 36, wherein the hip/thigh support pad comprises a hip/thigh support pad cover having an open interior in which the hip/thigh support pad shell is positionable, the hip/thigh support pad cover open at a lower end.

Clause 38. A person support apparatus comprising: a base frame; a longitudinal frame coupled to the base frame and extending in a longitudinal direction; and a hip support assembly for supporting a hip of a subject positioned on the longitudinal frame, the hip support assembly slidably positioned along the longitudinal frame, the hip support assembly comprising: a hip support base; a hip support exterior plate removably attached to an upper surface of the hip support base, the hip support exterior plate oriented at an acute angle relative to a lateral axis of the longitudinal frame; and a hip support pad removably attached to the hip support exterior plate.

Clause 39. The person support apparatus of clause 38, wherein the hip support base comprises: a hip support base frame; and a locking member for securing the hip support base frame to the longitudinal frame.

Clause 40. The person support apparatus of clause 39, wherein the locking member comprises: a friction pad rotatably coupled to the hip support base; a handle rotatably coupled to the hip support base frame and positionable between an unlocked position to permit removal of the hip support base frame from the longitudinal frame and a locked position to retain the hip support base frame on the longitudinal frame, the handle including a flange and the longitudinal frame extends between the hip support base frame and the flange of the handle when the handle is in the locked position; and a release lever to permit the handle to move between the unlocked position and the locked position, wherein the handle presses against the friction pad to rotate the friction pad in a direction toward the longitudinal frame when the handle is in the locked position.

Clause 41. The person support apparatus of any one of clauses 38-40, wherein the hip support base comprises a hip support base frame comprising: the upper surface, the upper surface oriented at an acute angle relative to the lateral axis of the longitudinal frame; a front surface extending from the upper surface; a rear surface opposite the front surface and extending from the upper surface; and an outer surface extending between the upper surface, the front surface, and the rear surface, wherein: a locking member is provided within the outer surface of the hip support base frame and rotatably coupled to the front surface and the rear surface of the hip support base frame; and a longitudinal channel extends through the front surface and the rear surface of the hip support base frame to receive the longitudinal frame.

Clause 42. The person support apparatus of clause 41, wherein the front surface and the rear surface are open at a lower end thereof such that the hip support base may be lowered onto the longitudinal frame to be received within the longitudinal channel.

Clause 43. The person support apparatus of clause 41 or clause 42, wherein a plurality of protrusions are formed on the upper surface to engage the hip support exterior plate, wherein the plurality of protrusions have a trapezoidal shape, a plurality of protrusion-receiving holes are formed in the hip support exterior plate corresponding to the plurality of protrusions, the plurality of protrusion-receiving holes have a trapezoidal cross-section.

Clause 44. The person support apparatus of any one of clauses 38-43, wherein the hip support pad comprises: a hip support pad shell; a hip support pad cushion provided within the hip support pad shell; and a hip support pad interior plate provided between the hip support pad cushion and the hip support pad shell, the hip support pad interior plate removably secured to the hip support exterior plate.

Clause 45. The person support apparatus of clause 44, wherein the hip support pad shell has a trapezoidal shape.

Clause 46. The person support apparatus of clause 44 or clause 45, wherein the hip support pad comprises a hip support pad cover having an open interior in which the hip support pad shell is positionable, the hip support pad cover open at a lower end.

Clause 47. The person support apparatus of any one of clauses 38-46, wherein: the longitudinal frame comprises a first side rail and a second side rail; and the hip support assembly is provided on a respective one of the first side rail and the second side rail.

Clause 48. The person support apparatus of any one of clauses 38-47, further comprising a primary support frame supported by the base frame, wherein the primary support frame extends upward in a vertical direction from the base frame and supports the longitudinal frame.

Clause 49. A person support apparatus comprising: a base frame; a longitudinal frame coupled to the base frame and extending in a longitudinal direction; a hip support assembly for supporting a hip of a subject positioned on the longitudinal frame, the hip support assembly slidably positioned along the longitudinal frame; and a thigh support assembly for supporting a thigh of the subject positioned on the longitudinal frame spaced apart from the hip support assembly and slidably positioned along the longitudinal frame, the thigh support assembly comprising: a thigh support base; a thigh support exterior plate removably attached to an upper surface of the thigh support base, the thigh support exterior plate oriented at an acute angle relative to a lateral axis of the longitudinal frame and an acute angle relative to a longitudinal axis of the longitudinal frame; and a thigh support pad removably attached to the thigh support exterior plate.

Clause 50. The person support apparatus of clause 49, wherein the thigh support base comprises: a thigh support base frame; and a locking member for securing the thigh support base frame to the longitudinal frame.

Clause 51. The person support apparatus of clause 50, wherein the locking member comprises: a friction pad rotatably coupled to the thigh support base; a handle rotatably coupled to the thigh support base frame and positionable between an unlocked position to permit removal of the thigh support base frame from the longitudinal frame and a locked position to retain the thigh support base frame on the longitudinal frame, the handle including a flange and the longitudinal frame extends between the thigh support base frame and the flange of the handle when the handle is in the locked position; and a release lever to permit the handle to move between the unlocked position and the locked position, wherein the handle presses against the friction pad to rotate the friction pad in a direction toward the longitudinal frame when the handle is in the locked position.

Clause 52. The person support apparatus of any one of clauses 49-51, wherein the thigh support base comprises a thigh support base frame comprising: the upper surface, the upper surface oriented at an acute angle relative to the lateral axis of the longitudinal frame and an acute angle relative to the longitudinal axis of the longitudinal frame; a front surface extending from the upper surface; a rear surface opposite the front surface and extending from the upper surface; and an outer surface extending between the upper surface, the front surface, and the rear surface, wherein: a locking member is provided within the outer surface of the thigh support base frame and rotatably coupled to the front surface and the rear surface of the thigh support base frame; and a longitudinal channel extends through the front surface and the rear surface of the thigh support base frame to receive the longitudinal frame.

Clause 53. The person support apparatus of clause 52, wherein the front surface and the rear surface are open at a lower end thereof such that the thigh support base may be lowered onto the longitudinal frame to be received within the longitudinal channel.

Clause 54. The person support apparatus of any one of clauses 49-53, wherein the thigh support pad comprises: a thigh support pad shell; a thigh support pad cushion provided within the thigh support pad shell; and a thigh support pad interior plate provided between the thigh support pad cushion and the thigh support pad shell, the thigh support pad interior plate removably secured to the thigh support exterior plate.

Clause 55. The person support apparatus of clause 54, wherein the thigh support pad shell has a trapezoidal shape.

Clause 56. The person support apparatus of clause 54 or clause 55, wherein the thigh support pad comprises a thigh support pad cover having an open interior in which the thigh support pad shell is positionable, the thigh support pad cover open at a lower end.

Clause 57. The person support apparatus of any one of clauses 49-56, wherein: the longitudinal frame comprises a first side rail and a second side rail; and the thigh support assembly is provided on a respective one of the first side rail and the second side rail.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A person support apparatus comprising:
- a base frame;
- a longitudinal frame coupled to the base frame and extending in a longitudinal direction; and
- a hip/thigh support assembly for supporting a hip and a thigh of a subject positioned on the longitudinal frame, the hip/thigh support assembly slidably positioned along the longitudinal frame, the hip/thigh support assembly comprising:
  - a hip support base including a hip support base frame, the hip support base frame including:
    - an upper surface oriented at an acute angle relative to a lateral axis of the longitudinal frame;
    - a front surface extending from the upper surface;
    - a rear surface opposite the front surface and extending from the upper surface; and
    - an outer surface extending between the upper surface, the front surface, and the rear surface, an outer recess formed in the upper surface and the outer surface to define a first fin positioned adjacent the front surface and a second fin positioned adjacent the rear surface, the first fin extending parallel to and spaced apart from the second fin;
  - a thigh support base;
  - a hip/thigh support exterior plate removably attached to the upper surface of the hip support base and an upper surface of the thigh support base, the hip/thigh support exterior plate comprising a hip support exterior plate portion oriented at an acute angle relative to the lateral axis of the longitudinal frame, and a thigh support exterior plate portion extending from the hip support exterior plate portion at an obtuse angle and oriented at an acute angle relative to the lateral axis of the longitudinal frame and a longitudinal axis of the longitudinal frame; and
  - a hip/thigh support pad removably attached to the hip/thigh support exterior plate.

2. The person support apparatus of claim 1, wherein the thigh support base comprises:
- the upper surface;
- a front surface extending from the upper surface;
- a rear surface opposite the front surface and extending from the upper surface;
- an outer surface extending between the upper surface, the front surface, and the rear surface; and
- an inner surface opposite the outer surface and extending between the upper surface, the front surface, and the rear surface,
- wherein a longitudinal channel is defined between the upper surface, the inner surface, and the outer surface to receive the longitudinal frame.

3. The person support apparatus of claim 2, wherein the upper surface comprises an inner upper surface tapered portion and an outer upper surface tapered portion, the inner surface extends from the inner upper surface tapered portion, and the outer surface extends from the outer upper surface tapered portion.

4. The person support apparatus of any of claim 1, wherein the hip support base comprises:
- a locking member for securing the hip support base frame to the longitudinal frame.

5. The person support apparatus of claim 4, wherein the locking member comprises:
- a friction pad rotatably coupled to the hip support base;
- a handle rotatably coupled to the hip support base frame and positionable between an unlocked position to permit removal of the hip support base frame from the longitudinal frame and a locked position to retain the hip support base frame on the longitudinal frame; and
- a release lever to permit the handle to move between the unlocked position and the locked position.

6. The person support apparatus of claim 5, wherein the handle presses against the friction pad to rotate the friction pad in a direction toward the longitudinal frame when the handle is in the locked position.

7. The person support apparatus of any one of claim 1, wherein:
- a locking member is provided within the outer surface of the hip support base frame and rotatably coupled to the front surface and the rear surface of the hip support base frame; and
- a longitudinal channel extends through the front surface and the rear surface of the hip support base frame to receive the longitudinal frame.

8. The person support apparatus of claim 7, wherein the front surface and the rear surface are open at a lower end thereof such that the hip support base is lowered onto the longitudinal frame to be received within the longitudinal channel.

9. The person support apparatus of claim 7, wherein a plurality of protrusions are formed on the upper surface to engage the hip/thigh support exterior plate.

10. The person support apparatus of any one of claim 1, wherein the hip/thigh support pad comprises:
- a hip/thigh support pad shell;
- a hip/thigh support pad cushion provided within the hip/thigh support pad shell;
- a hip/thigh support pad interior plate provided between the hip/thigh support pad cushion and the hip/thigh support pad shell, the hip/thigh support pad interior plate removably secured to the hip/thigh support exterior plate; and
- a hip/thigh support pad cover having an open interior in which the hip/thigh support pad shell is positionable, the hip/thigh support pad cover open at a lower end.

11. The person support apparatus of any one of claim 1, wherein:
- the longitudinal frame comprises a first side rail and a second side rail; and
- the hip/thigh support assembly is provided on a respective one of the first side rail and the second side rail.

12. A hip/thigh support assembly comprising:

a hip support base including a hip support base frame, the hip support base frame including:

a lower surface;

an upper surface oriented at an acute angle relative to the lower surface;

a front surface extending between the lower surface and the upper surface;

a rear surface opposite the front surface and extending between the lower surface and the upper surface; and an outer surface extending between the lower surface, the upper surface, the front surface, and the rear surface, an outer recess formed in the upper surface and the outer surface to define a first fin positioned adjacent the front surface and a second fin positioned adjacent the rear surface, the first fin extending parallel to and spaced apart from the second fin;

a thigh support base;

a hip/thigh support exterior plate removably attached to an upper surface of the hip support base and an upper surface of the thigh support base, the hip/thigh support exterior plate comprising a hip support exterior plate portion, and a thigh support exterior plate portion extending from the hip support exterior plate portion at an obtuse angle; and a hip/thigh support pad removably attached to the hip/thigh support exterior plate.

13. The hip/thigh support assembly of claim 12, wherein the thigh support base comprises:

the upper surface;

a front surface extending from the upper surface;

a rear surface opposite the front surface and extending from the upper surface;

an outer surface extending between the upper surface, the front surface, and the rear surface; and an inner surface opposite the outer surface and extending between the upper surface, the front surface, and the rear surface, wherein a longitudinal channel is defined between the upper surface, the inner surface, and the outer surface.

14. The hip/thigh support assembly of claim 13, wherein the upper surface comprises an inner upper surface tapered portion and an outer upper surface tapered portion, the inner surface extends from the inner upper surface tapered portion, and the outer surface extends from the outer upper surface tapered portion.

15. The hip/thigh support assembly of any one of claim 12, wherein the hip support base comprises:

a locking member.

16. The hip/thigh support assembly of claim 15, wherein the locking member comprises:

a friction pad rotatably coupled to the hip support base;

a handle rotatably coupled to the hip support base frame and positionable between an unlocked position and a locked position; and a release lever to permit the handle to move between the unlocked position and the locked position.

17. The hip/thigh support assembly of claim 16, wherein the handle presses against the friction pad to rotate the friction pad in a direction away from an outer surface of the hip support base frame when the handle is in the locked position.

18. The hip/thigh support assembly of any one of claim 12, wherein:

a locking member is provided within the outer surface of the hip support base frame and rotatably coupled to the front surface and the rear surface of the hip support base frame; and a longitudinal channel extends through the front surface and the rear surface of the hip support base frame.

19. The hip/thigh support assembly of claim 18, wherein a plurality of protrusions are formed on the upper surface to engage the hip/thigh support exterior plate.

20. The hip/thigh support assembly of any one of claim 12, wherein the hip/thigh support pad comprises:

a hip/thigh support pad shell;

a hip/thigh support pad cushion provided within the hip/thigh support pad shell;

a hip/thigh support pad interior plate provided between the hip/thigh support pad cushion and the hip/thigh support pad shell, the hip/thigh support pad interior plate removably secured to the hip/thigh support exterior plate; and a hip/thigh support pad cover having an open interior in which the hip/thigh support pad shell is positionable, the hip/thigh support pad cover open at a lower end.

* * * * *